(12) United States Patent
Ansari et al.

(10) Patent No.: US 8,219,509 B2
(45) Date of Patent: Jul. 10, 2012

(54) PROCESSING DEVICE HAVING SELECTIBLE DIFFICULTY LEVELS WITH INTUITIVE LEARNING CAPABILITY

(75) Inventors: Arif M Ansari, Los Angeles, CA (US); Yusuf Sulaiman M Shiek Ansari, Costa Mesa, CA (US)

(73) Assignee: Intuition Intelligence, Inc., Costa Mesa, CA (US)

( * ) Notice: Subject to any disclaimer, the term of this patent is extended or adjusted under 35 U.S.C. 154(b) by 399 days.

(21) Appl. No.: 12/329,374

(22) Filed: Dec. 5, 2008

(65) Prior Publication Data

US 2009/0209323 A1    Aug. 20, 2009

Related U.S. Application Data

(63) Continuation of application No. 10/231,875, filed on Aug. 30, 2002, now Pat. No. 7,483,867, which is a continuation-in-part of application No. 10/185,239, filed on Jun. 26, 2002, now abandoned.

(60) Provisional application No. 60/301,381, filed on Jun. 26, 2001, provisional application No. 60/316,923, filed on Aug. 31, 2001, provisional application No. 60/378,255, filed on May 6, 2002.

(51) Int. Cl.
*G06F 15/18* (2006.01)
(52) U.S. Cl. .......................................... 706/12; 706/25
(58) Field of Classification Search .................... 706/12
See application file for complete search history.

(56) References Cited

OTHER PUBLICATIONS

Narendra (:earning Automata-A Survey Jul. 1974).*
Tecuci et al ("Developing Intelligent Educational Agents with the Disciple Learning Agent Shell" 1998).*

* cited by examiner

*Primary Examiner* — Jeffrey A Gaffin
*Assistant Examiner* — Lut Wong
(74) *Attorney, Agent, or Firm* — Michael J. Bolan

(57) ABSTRACT

A processing device and a method of providing learning capability thereto are provided. One of a plurality of processor actions is selected based on an action probability distribution comprising a plurality of probability values corresponding to the plurality of processor actions. The plurality of processor actions are associated with a plurality of different difficulty levels. An action performed by a user is identified, an outcome of selected processor action relative to the identified user action is determined, and the action probability distribution is updated based on the outcome and the difficulty level of the selected processor action.

23 Claims, 28 Drawing Sheets

PROCESSING DEVICE HAVING SELECTIBLE DIFFICULTY LEVELS WITH INTUITIVE LEARNING CAPABILITY

RELATED APPLICATIONS

This application is a continuation of U.S. application Ser. No. 10/231,875, filed Aug. 30, 2002 (now U.S. Pat. No. 7,483,867), which is a continuation-in-part of U.S. application Ser. No. 10/185,239, filed Jun. 26, 2002 (now abandoned), which claims priority from U.S. Provisional Application Ser. No. 60/301,381, filed Jun. 26, 2001, U.S. Provisional Application Ser. No. 60/316,923, filed Aug. 31, 2001, and U.S. Provisional Application Ser. No. 60/378,255, filed May 6, 2002, all of which are hereby fully and expressly incorporated herein by reference.

COMPUTER PROGRAM LISTING APPENDIX

A Computer Program Listing Appendix is filed with U.S. patent application Ser. No. 10/231,875 (now U.S. Pat. No. 7,483,867), which comprises an original compact disc (and duplicate compact disc containing the same) containing the MS Word files (1) "Intuition Intelligence-duckgame1.doc" of size 119 Kbytes, created on Aug. 23, 2001, and written in Visual Basic 6.0; (2) "Intuition Intelligence-duckgame2.doc" of size 119 Kbytes, created on Aug. 23, 2001, and written in Visual Basic 6.0; (3) "Intuition Intelligence-incomingphone.doc" of size 81 Kbytes, created on Apr. 28, 2002, and written in PHP; (4) "Intuition Intelligence-outgoingphone.doc" of size 61 Kbytes, created on Apr. 28, 2002, and written in PHP; (5) "Intuition Intelligence-remote.doc" of size 129 Kbytes, created on Aug. 30, 2002, and written in Visual Basic 5.0; and (6) and "Intuition Intelligence-simonsays.doc" of size 60 Kbytes, created on Aug. 30, 2002, and written in Visual Basic 5.0. The Computer Program Listing Appendix is fully and expressly incorporated herein by reference.

TECHNICAL FIELD OF THE INVENTION

The present inventions relate to methodologies for providing learning capability to processing devices, e.g., computers, microprocessors, microcontrollers, embedded systems, network processors, and data processing systems, and those products containing such devices.

BACKGROUND OF THE INVENTION

The era of smart interactive computer-based devices has dawned. There is a demand to increasingly develop common household items, such as computerized games and toys, smart gadgets and home appliances, personal digital assistants (PDA's), and mobile telephones, with new features, improved functionality, and built-in intelligence and/or intuition, and simpler user interfaces. The development of such products, however, has been hindered for a variety of reasons, including high cost, increased processing requirements, speed of response, and difficulty of use.

For example, in order to attain a share in the computer market today, computer game manufacturers must produce games that are challenging and maintain the interest of players over a significant period of time. If not, the games will be considered too easy, and consumers as a whole will opt not to purchase such games. In order to maintain a player's interest in single-player games (i.e., the player plays against the game program), manufacturers design different levels of difficulty into the game program. As the player learns the game, thus improving his or her skill level, he or she moves onto the next level. In this respect, the player learns the moves and strategy of the game program, but the game program does not learn the moves and strategy of the player, but rather increases its skill level in discrete steps. Thus, most of today's commercial computer games cannot learn or, at the most, have rudimentary learning capacity. As a result, player's interest in the computer game will not be sustained, since, once mastered, the player will no longer be interested in the game. Even if the computer games do learn, the learning process is generally slow, ineffective, and not instantaneous, and does not have the ability to apply what has been learned.

Even if the player never attains the highest skill level, the ability of the game program to change difficulty levels does not dynamically match the game program's level of play with the game player's level of play, and thus, at any given time, the difficulty level of the game program is either too low or too high for the game player. As a result, the game player is not provided with a smooth transition from novice to expert status. As for multi-player computer games (i.e., players that play against each other), today's learning technologies are not well understood and are still in the conceptual stage. Again, the level of play amongst the multiple players is not matched with another, thereby making it difficult to sustain the players' level of interest in the game.

As for PDA's and mobile phones, their user applications, which are increasing at an exponential rate, cannot be simultaneously implemented due to the limitation in memory, processing, and display capacity. As for smart gadgets and home appliances, the expectations of both the consumers and product manufacturers that these new advanced products will be easier to use have not been met. In fact, the addition of more features in these devices has forced the consumer to read and understand an often-voluminous user manual to program the product. Most consumers find it is extremely hard to understand the product and its features, and instead use a minimal set of features, so that they do not have to endure the problem of programming the advanced features. Thus, instead of manufacturing a product that adapts to the consumers' needs, the consumers have adapted to a minimum set of features that they can understand.

Audio/video devices, such as home entertainment systems, provide an added dimension of problems. A home entertainment system, which typically comprises a television, stereo, audio and video recorders, digital videodisc player, cable or satellite box, and game console is commonly controlled by a single remote control or other similar device. Because individuals in a family typically have differing preferences, however, the settings of the home entertainment system must be continuously reset through the remote control or similar device to satisfy the preferences of the particular individual that is using the system at the time. Such preferences may include, e.g., sound level, color, choice of programs and content, etc. Even if only a single individual is using the system, the hundreds of television channels provided by satellite and cable television providers make it difficult for such individual to recall and store all of his or her favorite channels in the remote control. Even if stored, the remote control cannot dynamically update the channels to fit the individual's ever changing preferences.

To a varying extent, current learning technologies, such as artificial intelligence, neural networks, and fuzzy logic, have attempted to solve the afore-described problems, but have been generally unsuccessful because they are either too costly, not adaptable to multiple users (e.g., in a family), not versatile enough, unreliable, exhibit a slow learning capability, require too much time and effort to design into a particular product, require increased memory, or cost too much to implement. In addition, learning automata theory, whereby a single unique optimum action is to be determined over time, has been applied to solve certain problems, e.g., economic problems, but have not been applied to improve the functionality of the afore-mentioned electronic devices. Rather, the sole function of the processing devices incorporating this learning automata theory is the determination of the optimum action.

There, thus, remains a need to develop an improved learning technology for processors.

SUMMARY OF THE INVENTION

The present inventions are directed to an enabling technology that utilizes sophisticated learning methodologies that can be applied intuitively to improve the performance of most computer applications. This enabling technology can either operate on a stand-alone platform or co-exist with other technologies. For example, the present inventions can enable any dumb gadget/device (i.e., a basic device without any intelligence or learning capacity) to learn in a manner similar to human learning without the use of other technologies, such as artificial intelligence, neural networks, and fuzzy logic based applications. As another example, the present inventions can also be implemented as the top layer of intelligence to enhance the performance of these other technologies.

The present inventions can give or enhance the intelligence of almost any product. For example, it may allow a product to dynamically adapt to a changing environment (e.g., a consumer changing style, taste, preferences, and usage) and learn on-the-fly by applying efficiently what it has previously learned, thereby enabling the product to become smarter, more personalized, and easier to use as its usage continues. Thus, a product enabled with the present inventions can self-customize itself to its current user or each of a group of users (in the case of multiple-users), or can program itself in accordance with a consumer's needs, thereby eliminating the need for the consumer to continually program the product. As further examples, the present inventions can allow a product to train a consumer to learn more complex and advanced features or levels quickly, can allow a product to replicate or mimic the consumer's actions, or can assist or advise the consumer as to which actions to take.

The present inventions can be applied to virtually any computer-based device, and although the mathematical theory used is complex, the present inventions provide an elegant solution to the foregoing problems. In general, the hardware and software overhead requirements for the present inventions are minimal compared to the current technologies, and although the implementation of the present inventions within most every product takes very little time, the value that they add to a product increases exponentially.

In accordance with one aspect of the present inventions, a method of providing learning capability to a processing device (e.g., an educational toy) comprises selecting one of a plurality of processor actions that is associated with a plurality of different difficulty levels. In the case of an educational toy, a selected action can be an educational game or an educational task to be performed by the user. Selection of the processor actions is based on an action probability distribution that contains a plurality of probability values corresponding to the plurality of processor actions. For example, the selected processor action can correspond to a pseudo-random selection of a value within the action probability distribution. Preferably, the action probability distribution is normalized.

The method further comprises identifying an action performed by a user. In the preferred method, the user action is performed in response to the selected processor action.

The method further comprises determining an outcome of the selected processor action relative to the identified user action. For example, if the processing device is an educational toy, the outcome can be determined by determining if the identified user action matches a selected toy action. By way of non-limiting example, the outcome can be represented by one of two values (e.g., zero if the user is successful, and one if the user is not successful), one of a finite range of real numbers (e.g., lower numbers may mean user is relatively successful), or one of a range of continuous values (e.g., the lower the number, the more successful the user is).

Lastly, the method comprises updating the action probability distribution based on the outcome and the difficulty level of the selected processor action. By way of non-limiting example, if the outcome indicates that the identified user action is successful relative to the selected processor action, the action probability distribution can be shifted from one or more probability values corresponding to one or more processor actions associated with lesser difficulty levels to one or more probability values corresponding to one or more processor actions associated with greater difficulty levels. If the outcome indicates that the identified user action is unsuccessful relative to the selected processor action, the action probability distribution can be shifted from one or more probability values corresponding to one or more processor actions associated with greater difficulty levels to one or more probability values corresponding to one or more processor actions associated with lesser difficulty levels. In these cases, the one or more processor actions associated with the lesser difficulty levels preferably includes a processor action that is associated with a difficulty level equal to or greater than the difficulty level of the selected processor action, and the one or more processor actions associated with greater difficulty levels includes a processor action associated with a difficulty level equal to or greater than the difficulty level of the selected processor action.

A learning automaton can optionally be utilized to update the action probability distribution. A learning automaton can be characterized in that any given state of the game move probability distribution determines the state of the next action probability distribution. That is, the next action probability distribution is a function of the current action probability distribution. Advantageously, updating of the action probability distribution using a learning automaton is based on a frequency of the processor action and/or user action, as well as the time ordering of these processor actions. This can be contrasted with purely operating on a frequency of processor action or user actions, and updating the action probability distribution based thereon. Although the present inventions, in their broadest aspects, should not be so limited, it has been found that the use of a learning automaton provides for a more dynamic, accurate, and flexible means of educating the user. The action probability distribution can be updated using any of a variety of learning methodologies, e.g., linear or non-linear updates, absolutely expedient update, reward-penalty update, reward-inaction update, or inaction-penalty update.

In accordance with another aspect of the present inventions, a method of providing learning capability to a processing device having one or more objectives is provided. For example, if the processing device is an educational toy, the objective can be to increase the educational level of a user. The method comprises selecting one of a plurality of processor actions that is associated with a plurality of different difficulty levels, identifying an action performed by the user, and determining an outcome of the selected processor action relative to the identified user action. These steps can be performed in the manner previously described.

The method further comprises updating the action probability distribution based on the outcome and the difficulty level of the selected processor action, and modifying one or more of the processor action selection, outcome determination, and action probability distribution update based on the objective. The method may optionally comprise determining a performance index indicative of a performance of the education toy relative to the objective, in which case, the modification may be based on the performance index. The performance index may be derived from the outcome value and the difficulty level of the selected processor action. It may be cumulative or instantaneous.

In the preferred method, the modification comprises modifying the action probability distribution update, e.g., by selecting one of a predetermined plurality of learning methodologies employed by the action probability distribution update. By way of non-limiting example, if the outcome indicates that the identified user action is successful relative to the selected processor action, a learning methodology that rewards a processor action having a difficulty level equal to or greater than the difficulty level of the selected processor action can be selected, or a learning methodology that penalizes a processor action having a difficulty level equal to or less than said difficulty level of the selected processor action can be selected. If the outcome indicates that the identified user action is unsuccessful relative to the selected processor action, a learning methodology that rewards a processor action having a difficulty level equal to or less than the difficulty level of the selected processor action can be selected, or a learning methodology that penalizes a processor action having a difficulty level equal to or greater than the difficulty level of the selected processor action can be selected.

In accordance with still another aspect of the present inventions, an educational toy having comprises a probabilistic learning module configured for learning a plurality of processor actions in response to a plurality of actions performed by a user. The educational toy further comprises an intuition module configured for modifying a functionality of the probabilistic learning module based on an objective of increasing the educational level of the user, e.g., by selecting one of a plurality of algorithms used by the learning module, or modifying a parameter of an algorithm employed by the learning module. The probabilistic learning module can include a learning automaton or can be purely frequency-based. The intuition module can optionally be further configured for determining a performance index indicative of a performance of the probabilistic learning module relative to the objective, and for modifying the probabilistic learning module functionality based on the performance index.

In the preferred embodiment, the probabilistic learning module may include an action selection module configured for selecting one of a plurality of processor actions associated with a plurality of different difficulty levels. The processor action selection can be based on an action probability distribution comprising a plurality of probability values corresponding to the plurality of processor action. The probabilistic learning module may further comprise an outcome evaluation module configured for determining an outcome of the selected processor action relative to the user action. The probabilistic learning module may further comprise a probability update module configured for updating the action probability distribution based on the outcome and the difficulty level of the selected processor action. When modifying the functionality of the learning module, the intuition module may modify a functionality of any combination of the game move selection module, outcome evaluation module, and probability update module.

In the preferred embodiment, the intuition module modifies the probability update module, e.g., by selecting one of a predetermined plurality of learning methodologies employed by the probability update module. For example, the intuition module can be configured for selecting a learning methodology that, if the outcome indicates that the identified user action is successful relative to the selected processor action, rewards a processor action having a difficulty level equal to or greater than the difficulty level of the selected processor action or penalizes a processor action having a difficulty level equal to or less than the difficulty level of the selected processor action. The intuition module can be further configured for selecting a learning methodology that, if the outcome indicates that the identified user action is unsuccessful relative to the selected processor action, rewards a processor action having a difficulty level equal to or less than the difficulty level of the selected processor action or penalizes a processor action having a difficulty level equal to or greater than the difficulty level of the selected processor action.

BRIEF DESCRIPTION OF THE DRAWINGS

In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Generalized Single-User Program (Single Processor Action-Single User Action)

Figure 1:
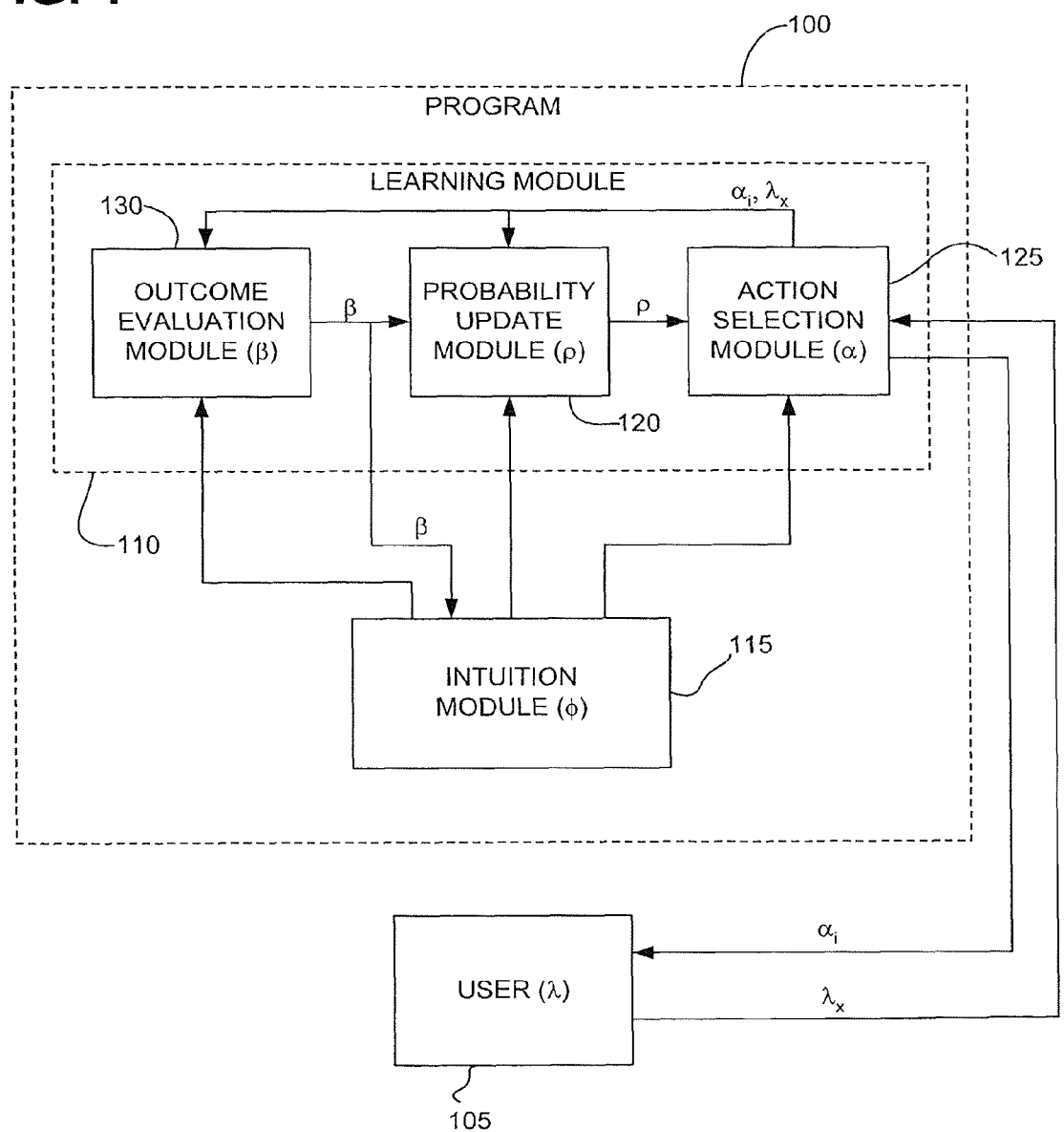
FIG. 1 is a block diagram of a generalized single-user learning software program constructed in accordance with the present inventions, wherein a single-input, single output (SISO) model is assumed.

Referring to FIG. 1, a single-user learning program 100 developed in accordance with the present inventions can be generally implemented to provide intuitive learning capability to any variety of processing devices, e.g., computers, microprocessors, microcontrollers, embedded systems, network processors, and data processing systems. In this embodiment, a single user 105 interacts with the program 100 by receiving a processor action $\alpha_i$ from a processor action set a within the program 100, selecting a user action $\lambda_x$ from a user action set λ based on the received processor action $\alpha_i$, and transmitting the selected user action $\lambda_x$ to the program 100. It should be noted that in alternative embodiments, the user 105 need not receive the processor action $\alpha_i$ to select a user action $\lambda_x$, the selected user action $\lambda_x$ need not be based on the received processor action $\alpha_i$, and/or the processor action $\alpha_i$ may be selected in response to the selected user action $\lambda_x$. The significance is that a processor action $\alpha_i$ and a user action $\lambda_x$ are selected.

The program 100 is capable of learning based on the measured performance of the selected processor action $\alpha_i$ relative to a selected user action $\lambda_x$, which, for the purposes of this specification, can be measured as an outcome value β. It should be noted that although an outcome value β is described as being mathematically determined or generated for purposes of understanding the operation of the equations set forth herein, an outcome value β need not actually be determined or generated for practical purposes. Rather, it is only important that the outcome of the processor action $\alpha_i$ relative to the user action $\lambda_x$ be known. In alternative embodiments, the program 100 is capable of learning based on the measured performance of a selected processor action $\alpha_i$ and/or selected user action $\lambda_x$ relative to other criteria. As will be described in further detail below, program 100 directs its learning capability by dynamically modifying the model that it uses to learn based on a performance index ϕ to achieve one or more objectives.

To this end, the program 100 generally includes a probabilistic learning module 110 and an intuition module 115. The probabilistic learning module 110 includes a probability update module 120, an action selection module 125, and an outcome evaluation module 130. Briefly, the probability update module 120 uses learning automata theory as its learning mechanism with the probabilistic learning module 110 configured to generate and update an action probability distribution p based on the outcome value β. The action selection module 125 is configured to pseudo-randomly select the processor action $\alpha_i$ based on the probability values contained within the action probability distribution p internally generated and updated in the probability update module 120. The outcome evaluation module 130 is configured to determine and generate the outcome value β based on the relationship between the selected processor action $\alpha_i$ and user action $\lambda_x$. The intuition module 115 modifies the probabilistic learning module 110 (e.g., selecting or modifying parameters of algorithms used in learning module 110) based on one or more generated performance indexes ϕ to achieve one or more objectives. A performance index ϕ can be generated directly from the outcome value β or from something dependent on the outcome value β, e.g., the action probability distribution p, in which case the performance index ϕ may be a function of the action probability distribution p, or the action probability distribution p may be used as the performance index ϕ. A performance index ϕ can be cumulative (e.g., it can be tracked and updated over a series of outcome values β or instantaneous (e.g., a new performance index ϕ can be generated for each outcome value β).

Modification of the probabilistic learning module 110 can be accomplished by modifying the functionalities of (1) the probability update module 120 (e.g., by selecting from a plurality of algorithms used by the probability update module 120, modifying one or more parameters within an algorithm used by the probability update module 120, transforming, adding and subtracting probability values to and from, or otherwise modifying the action probability distribution p); (2) the action selection module 125 (e.g., limiting or expanding selection of the action α corresponding to a subset of probability values contained within the action probability distribution p); and/or (3) the outcome evaluation module 130 (e.g., modifying the nature of the outcome value β or otherwise the algorithms used to determine the outcome value β).

Having now briefly discussed the components of the program 100, we will now describe the functionality of the program 100 in more detail. Beginning with the probability update module 120, the action probability distribution p that it generates can be represented by the following equation:

$$p(k) = [p_1(k), p_2(k), p_3(k) \ldots p_n(k)], \qquad [1]$$

where $p_i$ is the action probability value assigned to a specific processor action $\alpha_i$; n is the number of processor actions $\alpha_i$ within the processor action set α, and k is the incremental time at which the action probability distribution was updated.

Preferably, the action probability distribution p at every time k should satisfy the following requirement:

$$\sum_{i=1}^{n} p_i(k) = 1, 0 \le p_i(k) \le 1. \quad [2]$$

Thus, the internal sum of the action probability distribution p, i.e., the action probability values $p_i$ for all processor actions $\alpha_i$ within the processor action set $\alpha$ is always equal "1," as dictated by the definition of probability. It should be noted that the number n of processor actions $\alpha_i$ need not be fixed, but can be dynamically increased or decreased during operation of the program 100.

The probability update module 120 uses a stochastic learning automaton, which is an automaton that operates in a random environment and updates its action probabilities in accordance with inputs received from the environment so as to improve its performance in some specified sense. A learning automaton can be characterized in that any given state of the action probability distribution p determines the state of the next action probability distribution p. For example, the probability update module 120 operates on the action probability distribution p(k) to determine the next action probability distribution p(k+1), i.e., the next action probability distribution p(k+1) is a function of the current action probability distribution p(k). Advantageously, updating of the action probability distribution p using a learning automaton is based on a frequency of the processor actions $\alpha_i$ and/or user actions $\lambda_x$, as well as the time ordering of these actions. This can be contrasted with purely operating on a frequency of processor actions $\alpha_i$ or user actions $\lambda_x$, and updating the action probability distribution p(k) based thereon. Although the present inventions, in their broadest aspects, should not be so limited, it has been found that the use of a learning automaton provides for a more dynamic, accurate, and flexible means of teaching the probabilistic learning module 110.

In this scenario, the probability update module 120 uses a single learning automaton with a single input to a single-teacher environment (with the user 105 as the teacher), and thus, a single-input, single-output (SISO) model is assumed.

To this end, the probability update module 120 is configured to update the action probability distribution p based on the law of reinforcement, the basic idea of which is to reward a favorable action and/or to penalize an unfavorable action. A specific processor action $\alpha_i$ is rewarded by increasing the corresponding current probability value $p_i(k)$ and decreasing all other current probability values $p_j(k)$, while a specific processor action $\alpha_i$ is penalized by decreasing the corresponding current probability value $p_i(k)$ and increasing all other current probability values $p_j(k)$. Whether the selected processor action $\alpha_i$ is rewarded or punished will be based on the outcome value $\beta$ generated by the outcome evaluation module 130. For the purposes of this specification, an action probability distribution p is updated by changing the probability values $p_i$ within the action probability distribution p, and does not contemplate adding or subtracting probability values $p_i$.

To this end, the probability update module 120 uses a learning methodology to update the action probability distribution p, which can mathematically be defined as:

$$p(k+1) = T[p(k), \alpha_i(k), \beta(k)], \quad [3]$$

where p(k+1) is the updated action probability distribution, T is the reinforcement scheme, p(k) is the current action probability distribution, $\alpha_i(k)$ is the previous processor action, $\beta(k)$ is latest outcome value, and k is the incremental time at which the action probability distribution was updated.

Alternatively, instead of using the immediately previous processor action $\alpha_i(k)$, any set of previous processor action, e.g., $\alpha(k-1)$, $\alpha(k-2)$, $\alpha(k-3)$, etc., can be used for lag learning, and/or a set of future processor action, e.g., $\alpha(k+1)$, $\alpha(k+2)$, $\alpha(k+3)$, etc., can be used for lead learning. In the case of lead learning, a future processor action is selected and used to determine the updated action probability distribution p(k+1).

The types of learning methodologies that can be utilized by the probability update module 120 are numerous, and depend on the particular application. For example, the nature of the outcome value $\beta$ can be divided into three types: (1) P-type, wherein the outcome value $\beta$ can be equal to "1" indicating success of the processor action $\alpha_i$, and "0" indicating failure of the processor action $\alpha_i$; (2) Q-type, wherein the outcome value $\beta$ can be one of a finite number of values between "0" and "1" indicating a relative success or failure of the processor action $\alpha_i$; or (3) S-Type, wherein the outcome value $\beta$ can be a continuous value in the interval [0,1] also indicating a relative success or failure of the processor action $\alpha_i$.

The outcome value $\beta$ can indicate other types of events besides successful and unsuccessful events. The time dependence of the reward and penalty probabilities of the actions $\alpha$ can also vary. For example, they can be stationary if the probability of success for a processor action $\alpha_i$ does not depend on the index k, and non-stationary if the probability of success for the processor action $\alpha_i$ depends on the index k. Additionally, the equations used to update the action probability distribution p can be linear or non-linear. Also, a processor action $\alpha_i$ can be rewarded only, penalized only, or a combination thereof. The convergence of the learning methodology can be of any type, including ergodic, absolutely expedient, $\epsilon$-optimal, or optimal. The learning methodology can also be a discretized, estimator, pursuit, hierarchical, pruning, growing or any combination thereof.

Of special importance is the estimator learning methodology, which can advantageously make use of estimator tables and algorithms should it be desired to reduce the processing otherwise requiring for updating the action probability distribution for every processor action $\alpha_i$ that is received. For example, an estimator table may keep track of the number of successes and failures for each processor action $\alpha_i$ received, and then the action probability distribution p can then be periodically updated based on the estimator table by, e.g., performing transformations on the estimator table. Estimator tables are especially useful when multiple users are involved, as will be described with respect to the multi-user embodiments described later.

In the preferred embodiment, a reward function $g_j$ and a penalization function $h_j$ is used to accordingly update the current action probability distribution p(k). For example, a general updating scheme applicable to P-type, Q-type and S-type methodologies can be given by the following SISO equations:

$$p_j(k+1) = p_j(k) - \beta(k)g_j(p(k)) + (1 - \beta(k))h_j(p(k)), \quad [4]$$
$$\text{if } \alpha(k) \ne \alpha_i$$

$$p_i(k+1) = p_i(k) + \beta(k)\sum_{\substack{j=1 \\ j \ne i}}^{n} g_j(p(k)) - (1 - \beta(k))\sum_{\substack{j=1 \\ j \ne i}}^{n} h_j(p(k)), \quad [5]$$
$$\text{if } \alpha(k) = \alpha_i$$

where i is an index for a processor action $\alpha_i$, selected to be rewarded or penalized, and j is an index for the remaining processor actions $\alpha_j$.

Assuming a P-type methodology, equations [4] and [5] can be broken down into the following equations:

$$p_i(k+1) = p_i(k) + \sum_{\substack{j=1 \\ j \neq i}}^{n} g_j(p(k)); \text{ and} \quad [6]$$

$$p_j(k+1) = p_j(k) - g_j(p(k)), \text{ when } \beta(k) = 1 \text{ and } \alpha_i \text{ is selected} \quad [7]$$

$$p_i(k+1) = p_i(k) - \sum_{\substack{j=1 \\ j \neq i}}^{n} h_j(p(k)); \text{ and} \quad [8]$$

$$p_j(k+1) = p_j(k) + h_j(p(k)), \text{ when } \beta(k) = 0 \text{ and } \alpha_i \text{ is selected} \quad [9]$$

Preferably, the reward function $g_j$ and penalty function $h_j$ are continuous and nonnegative for purposes of mathematical convenience and to maintain the reward and penalty nature of the updating scheme. Also, the reward function $g_j$ and penalty function $h_j$ are preferably constrained by the following equations to ensure that all of the components of $p(k+1)$ remain in the $(0,1)$ interval when $p(k)$ is in the $(0,1)$ interval:

$$0 < g_j(p) < p_j;$$

$$0 < \sum_{\substack{j=1 \\ j \neq i}}^{n} (p_j + h_j(p)) < 1$$

for all $p_j \in (0, 1)$ and all $j = 1, 2, \ldots n$.

The updating scheme can be of the reward-penalty type, in which case, both $g_j$ and $h_j$ are non-zero. Thus, in the case of a P-type methodology, the first two updating equations [6] and [7] will be used to reward the processor action $\alpha_i$, e.g., when successful, and the last two updating equations [8] and [9] will be used to penalize processor action $\alpha_i$, e.g., when unsuccessful. Alternatively, the updating scheme is of the reward-inaction type, in which case, $g_j$ is nonzero and $h_j$ is zero. Thus, the first two general updating equations [6] and [7] will be used to reward the processor action $\alpha_i$, e.g., when successful, whereas the last two general updating equations [8] and [9] will not be used to penalize processor action $\alpha_i$, e.g., when unsuccessful. More alternatively, the updating scheme is of the penalty-inaction type, in which case, $g_j$ is zero and $h_j$ is nonzero. Thus, the first two general updating equations [6] and [7] will not be used to reward the processor action $\alpha_i$, e.g., when successful, whereas the last two general updating equations [8] and [9] will be used to penalize processor action $\alpha_i$, e.g., when unsuccessful. The updating scheme can even be of the reward-reward type (in which case, the processor action $\alpha_i$ is rewarded more, e.g., when it is more successful than when it is not) or penalty-penalty type (in which case, the processor action $\alpha_i$ is penalized more, e.g., when it is less successful than when it is).

It should be noted that with respect to the probability distribution p as a whole, any typical updating scheme will have both a reward aspect and a penalty aspect to the extent that a particular processor action $\alpha_i$ that is rewarded will penalize the remaining processor actions $\alpha_j$, and any particular processor action $\alpha_i$ that penalized will reward the remaining processor actions $\alpha_j$. This is because any increase in a probability value $p_i$ will relatively decrease the remaining probability values $p_j$, and any decrease in a probability value $p_i$ will relatively increase the remaining probability values $p_j$. For the purposes of this specification, however, a particular processor action $\alpha_i$ is only rewarded if its corresponding probability value $p_i$ is increased in response to an outcome value $\beta$ associated with it, and a processor action $\alpha_i$ is only penalized if its corresponding probability value $p_i$ is decreased in response to an outcome value $\beta$ associated with it.

The nature of the updating scheme is also based on the functions $g_j$ and $h_j$ themselves. For example, the functions $g_j$ and $h_j$ can be linear, in which case, e.g., they can be characterized by the following equations:

$$g_j(p(k)) = ap_j(k), 0 < a < 1; \text{ and} \quad [10]$$

$$h_j(p(k)) = \frac{b}{n-1} - bp_j(k), 0 < b < 1 \quad [11]$$

where a is the reward parameter, and b is the penalty parameter.

The functions $g_j$ and $h_j$ can alternatively be absolutely expedient, in which case, e.g., they can be characterized by the following equations:

$$\frac{g_1(p)}{p_1} = \frac{g_2(p)}{p_2} = \ldots = \frac{g_n(p)}{p_n}; \quad [12]$$

$$\frac{h_1(p)}{p_1} = \frac{h_2(p)}{p_2} = \ldots = \frac{h_n(p)}{p_n} \quad [13]$$

The functions $g_j$ and $h_j$ can alternatively be non-linear, in which case, e.g., they can be characterized by the following equations:

$$g_i(p(k)) = p_j(k) - F(p_j(k)); \quad [14]$$

$$h_j(p(k)) = \frac{p_i(k) - F(p_i(k))}{n-1} \quad [15]$$

and $F(x) = ax^m, m = 2, 3, \ldots$

It should be noted that equations [4] and [5] are not the only general equations that can be used to update the current action probability distribution $p(k)$ using a reward function $g_j$ and a penalization function $h_j$. For example, another general updating scheme applicable to P-type, Q-type and S-type methodologies can be given by the following SISO equations:

$$p_j(k+1) = p_j(k) - \beta(k)c_j g_i(p(k)) + (1-\beta(k))d_j h_i(p(k)), \text{ if } \alpha(k) \neq \alpha_i \quad [16]$$

$$p_i(k+1) = p_i(k) + \beta(k)g_i(p(k)) - (1-\beta(k))h_i(p(k)), \text{ if } \alpha(k) = \alpha_i \quad [17]$$

where c and d are constant or variable distribution multipliers that adhere to the following constraints:

$$\sum_{\substack{j=1 \\ i \neq j}}^{n} c_j g_i(p(k)) = g_i(p(k));$$

$$\sum_{\substack{j=1 \\ i \neq j}}^{n} d_j h_i(p(k)) = h_i(p(k))$$

In other words, the multipliers c and d are used to determine what proportions of the amount that is added to or subtracted from the probability value $p_i$ is redistributed to the remaining probability values $p_j$.

Assuming a P-type methodology, equations [16] and [17] can be broken down into the following equations:

$$p_i(k+1)=p_i(k)+g_i(p(k)); \text{ and} \qquad [18]$$

$$p_j(k+1)=p_j(k)-c_j g_i(p(k)), \text{ when } \beta(k)=1 \text{ and } \alpha_i \text{ is selected} \qquad [19]$$

$$p_i(k+1)=p_i(k)-h_i(p(k)); \text{ and} \qquad [20]$$

$$p_j(k+1)=p_j(k)+d_j h_i(p(k)), \text{ when } \beta(k)=0 \text{ and } \alpha_i \text{ is selected} \qquad [21]$$

It can be appreciated that equations [4]-[5] and [16]-[17] are fundamentally similar to the extent that the amount that is added to or subtracted from the probability value $p_i$ is subtracted from or added to the remaining probability values $p_j$. The fundamental difference is that, in equations [4]-[5], the amount that is added to or subtracted from the probability value $p_i$ is based on the amounts that are subtracted from or added to the remaining probability values $p_j$ (i.e., the amounts added to or subtracted from the remaining probability values $p_j$ are calculated first), whereas in equations [16]-[17], the amounts that are added to or subtracted from the remaining probability values $p_j$ are based on the amount that is subtracted from or added to the probability value $p_i$ (i.e., the amount added to or subtracted from the probability value $p_i$ is calculated first). It should also be noted that equations [4]-[5] and [16]-[17] can be combined to create new learning methodologies. For example, the reward portions of equations [4]-[5] can be used when an action $\alpha_i$ is to be rewarded, and the penalty portions of equations [16]-[17] can be used when an action $\alpha_i$ is to be penalized.

Previously, the reward and penalty functions $g_j$ and $h_j$ and multipliers $c_j$ and $d_j$ have been described as being one-dimensional with respect to the current action $\alpha_i$ that is being rewarded or penalized. That is, the reward and penalty functions $g_j$ and $h_j$ and multipliers $c_j$ and $d_j$ are the same given any action $\alpha_i$. It should be noted, however, that multi-dimensional reward and penalty functions $g_{ij}$ and $h_{ij}$ and multipliers $c_{ij}$ and $d_{ij}$ can be used.

In this case, the single dimensional reward and penalty functions $g_j$ and $h_j$ of equations [6]-[9] can be replaced with the two-dimensional reward and penalty functions $g_{ij}$ and $h_{ij}$, resulting in the following equations:

$$p_i(k+1) = p_i(k) + \sum_{\substack{j=1 \\ j \neq i}}^{n} g_{ij}(p(k)); \text{ and} \qquad [6a]$$

$$p_j(k+1) = p_j(k) - g_{ij}(p(k)), \qquad [7a]$$
when $\beta(k) = 1$ and $\alpha_i$ is selected $$p_i(k+1) = p_i(k) - \sum_{\substack{j=1 \\ j \neq i}}^{n} h_{ij}(p(k)); \text{ and} \qquad [8a]$$

$$p_j(k+1) = p_j(k) + h_{ij}(p(k)), \qquad [9a]$$
when $\beta(k) = 0$ and $\alpha_i$ is selected The single dimensional multipliers $c_j$ and $d_j$ of equations [19] and [21] can be replaced with the two-dimensional multipliers $c_{ij}$ and $d_{ij}$, resulting in the following equations:

$$p_j(k+1)=p_j(k)-c_{ij}g_i(p(k)), \text{ when } \beta(k)=1 \text{ and } \alpha_i \text{ is selected} \qquad [19a]$$

$$p_j(k+1)=p_j(k)+d_{ij}h_i(p(k)), \text{ when } \beta(k)=0 \text{ and } \alpha_i \text{ is selected} \qquad [21a]$$

Thus, it can be appreciated, that equations [19a] and [21a] can be expanded into many different learning methodologies based on the particular action $\alpha_i$ that has been selected.

Further details on learning methodologies are disclosed in "Learning Automata An Introduction," Chapter 4, Narendra, Kumpati, Prentice Hall (1989) and "Learning Algorithms-Theory and Applications in Signal Processing, Control and Communications," Chapter 2, Mars, Phil, CRC Press (1996), which are both expressly incorporated herein by reference.

The intuition module 115 directs the learning of the program 100 towards one or more objectives by dynamically modifying the probabilistic learning module 110. The intuition module 115 specifically accomplishes this by operating on one or more of the probability update module 120, action selection module 125, or outcome evaluation module 130 based on the performance index φ, which, as briefly stated, is a measure of how well the program 100 is performing in relation to the one or more objective to be achieved. The intuition module 115 may, e.g., take the form of any combination of a variety of devices, including an (1) evaluator, data miner, analyzer, feedback device, stabilizer; (2) decision maker; (3) expert or rule-based system; (4) artificial intelligence, fuzzy logic, neural network, or genetic methodology; (5) directed learning device; (6) statistical device, estimator, predictor, regressor, or optimizer. These devices may be deterministic, pseudo-deterministic, or probabilistic.

Figure 2:
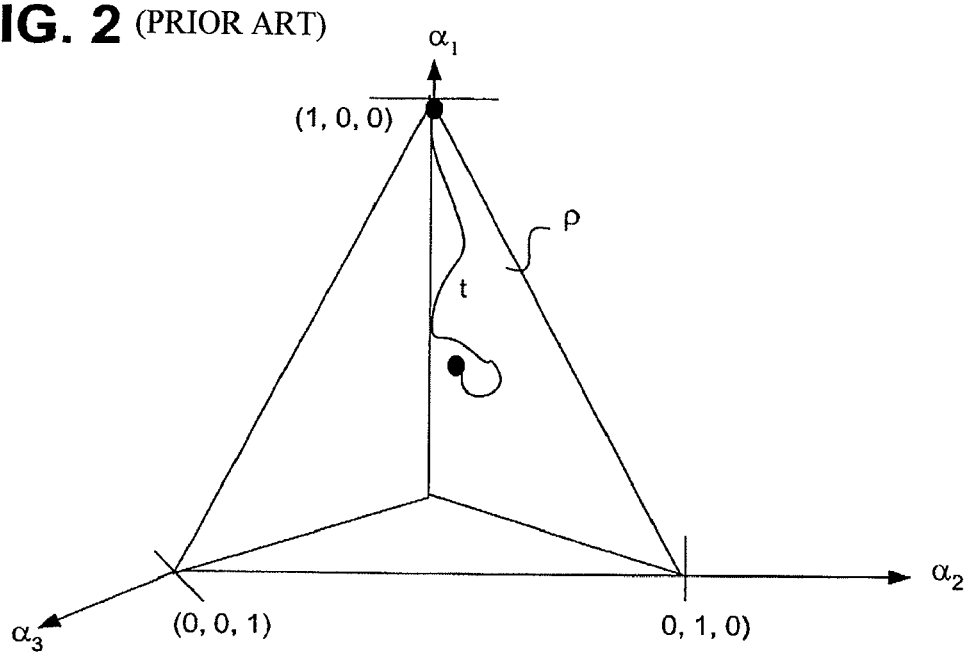
FIG. 2 is a diagram illustrating the generation of probability values for three actions over time in a prior art learning automaton.
Figure 3:
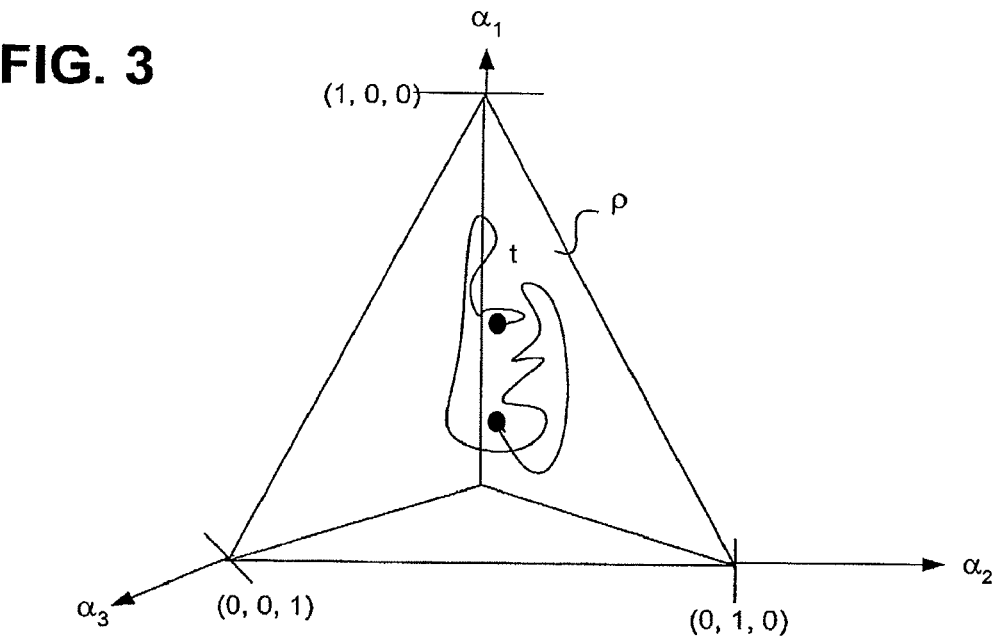
FIG. 3 is a diagram illustrating the generation of probability values for three actions over time in the single-user learning software program of FIG. 1.

It is worth noting that absent modification by the intuition module 115, the probabilistic learning module 110 would attempt to determine a single best action or a group of best actions for a given predetermined environment as per the objectives of basic learning automata theory. That is, if there is a unique action that is optimal, the unmodified probabilistic learning module 110 will substantially converge to it. If there is a set of actions that are optimal, the unmodified probabilistic learning module 110 will substantially converge to one of them, or oscillate (by pure happenstance) between them. In the case of a changing environment, however, the performance of an unmodified learning module 110 would ultimately diverge from the objectives to be achieved. FIGS. 2 and 3 are illustrative of this point. Referring specifically to FIG. 2, a graph illustrating the action probability values $p_i$ of three different actions $\alpha_1$, $\alpha_2$, and $\alpha_3$, as generated by a prior art learning automaton over time t, is shown. As can be seen, the action probability values $p_i$ for the three actions are equal at the beginning of the process, and meander about on the probability plane p, until they eventually converge to unity for a single action, in this case, $\alpha_1$. Thus, the prior art learning automaton assumes that there is always a single best action over time t and works to converge the selection to this best action. Referring specifically to FIG. 3, a graph illustrating the action probability values $p_i$ of three different actions $\alpha_1$, $\alpha_2$, and $\alpha_3$, as generated by the program 100 over time t, is shown. Like with the prior art learning automaton, action probability values $p_i$ for the three action are equal at t=0. Unlike with the prior art learning automaton, however, the action probability values $p_i$ for the three actions meander about on the probability plane p without ever converging to a single action. Thus, the program 100 does not assume that there is a single best action over time t, but rather assumes that there is a dynamic best action that changes over time t. Because the action probability value for any best action will not be unity, selection of the best action at any given time t is not ensured, but will merely tend to occur, as dictated by its corresponding probability value. Thus, the program 100 ensures that the objective(s) to be met are achieved over time t.

Figure 4:
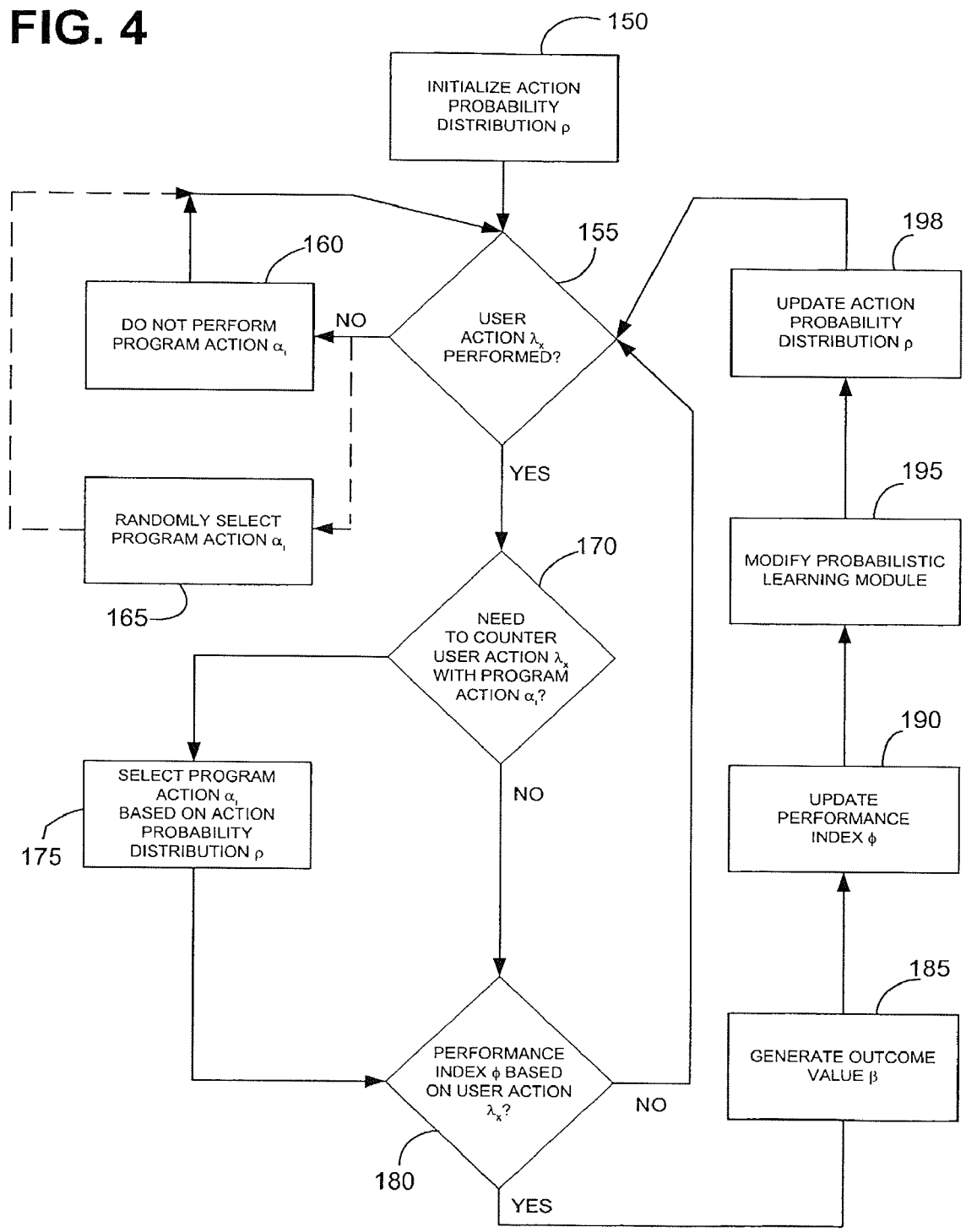
FIG. 4 is a flow diagram illustrating a preferred method performed by the program of FIG. 1.

Having now described the interrelationships between the components of the program 100 and the user 105, we now generally describe the methodology of the program 100. Referring to FIG. 4, the action probability distribution p is initialized (step 150). Specifically, the probability update module 120 initially assigns equal probability values to all processor actions $\alpha_i$, in which case, the initial action probability distribution p(k) can be represented by

$$p_1(0) = p_2(0) = p_2(0) = \ldots p_n(0) = \frac{1}{n}.$$

Thus, each of the processor actions $\alpha_i$ has an equal chance of being selected by the action selection module 125. Alternatively, the probability update module 120 initially assigns unequal probability values to at least some of the processor actions $\alpha_i$, e.g., if the programmer desires to direct the learning of the program 100 towards one or more objectives quicker. For example, if the program 100 is a computer game and the objective is to match a novice game player's skill level, the easier processor action $\alpha_i$, and in this case game moves, may be assigned higher probability values, which as will be discussed below, will then have a higher probability of being selected. In contrast, if the objective is to match an expert game player's skill level, the more difficult game moves may be assigned higher probability values.

Once the action probability distribution p is initialized at step 150, the action selection module 125 determines if a user action $\lambda_x$ has been selected from the user action set $\lambda$ (step 155). If not, the program 100 does not select a processor action $\alpha_i$ from the processor action set $\alpha$ (step 160), or alternatively selects a processor action $\alpha_i$, e.g., randomly, notwithstanding that a user action $\lambda_x$ has not been selected (step 165), and then returns to step 155 where it again determines if a user action $\lambda_x$ has been selected. If a user action $\lambda_x$ has been selected at step 155, the action selection module 125 determines the nature of the selected user action $\lambda_x$, i.e., whether the selected user action $\lambda_x$ is of the type that should be countered with a processor action $\alpha_i$ and/or whether the performance index $\phi$ can be based, and thus whether the action probability distribution p should be updated. For example, again, if the program 100 is a game program, e.g., a shooting game, a selected user action $\lambda_x$ that merely represents a move may not be a sufficient measure of the performance index $\phi$, but should be countered with a processor action $\alpha_i$, while a selected user action $\lambda_x$ that represents a shot may be a sufficient measure of the performance index $\phi$.

Specifically, the action selection module 125 determines whether the selected user action $\lambda_x$ is of the type that should be countered with a processor action $\alpha_i$ (step 170). If so, the action selection module 125 selects a processor action $\alpha_i$ from the processor action set a based on the action probability distribution p (step 175). After the performance of step 175 or if the action selection module 125 determines that the selected user action $\lambda_x$ is not of the type that should be countered with a processor action $\alpha_i$, the action selection module 125 determines if the selected user action $\lambda_x$ is of the type that the performance index $\phi$ is based on (step 180).

If so, the outcome evaluation module 130 quantifies the performance of the previously selected processor action $\alpha_i$ (or a more previous selected processor action $\alpha_i$ in the case of lag learning or a future selected processor action $\alpha_i$ in the case of lead learning) relative to the currently selected user action $\lambda_x$ by generating an outcome value $\beta$ (step 185). The intuition module 115 then updates the performance index $\phi$ based on the outcome value $\beta$, unless the performance index $\phi$ is an instantaneous performance index that is represented by the outcome value $\beta$ itself (step 190). The intuition module 115 then modifies the probabilistic learning module 110 by modifying the functionalities of the probability update module 120, action selection module 125, or outcome evaluation module 130 (step 195). It should be noted that step 190 can be performed before the outcome value $\beta$ is generated by the outcome evaluation module 130 at step 180, e.g., if the intuition module 115 modifies the probabilistic learning module 110 by modifying the functionality of the outcome evaluation module 130. The probability update module 120 then, using any of the updating techniques described herein, updates the action probability distribution p based on the generated outcome value $\beta$ (step 198).

The program 100 then returns to step 155 to determine again whether a user action $\lambda_x$ has been selected from the user action set $\lambda$. It should be noted that the order of the steps described in FIG. 4 may vary depending on the specific application of the program 100.

Single-Player Game Program (Single Game Move-Single Player Move)

Figure 5:
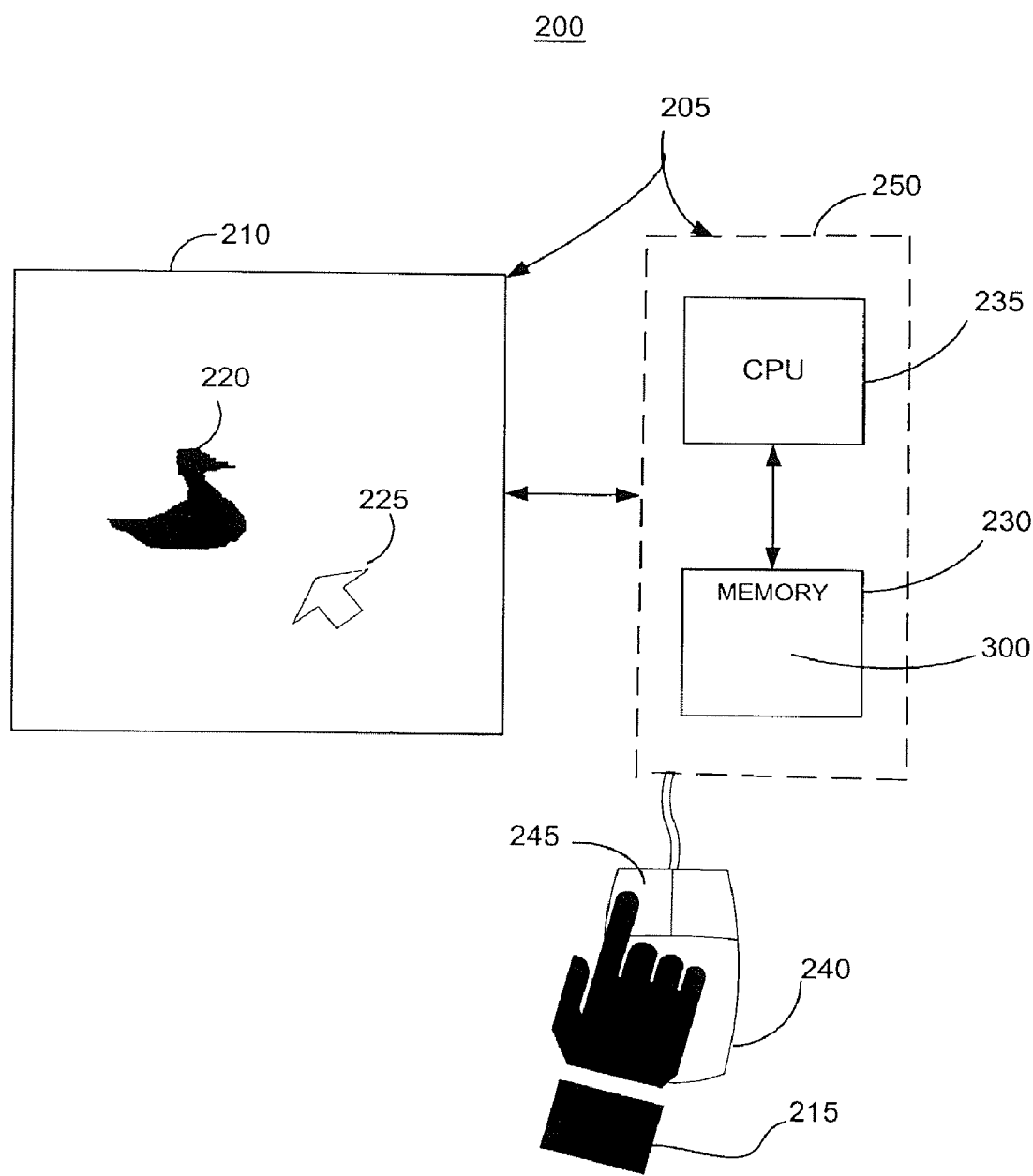
FIG. 5 is a block diagram of a single-player duck hunting game to which the generalized program of FIG. 1 can be applied.

Having now generally described the components and functionality of the learning program 100, we now describe one of its various applications. Referring to FIG. 5, a single-player game program 300 (shown in FIG. 8) developed in accordance with the present inventions is described in the context of a duck hunting game 200. The game 200 comprises a computer system 205, which, e.g., takes the form of a personal desktop or laptop computer. The computer system 205 includes a computer screen 210 for displaying the visual elements of the game 200 to a player 215, and specifically, a computer animated duck 220 and a gun 225, which is represented by a mouse cursor. For the purposes of this specification, the duck 220 and gun 225 can be broadly considered to be computer and user-manipulated objects, respectively. The computer system 205 further comprises a computer console 250, which includes memory 230 for storing the game program 300, and a CPU 235 for executing the game program 300. The computer system 205 further includes a computer mouse 240 with a mouse button 245, which can be manipulated by the player 215 to control the operation of the gun 225, as will be described immediately below. It should be noted that although the game 200 has been illustrated as being embodied in a standard computer, it can very well be implemented in other types of hardware environments, such as a video game console that receives video game cartridges and connects to a television screen, or a video game machine of the type typically found in video arcades.

Figure 6:
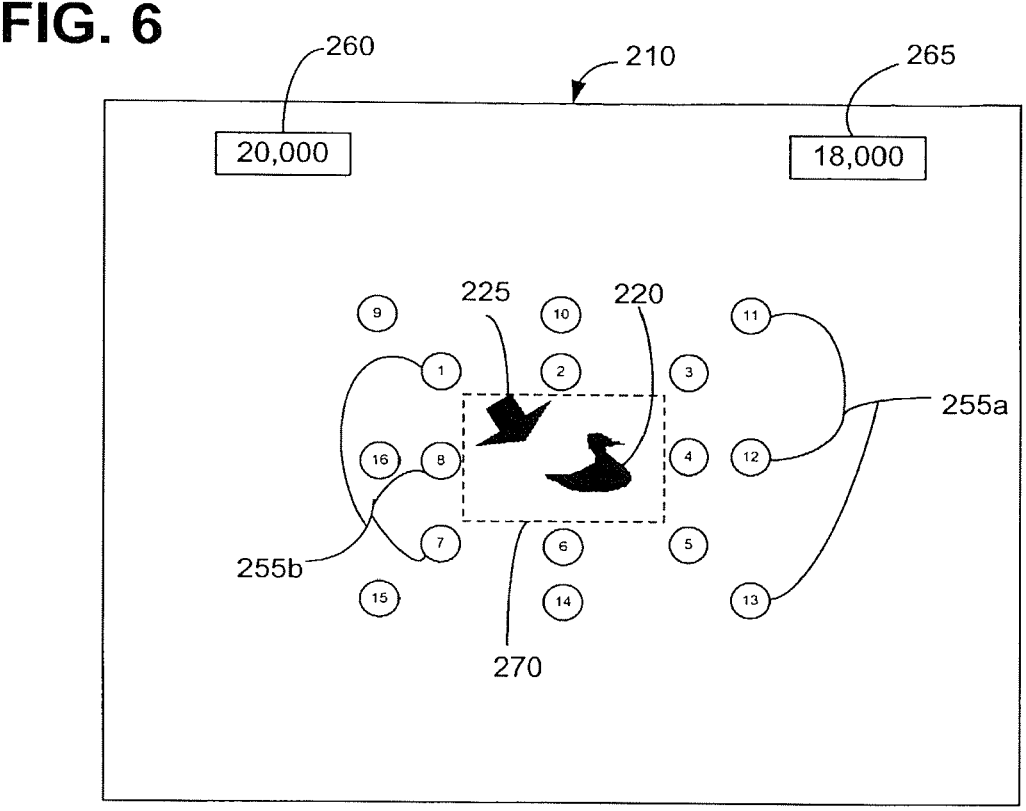
FIG. 6 is a plan view of a computer screen used in the duck hunting game of FIG. 5, wherein a gun is particularly shown shooting a duck.
Figure 7:
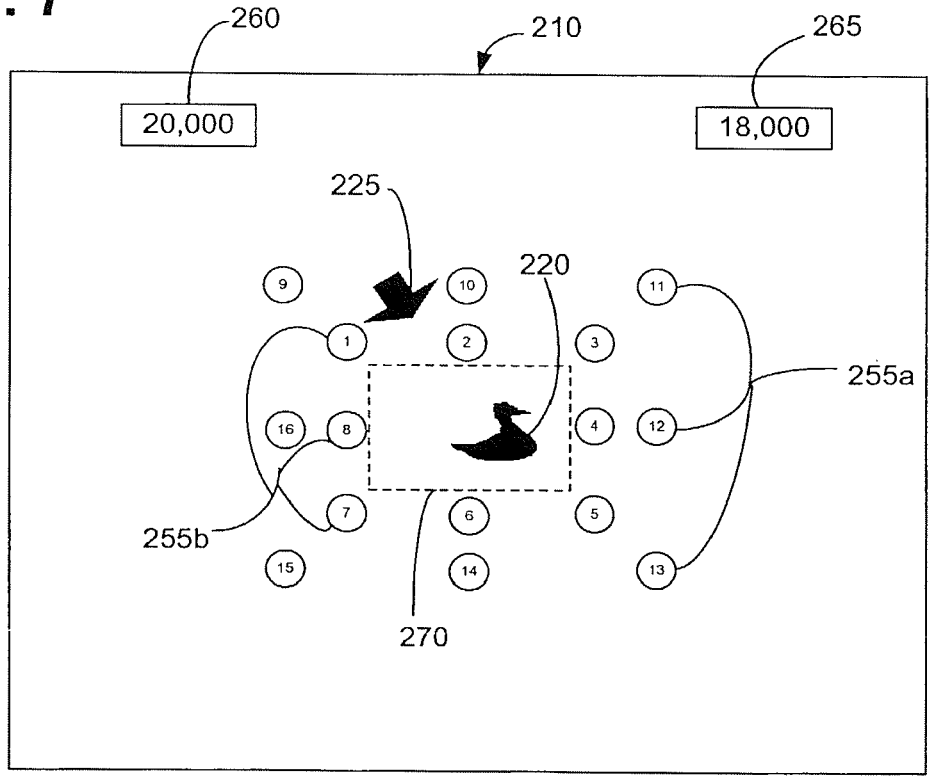
FIG. 7 is a plan view of a computer screen used in the duck hunting game of FIG. 5, wherein a duck is particularly shown moving away from the gun.

Referring specifically to the computer screen 210 of FIGS. 6 and 7, the rules and objective of the duck hunting game 200 will now be described. The objective of the player 215 is to shoot the duck 220 by moving the gun 225 towards the duck 220, intersecting the duck 220 with the gun 225, and then firing the gun 225 (FIG. 6). The player 215 accomplishes this by laterally moving the mouse 240, which correspondingly moves the gun 225 in the direction of the mouse movement, and clicking the mouse button 245, which fires the gun 225. The objective of the duck 220, on the other hand, is to avoid from being shot by the gun 225. To this end, the duck 220 is surrounded by a gun detection region 270, the breach of which by the gun 225 prompts the duck 220 to select and make one of seventeen moves 255 (eight outer moves 255*a*, eight inner moves 255b, and a non-move) after a preprogrammed delay (move 3 in FIG. 7). The length of the delay is selected, such that it is not so long or short as to make it too easy or too difficult to shoot the duck 220. In general, the outer moves 255a more easily evade the gun 225 than the inner moves 255b, thus, making it more difficult for the player 215 to shot the duck 220.

For purposes of this specification, the movement and/or shooting of the gun 225 can broadly be considered to be a player move, and the discrete moves of the duck 220 can broadly be considered to be computer or game moves, respectively. Optionally or alternatively, different delays for a single move can also be considered to be game moves. For example, a delay can have a low and high value, a set of discrete values, or a range of continuous values between two limits. The game 200 maintains respective scores 260 and 265 for the player 215 and duck 220. To this end, if the player 215 shoots the duck 220 by clicking the mouse button 245 while the gun 225 coincides with the duck 220, the player score 260 is increased. In contrast, if the player 215 fails to shoot the duck 220 by clicking the mouse button 245 while the gun 225 does not coincide with the duck 220, the duck score 265 is increased. The increase in the score can be fixed, one of a multitude of discrete values, or a value within a continuous range of values.

As will be described in further detail below, the game 200 increases its skill level by learning the player's 215 strategy and selecting the duck's 220 moves based thereon, such that it becomes more difficult to shoot the duck 220 as the player 215 becomes more skillful. The game 200 seeks to sustain the player's 215 interest by challenging the player 215. To this end, the game 200 continuously and dynamically matches its skill level with that of the player 215 by selecting the duck's 220 moves based on objective criteria, such as, e.g., the difference between the respective player and game scores 260 and 265. In other words, the game 200 uses this score difference as a performance index $\phi$ in measuring its performance in relation to its objective of matching its skill level with that of the game player. In the regard, it can be said that the performance index $\phi$ is cumulative. Alternatively, the performance index $\phi$ can be a function of the game move probability distribution p.

Figure 8:
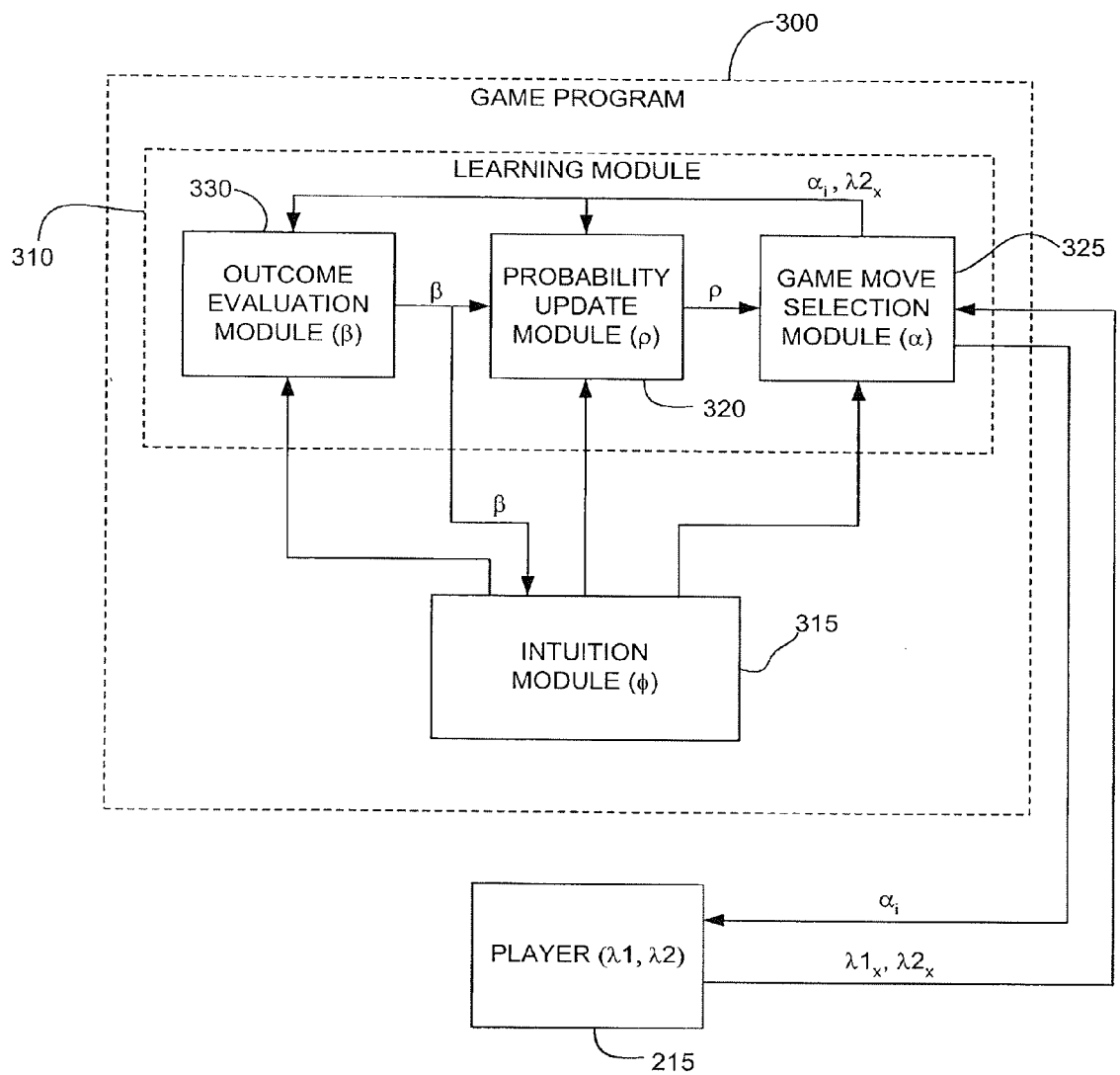
FIG. 8 is a block diagram of a single-player game program employed in the duck hunting game of FIG. 5.

Referring further to FIG. 8, the game program 300 generally includes a probabilistic learning module 310 and an intuition module 315, which are specifically tailored for the game 200. The probabilistic learning module 310 comprises a probability update module 320, a game move selection module 325, and an outcome evaluation module 330. Specifically, the probability update module 320 is mainly responsible for learning the player's 215 strategy and formulating a counterstrategy based thereon, with the outcome evaluation module 330 being responsible for evaluating moves performed by the game 200 relative to moves performed by the player 215. The game move selection module 325 is mainly responsible for using the updated counterstrategy to move the duck 220 in response to moves by the gun 225. The intuition module 315 is responsible for directing the learning of the game program 300 towards the objective, and specifically, dynamically and continuously matching the skill level of the game 200 with that of the player 215. In this case, the intuition module 315 operates on the game move selection module 325, and specifically selects the methodology that the game move selection module 325 will use to select a game move $\alpha_i$ from the game move set $\alpha$ as will be discussed in further detail below. In the preferred embodiment, the intuition module 315 can be considered deterministic in that it is purely rule-based.

Alternatively, however, the intuition module 315 can take on a probabilistic nature, and can thus be quasi-deterministic or entirely probabilistic.

To this end, the game move selection module 325 is configured to receive a player move $\lambda 1_x$ from the player 215, which takes the form of a mouse 240 position, i.e., the position of the gun 225, at any given time. In this embodiment, the player move $\lambda 1_x$ can be selected from a virtually infinite player move set $\lambda 1$, i.e., the number of player moves $\lambda 1_x$ are only limited by the resolution of the mouse 240. Based on this, the game move selection module 325 detects whether the gun 225 is within the detection region 270, and if so, selects a game move $\alpha_i$ from the game move set $\alpha$, and specifically, one of the seventeen moves 255 that the duck 220 can make. The game move $\alpha_i$ manifests itself to the player 215 as a visible duck movement.

The game move selection module 325 selects the game move $\alpha_i$ based on the updated game strategy. To this end, the game move selection module 325 is further configured to receive the game move probability distribution p from the probability update module 320, and pseudo-randomly selecting the game move $\alpha_i$ based thereon. The game move probability distribution p is similar to equation [1] and can be represented by the following equation:

$$p(k)=[p_1(k), p_2(k), p_3(k) \ldots p_n(k)], \quad [1\text{-}1]$$

where $p_i$ is the game move probability value assigned to a specific game move $\alpha_i$; n is the number of game moves $\alpha_i$ within the game move set $\alpha$, and k is the incremental time at which the game move probability distribution was updated.

It is noted that pseudo-random selection of the game move $\alpha_i$ allows selection and testing of any one of the game moves $\alpha_i$, with those game moves $\alpha_i$ corresponding to the highest probability values being selected more often. Thus, without the modification, the game move selection module 325 will tend to more often select the game move $\alpha_i$ to which the highest probability value $p_i$ corresponds, so that the game program 300 continuously improves its strategy, thereby continuously increasing its difficulty level.

Because the objective of the game 200 is sustainability, i.e., dynamically and continuously matching the respective skill levels of the game 200 and player 215, the intuition module 315 is configured to modify the functionality of the game move selection module 325 based on the performance index $\phi$, and in this case, the current skill level of the player 215 relative to the current skill level of the game 200. In the preferred embodiment, the performance index $\phi$ is quantified in terms of the score difference value $\Delta$ between the player score 260 and the duck score 265. The intuition module 315 is configured to modify the functionality of the game move selection module 325 by subdividing the game move set a into a plurality of game move subsets $\alpha_s$, one of which will be selected by the game move selection module 325. In an alternative embodiment, the game move selection module 325 may also select the entire game move set $\alpha$. In another alternative embodiment, the number and size of the game move subsets $\alpha_s$ can be dynamically determined.

In the preferred embodiment, if the score difference value $\Delta$ is substantially positive (i.e., the player score 260 is substantially higher than the duck score 265), the intuition module 315 will cause the game move selection module 325 to select a game move subset $\alpha_s$, the corresponding average probability value of which will be relatively high, e.g., higher than the median probability value of the game move probability distribution p. As a further example, a game move subset $\alpha_s$ corresponding to the highest probability values within the game move probability distribution p can be selected. In this manner, the skill level of the game 200 will tend to quickly increase in order to match the player's 215 higher skill level.

If the score difference value Δ is substantially negative (i.e., the player score 260 is substantially lower than the duck score 265), the intuition module 315 will cause the game move selection module 325 to select a game move subset $\alpha_s$, the corresponding average probability value of which will be relatively low, e.g., lower than the median probability value of the game move probability distribution p. As a further example, a game move subset $\alpha_s$, corresponding to the lowest probability values within the game move probability distribution p can be selected. In this manner, the skill level of the game 200 will tend to quickly decrease in order to match the player's 215 lower skill level.

If the score difference value Δ is substantially low, whether positive or negative (i.e., the player score 260 is substantially equal to the duck score 265), the intuition module 315 will cause the game move selection module 325 to select a game move subset $\alpha_s$, the average probability value of which will be relatively medial, e.g., equal to the median probability value of the game move probability distribution p. In this manner, the skill level of the game 200 will tend to remain the same, thereby continuing to match the player's 215 skill level. The extent to which the score difference value Δ is considered to be losing or winning the game 200 may be provided by player feedback and the game designer.

Alternatively, rather than selecting a game move subset $\alpha_s$, based on a fixed reference probability value, such as the median probability value of the game move probability distribution p, selection of the game move set $\alpha_s$ can be based on a dynamic reference probability value that moves relative to the score difference value Δ. To this end, the intuition module 315 increases and decreases the dynamic reference probability value as the score difference value Δ becomes more positive or negative, respectively. Thus, selecting a game move subset $\alpha_s$, the corresponding average probability value of which substantially coincides with the dynamic reference probability value, will tend to match the skill level of the game 200 with that of the player 215. Without loss of generality, the dynamic reference probability value can also be learning using the learning principles disclosed herein.

In the illustrated embodiment, (1) if the score difference value Δ is substantially positive, the intuition module 315 will cause the game move selection module 325 to select a game move subset $\alpha_s$ composed of the top five corresponding probability values; (2) if the score difference value Δ is substantially negative, the intuition module 315 will cause the game move selection module 325 to select a game move subset $\alpha_s$ composed of the bottom five corresponding probability values; and (3) if the score difference value Δ is substantially low, the intuition module 315 will cause the game move selection module 325 to select a game move subset $\alpha_s$ composed of the middle seven corresponding probability values, or optionally a game move subset $\alpha_s$ composed of all seventeen corresponding probability values, which will reflect a normal game where all game moves are available for selection.

Whether the reference probability value is fixed or dynamic, hysteresis is preferably incorporated into the game move subset $\alpha_s$ selection process by comparing the score difference value Δ to upper and lower score difference thresholds $N_{S1}$ and $N_{S2}$, e.g., −1000 and 1000, respectively. Thus, the intuition module 315 will cause the game move selection module 325 to select the game move subset $\alpha_s$ in accordance with the following criteria:

If $\Delta < N_{S1}$, then select game move subset $\alpha_s$ with relatively low probability values;
If $\Delta > N_{S2}$, then select game move subset $\alpha_s$ with relatively high probability values; and
If $N_{S1} \leq \Delta \leq N_{S2}$, then select game move subset $\alpha_s$ with relatively medial probability values.

Alternatively, rather than quantify the relative skill level of the player 215 in terms of the score difference value Δ between the player score 260 and the duck score 265, as just previously discussed, the relative skill level of the player 215 can be quantified from a series (e.g., ten) of previous determined outcome values β. For example, if a high percentage of the previous determined outcome values β is equal to "0," indicating a high percentage of unfavorable game moves $\alpha_i$, the relative player skill level can be quantified as be relatively high. In contrast, if a low percentage of the previous determined outcome values β is equal to "0," indicating a low percentage of unfavorable game moves $\alpha_i$, the relative player skill level can be quantified as be relatively low. Thus, based on this information, a game move $\alpha_i$ can be pseudo-randomly selected, as hereinbefore described.

The game move selection module 325 is configured to pseudo-randomly select a single game move $\alpha_i$ from the game move subset $\alpha_s$, thereby minimizing a player detectable pattern of game move $\alpha_i$ selections, and thus increasing interest in the game 200. Such pseudo-random selection can be accomplished by first normalizing the game move subset $\alpha_s$, and then summing, for each game move $\alpha_i$ within the game move subset $\alpha_s$, the corresponding probability value with the preceding probability values (for the purposes of this specification, this is considered to be a progressive sum of the probability values). For example, the following Table 1 sets forth the unnormalized probability values, normalized probability values, and progressive sum of an exemplary subset of five game moves:

TABLE 1

Progressive Sum of Probability Values For Five Exemplary Game Moves in SISO Format

| Game Move | Unnormalized Probability Value | Normalized Probability Value | Progressive Sum |
|---|---|---|---|
| $\alpha_1$ | 0.05 | 0.09 | 0.09 |
| $\alpha_2$ | 0.05 | 0.09 | 0.18 |
| $\alpha_3$ | 0.10 | 0.18 | 0.36 |
| $\alpha_4$ | 0.15 | 0.27 | 0.63 |
| $\alpha_5$ | 0.20 | 0.37 | 1.00 |

The game move selection module 325 then selects a random number between "0" and "1," and selects the game move $\alpha_i$ corresponding to the next highest progressive sum value. For example, if the randomly selected number is 0.38, game move $\alpha_4$ will be selected.

The game move selection module 325 is further configured to receive a player move $\lambda 2_x$ from the player 215 in the form of a mouse button 245 click/mouse 240 position combination, which indicates the position of the gun 225 when it is fired. The outcome evaluation module 330 is configured to determine and output an outcome value β that indicates how favorable the game move $\alpha_i$ is in comparison with the received player move $\lambda 2_x$.

To determine the extent of how favorable a game move $\alpha_i$ is, the outcome evaluation module 330 employs a collision detection technique to determine whether the duck's 220 last move was successful in avoiding the gunshot. Specifically, if the gun 225 coincides with the duck 220 when fired, a collision is detected. On the contrary, if the gun 225 does not coincide with the duck 220 when fired, a collision is not detected. The outcome of the collision is represented by a numerical value, and specifically, the previously described outcome value β. In the illustrated embodiment, the outcome value β equals one of two predetermined values: "1" if a collision is not detected (i.e., the duck 220 is not shot), and "0" if a collision is detected (i.e., the duck 220 is shot). Of course, the outcome value β can equal "0" if a collision is not detected, and "1" if a collision is detected, or for that matter one of any two predetermined values other than a "0" or "1," without straying from the principles of the invention. In any event, the extent to which a shot misses the duck 220 (e.g., whether it was a near miss) is not relevant, but rather that the duck 220 was or was not shot. Alternatively, the outcome value β can be one of a range of finite integers or real numbers, or one of a range of continuous values. In these cases, the extent to which a shot misses or hits the duck 220 is relevant. Thus, the closer the gun 225 comes to shooting the duck 220, the less the outcome value β is, and thus, a near miss will result in a relatively low outcome value β, whereas a far miss will result in a relatively high outcome value β. Of course, alternatively, the closer the gun 225 comes to shooting the duck 220, the greater the outcome value β is. What is significant is that the outcome value β correctly indicates the extent to which the shot misses the duck 220. More alternatively, the extent to which a shot hits the duck 220 is relevant. Thus, the less damage the duck 220 incurs, the less the outcome value β is, and the more damage the duck 220 incurs, the greater the outcome value β is.

The probability update module 320 is configured to receive the outcome value from the outcome evaluation module 330 and output an updated game strategy (represented by game move probability distribution p) that the duck 220 will use to counteract the player's 215 strategy in the future. In the preferred embodiment, the probability update module 320 utilizes a linear reward-penalty P-type update. As an example, given a selection of the seventeen different moves 255, assume that the gun 125 fails to shoot the duck 120 after it takes game move $\alpha_3$, thus creating an outcome value β=1. In this case, general updating equations [6] and [7] can be expanded using equations [10] and [11], as follows:

$$p_3(k+1) = p_3(k) + \sum_{\substack{j=1 \\ j \neq 3}}^{17} ap_j(k);$$

$$p_1(k+1) = p_1(k) - ap_1(k);$$
$$p_2(k+1) = p_2(k) - ap_2(k);$$
$$p_4(k+1) = p_4(k) - ap_4(k);$$
$$\vdots$$
$$p_{17}(k+1) = p_{17}(k) - ap_{17}(k)$$

Thus, since the game move $\alpha_3$ resulted in a successful outcome, the corresponding probability value $p_3$ is increased, and the game move probability values $p_i$ corresponding to the remaining game moves $\alpha_i$ are decreased.

If, on the other hand, the gun 125 shoots the duck 120 after it takes game move $\alpha_3$, thus creating an outcome value β=0, general updating equations [8] and [9] can be expanded, using equations [10] and [11], as follows:

$$p_3(k+1) = p_3(k) - \sum_{\substack{j=1 \\ j \neq 3}}^{17} \left(\frac{b}{16} - bp_j(k)\right)$$

$$p_1(k+1) = p_1(k) + \frac{b}{16} - bp_1(k);$$

$$p_2(k+1) = p_2(k) + \frac{b}{16} - bp_2(k);$$

$$p_4(k+1) = p_4(k) + \frac{b}{16} - bp_4(k);$$

$$\vdots$$

$$p_{17}(k+1) = p_{17}(k) + \frac{b}{16} - bp_{17}(k)$$

It should be noted that in the case where the gun 125 shoots the duck 120, thus creating an outcome value β=0, rather than using equations [8], [9], and [11], a value proportional to the penalty parameter b can simply be subtracted from the selection game move, and can then be equally distributed among the remaining game moves $\alpha_j$. It has been empirically found that this method ensures that no probability value $p_i$ converges to "1," which would adversely result in the selection of a single game move $\alpha_i$ every time. In this case, equations [8] and [9] can be modified to read:

$$p_i(k+1) = p_i(k) - bp_i(k) \quad [8b]$$

$$p_j(k+1) = p_j(k) + \frac{1}{n-1}bp_i(k) \quad [9b]$$

Assuming game move $\alpha_3$ results in an outcome value β=0, equations [8b] and [9b] can be expanded as follows:

$$p_3(k+1) = p_3(k) - bp_3(k)$$

$$p_1(k+1) = p_1(k) + \frac{b}{16}p_1(k);$$

$$p_2(k+1) = p_2(k) + \frac{b}{16}p_2(k);$$

$$p_4(k+1) = p_4(k) + \frac{b}{16}p_4(k);$$

$$\vdots$$

$$p_{17}(k+1) = p_{17}(k) + \frac{b}{16}p_{17}(k)$$

In any event, since the game move $\alpha_3$ resulted in an unsuccessful outcome, the corresponding probability value $p_3$ is decreased, and the game move probability values $p_i$ corresponding to the remaining game moves $\alpha_j$ are increased. The values of a and b are selected based on the desired speed and accuracy that the learning module 310 learns, which may depend on the size of the game move set $\alpha$. For example, if the game move set $\alpha$ is relatively small, the game 200 preferably must learn quickly, thus translating to relatively high a and b values. On the contrary, if the game move set $\alpha$ is relatively large, the game 200 preferably learns more accurately, thus translating to relatively low a and b values. In other words, the greater the values selected for a and b, the faster the game move probability distribution p changes, whereas the lesser the values selected for a and b, the slower the game move probability distribution p changes. In the preferred embodiment, the values of a and b have been chosen to be 0.1 and 0.5, respectively.

In the preferred embodiment, the reward-penalty update scheme allows the skill level of the game 200 to track that of the player 215 during gradual changes in the player's 215 skill level. Alternatively, a reward-inaction update scheme can be employed to constantly make the game 200 more difficult, e.g., if the game 200 has a training mode to train the player 215 to become progressively more skillful. More alternatively, a penalty-inaction update scheme can be employed, e.g., to quickly reduce the skill level of the game 200 if a different less skillful player 215 plays the game 200. In any event, the intuition module 315 may operate on the probability update module 320 to dynamically select any one of these update schemes depending on the objective to be achieved.

It should be noted that rather than, or in addition to, modifying the functionality of the game move selection module 325 by subdividing the game move set a into a plurality of game move subsets $\alpha_s$, the respective skill levels of the game 200 and player 215 can be continuously and dynamically matched by modifying the functionality of the probability update module 320 by modifying or selecting the algorithms employed by it. For example, the respective reward and penalty parameters a and b may be dynamically modified.

For example, if the difference between the respective player and game scores 260 and 265 (i.e., the score difference value $\Delta$) is substantially positive, the respective reward and penalty parameters a and b can be increased, so that the skill level of the game 200 more rapidly increases. That is, if the gun 125 shoots the duck 120 after it takes a particular game move $\alpha_i$, thus producing an unsuccessful outcome, an increase in the penalty parameter b will correspondingly decrease the chances that the particular game move $\alpha_i$ is selected again relative to the chances that it would have been selected again if the penalty parameter b had not been modified. If the gun 125 fails to shoot the duck 120 after it takes a particular game move $\alpha_i$, thus producing a successful outcome, an increase in the reward parameter a will correspondingly increase the chances that the particular game move $\alpha_i$ is selected again relative to the chances that it would have been selected again if the penalty parameter a had not been modified. Thus, in this scenario, the game 200 will learn at a quicker rate.

On the contrary, if the score difference value $\Delta$ is substantially negative, the respective reward and penalty parameters a and b can be decreased, so that the skill level of the game 200 less rapidly increases. That is, if the gun 125 shoots the duck 120 after it takes a particular game move $\alpha_i$, thus producing an unsuccessful outcome, a decrease in the penalty parameter b will correspondingly increase the chances that the particular game move $\alpha_i$ is selected again relative to the chances that it would have been selected again if the penalty parameter b had not been modified. If the gun 125 fails to shoot the duck 120 after it takes a particular game move $\alpha_i$, thus producing a successful outcome, a decrease in the reward parameter a will correspondingly decrease the chances that the particular game move $\alpha_i$ is selected again relative to the chances that it would have been selected again if the reward parameter a had not been modified. Thus, in this scenario, the game 200 will learn at a slower rate.

If the score difference value $\Delta$ is low, whether positive or negative, the respective reward and penalty parameters a and b can remain unchanged, so that the skill level of the game 200 will tend to remain the same. Thus, in this scenario, the game 200 will learn at the same rate.

It should be noted that an increase or decrease in the reward and penalty parameters a and b can be effected in various ways. For example, the values of the reward and penalty parameters a and b can be incrementally increased or decreased a fixed amount, e.g., 0.1. Or the reward and penalty parameters a and b can be expressed in the functional form y=f(x), with the performance index $\phi$ being one of the independent variables, and the penalty and reward parameters a and b being at least one of the dependent variables. In this manner, there is a smoother and continuous transition in the reward and penalty parameters a and b.

Optionally, to further ensure that the skill level of the game 200 rapidly decreases when the score difference value $\Delta$ substantially negative, the respective reward and penalty parameters a and b can be made negative. That is, if the gun 125 shoots the duck 120 after it takes a particular game move $\alpha_i$, thus producing an unsuccessful outcome, forcing the penalty parameter b to a negative number will increase the chances that the particular game move $\alpha_i$ is selected again in the absolute sense. If the gun 125 fails to shoot the duck 120 after it takes a particular game move $\alpha_i$, thus producing a successful outcome, forcing the reward parameter a to a negative number will decrease the chances that the particular game move $\alpha_i$ is selected again in the absolute sense. Thus, in this scenario, rather than learn at a slower rate, the game 200 will actually unlearn. It should be noted in the case where negative probability values $p_i$ result, the probability distribution p is preferably normalized to keep the game move probability values $p_i$ within the [0,1] range.

More optionally, to ensure that the skill level of the game 200 substantially decreases when the score difference value $\Delta$ is substantially negative, the respective reward and penalty equations can be switched. That is, the reward equations, in this case equations [6] and [7], can be used when there is an unsuccessful outcome (i.e., the gun 125 shoots the duck 120). The penalty equations, in this case equations [8] and [9] (or [8b] and [9b]), can be used when there is a successful outcome (i.e., when the gun 125 misses the duck 120). Thus, the probability update module 320 will treat the previously selected $\alpha_i$ as producing an unsuccessful outcome, when in fact, it has produced a successful outcome, and will treat the previously selected $\alpha_i$ as producing a successful outcome, when in fact, it has produced an unsuccessful outcome. In this case, when the score difference value $\Delta$ is substantially negative, the respective reward and penalty parameters a and b can be increased, so that the skill level of the game 200 more rapidly decreases.

Alternatively, rather than actually switching the penalty and reward equations, the functionality of the outcome evaluation module 330 can be modified with similar results. For example, the outcome evaluation module 330 may be modified to output an outcome value $\beta=0$ when the current game move $\alpha$ is successful, i.e., the gun 125 does not shoot the duck 120, and to output an outcome value $\beta=1$ when the current game move $\alpha_i$ is unsuccessful, i.e., the gun 125 shoots the duck 120. Thus, the probability update module 320 will interpret the outcome value $\beta$ as an indication of an unsuccessful outcome, when in fact, it is an indication of a successful outcome, and will interpret the outcome value $\beta$ as an indication of a successful outcome, when in fact, it is an indication of an unsuccessful outcome. In this manner, the reward and penalty equations are effectively switched.

Rather than modifying or switching the algorithms used by the probability update module 320, the game move probability distribution p can be transformed. For example, if the score difference value $\Delta$ is substantially positive, it is assumed that the game moves $\alpha_i$) corresponding to a set of the highest probability values $p_i$ are too easy, and the game moves $\alpha_i$ corresponding to a set of the lowest probability values $p_i$ are too hard. In this case, the game moves $\alpha_i$ corresponding to the set of highest probability values $p_i$ can be switched with the game moves corresponding to the set of lowest probability values $p_i$, thereby increasing the chances that that the harder game moves $\alpha_i$ (and decreasing the chances that the easier game moves $\alpha_i$) are selected relative to the chances that they would have been selected again if the game move probability distribution p had not been transformed. Thus, in this scenario, the game 200 will learn at a quicker rate. In contrast, if the score difference value $\Delta$ is substantially negative, it is assumed that the game moves $\alpha_i$ corresponding to the set of highest probability values $p_i$ are too hard, and the game moves $\alpha_i$ corresponding to the set of lowest probability values $p_i$ are too easy. In this case, the game moves $\alpha_i$ corresponding to the set of highest probability values $p_i$ can be switched with the game moves corresponding to the set of lowest probability values $p_i$, thereby increasing the chances that that the easier game moves $\alpha_i$ (and decreasing the chances that the harder game moves $\alpha_i$) are selected relative to the chances that they would have been selected again if the game move probability distribution p had not been transformed. Thus, in this scenario, the game 200 will learn at a slower rate. If the score difference value $\Delta$ is low, whether positive or negative, it is assumed that the game moves $\alpha_i$ corresponding to the set of highest probability values $p_i$ are not too hard, and the game moves $\alpha_i$ corresponding to the set of lowest probability values $p_i$ are not too easy, in which case, the game moves $\alpha_i$ corresponding to the set of highest probability values $p_i$ and set of lowest probability values $p_i$ are not switched. Thus, in this scenario, the game 200 will learn at the same rate.

It should be noted that although the performance index $\phi$ has been described as being derived from the score difference value $\Delta$, the performance index $\phi$ can also be derived from other sources, such as the game move probability distribution p. If it is known that the outer moves 255a or more difficult than the inner moves 255b, the performance index $\phi$, and in this case, the skill level of the player 215 relative to the skill level the game 200, may be found in the present state of the game move probability values $p_i$ assigned to the moves 255. For example, if the combined probability values $p_i$ corresponding to the outer moves 255a is above a particular threshold value, e.g., 0.7 (or alternatively, the combined probability values $p_i$ corresponding to the inner moves 255b is below a particular threshold value, e.g., 0.3), this may be an indication that the skill level of the player 215 is substantially greater than the skill level of the game 200. In contrast, if the combined probability values $p_i$ corresponding to the outer moves 255a is below a particular threshold value, e.g., 0.4 (or alternatively, the combined probability values $p_i$ corresponding to the inner moves 255b is above a particular threshold value, e.g., 0.6), this may be an indication that the skill level of the player 215 is substantially less than the skill level of the game 200. Similarly, if the combined probability values $p_i$ corresponding to the outer moves 255a is within a particular threshold range, e.g., 0.4-0.7 (or alternatively, the combined probability values $p_i$ corresponding to the inner moves 255b is within a particular threshold range, e.g., 0.3-0.6), this may be an indication that the skill level of the player 215 and skill level of the game 200 are substantially matched. In this case, any of the afore-described probabilistic learning module modification techniques can be used with this performance index $\phi$.

Alternatively, the probabilities values $p_i$ corresponding to one or more game moves $\alpha_i$ can be limited to match the respective skill levels of the player 215 and game 200. For example, if a particular probability value $p_i$ is too high, it is assumed that the corresponding game move $\alpha_i$ may be too hard for the player 215. In this case, one or more probabilities values $p_i$ can be limited to a high value, e.g., 0.4, such that when a probability value $p_i$ reaches this number, the chances that that the corresponding game move $\alpha_i$ is selected again will decrease relative to the chances that it would be selected if the corresponding game move probability $p_i$ had not been limited. Similarly, one or more probabilities values $p_i$ can be limited to a low value, e.g., 0.01, such that when a probability value $p_i$ reaches this number, the chances that that the corresponding game move $\alpha_i$ is selected again will increase relative to the chances that it would be selected if the corresponding game move probability $p_i$ had not been limited. It should be noted that the limits can be fixed, in which case, only the performance index $\phi$ that is a function of the game move probability distribution p is used to match the respective skill levels of the player 215 and game 200, or the limits can vary, in which case, such variance may be based on a performance index $\phi$ external to the game move probability distribution p.

Figure 9:
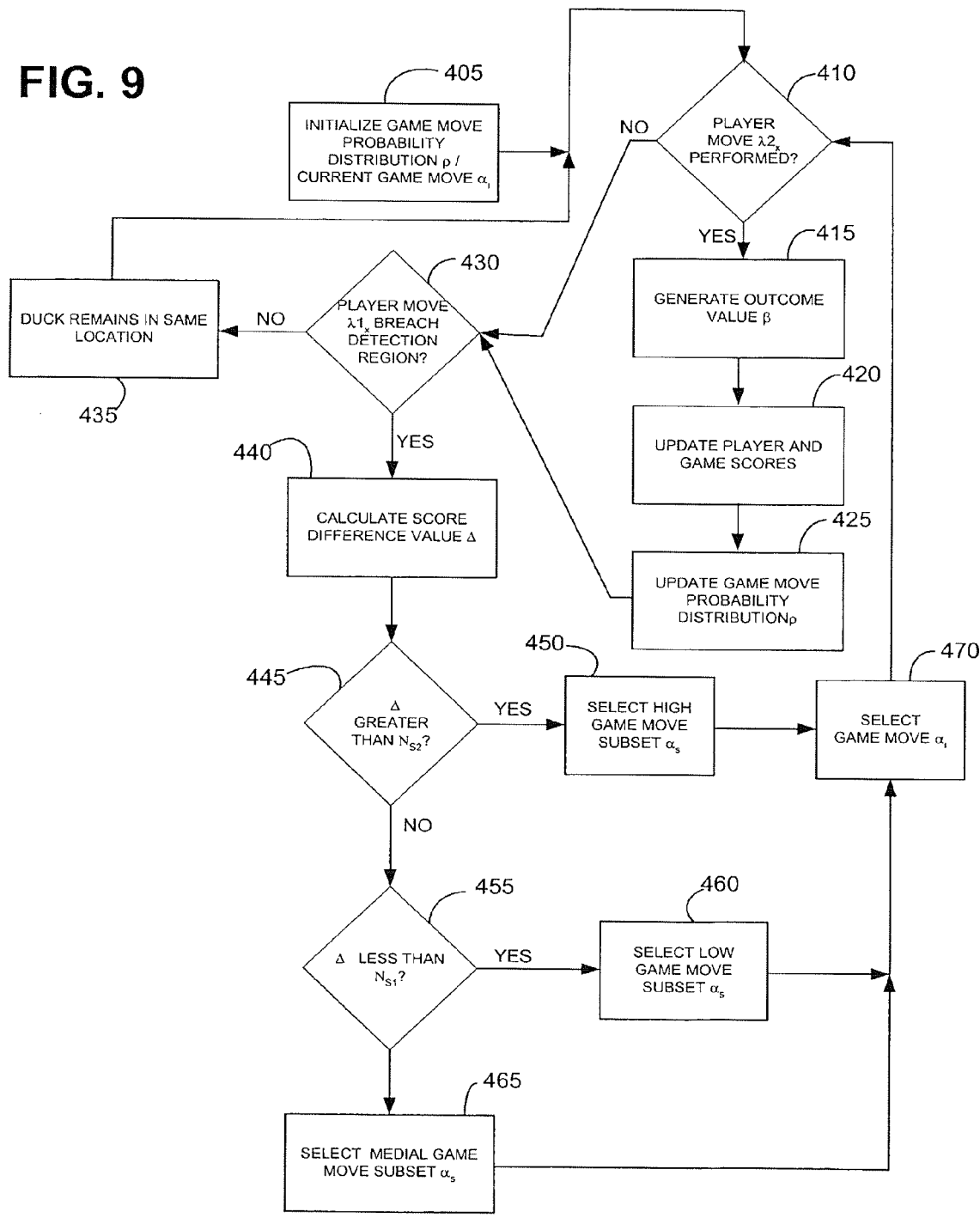
FIG. 9 is a flow diagram illustrating a preferred method performed by the game program of FIG. 8.

Having now described the structure of the game program 300, the steps performed by the game program 300 will be described with reference to FIG. 9. First, the game move probability distribution p is initialized (step 405). Specifically, the probability update module 320 initially assigns an equal probability value to each of the game moves $\alpha_i$, in which case, the initial game move probability distribution p(k) can be represented by

$$p_1(0) = p_2(0) = p_2(0) = \ldots p_n(0) = \frac{1}{n}.$$

Thus, all of the game moves $\alpha_i$ have an equal chance of being selected by the game move selection module 325. Alternatively, probability update module 320 initially assigns unequal probability values to at least some of the game moves $\alpha_i$. For example, the outer moves 255a may be initially assigned a lower probability value than that of the inner moves 255b, so that the selection of any of the outer moves 255a as the next game move $\alpha_i$ will be decreased. In this case, the duck 220 will not be too difficult to shoot when the game 200 is started. In addition to the game move probability distribution p, the current game move $\alpha_i$ to be updated is also initialized by the probability update module 320 at step 405.

Then, the game move selection module 325 determines whether a player move $\lambda 2_x$ has been performed, and specifically whether the gun 225 has been fired by clicking the mouse button 245 (step 410). If a player move $\lambda 2_x$ has been performed, the outcome evaluation module 330 determines whether the last game move $\alpha_i$ was successful by performing a collision detection, and then generates the outcome value $\beta$ in response thereto (step 415). The intuition module 315 then updates the player score 260 and duck score 265 based on the outcome value $\beta$ (step 420). The probability update module 320 then, using any of the updating techniques described herein, updates the game move probability distribution p based on the generated outcome value $\beta$ (step 425).

After step 425, or if a player move $\lambda 2_x$ has not been performed at step 410, the game move selection module 325 determines if a player move $\lambda 1_x$ has been performed, i.e., gun 225, has breached the gun detection region 270 (step 430). If the gun 225 has not breached the gun detection region 270, the game move selection module 325 does not select any game move $\alpha_i$ from the game move subset $\alpha$ and the duck 220 remains in the same location (step 435). Alternatively, the game move $\alpha_i$ may be randomly selected, allowing the duck 220 to dynamically wander. The game program 300 then returns to step 410 where it is again determined if a player move $\lambda 2_x$ has been performed. If the gun 225 has breached the gun detection region 270 at step 430, the intuition module 315 modifies the functionality of the game move selection module 325 based on the performance index ϕ, and the game move selection module 325 selects a game move $\alpha_i$ from the game move set α.

Specifically, the intuition module 315 determines the relative player skill level by calculating the score difference value Δ between the player score 260 and duck score 265 (step 440). The intuition module 315 then determines whether the score difference value Δ is greater than the upper score difference threshold $N_{S2}$ (step 445). If Δ is greater than $N_{S2}$, the intuition module 315, using any of the game move subset selection techniques described herein, selects a game move subset $\alpha_s$, a corresponding average probability of which is relatively high (step 450). If Δ is not greater than $N_{S2}$, the intuition module 315 then determines whether the score difference value Δ is less than the lower score difference threshold $N_{S1}$ (step 455). If Δ is less than $N_{S1}$, the intuition module 315, using any of the game move subset selection techniques described herein, selects a game move subset $\alpha_s$, a corresponding average probability of which is relatively low (step 460). If Δ is not less than $N_{S1}$, it is assumed that the score difference value Δ is between $N_{S1}$ and $N_{S2}$, in which case, the intuition module 315, using any of the game move subset selection techniques described herein, selects a game move subset $\alpha_s$, a corresponding average probability of which is relatively medial (step 465). In any event, the game move selection module 325 then pseudo-randomly selects a game move $\alpha_i$ from the selected game move subset $\alpha_s$, and accordingly moves the duck 220 in accordance with the selected game move $\alpha_i$ (step 470). The game program 300 then returns to step 410, where it is determined again if a player move $\lambda 2_x$ has been performed.

Figure 10:
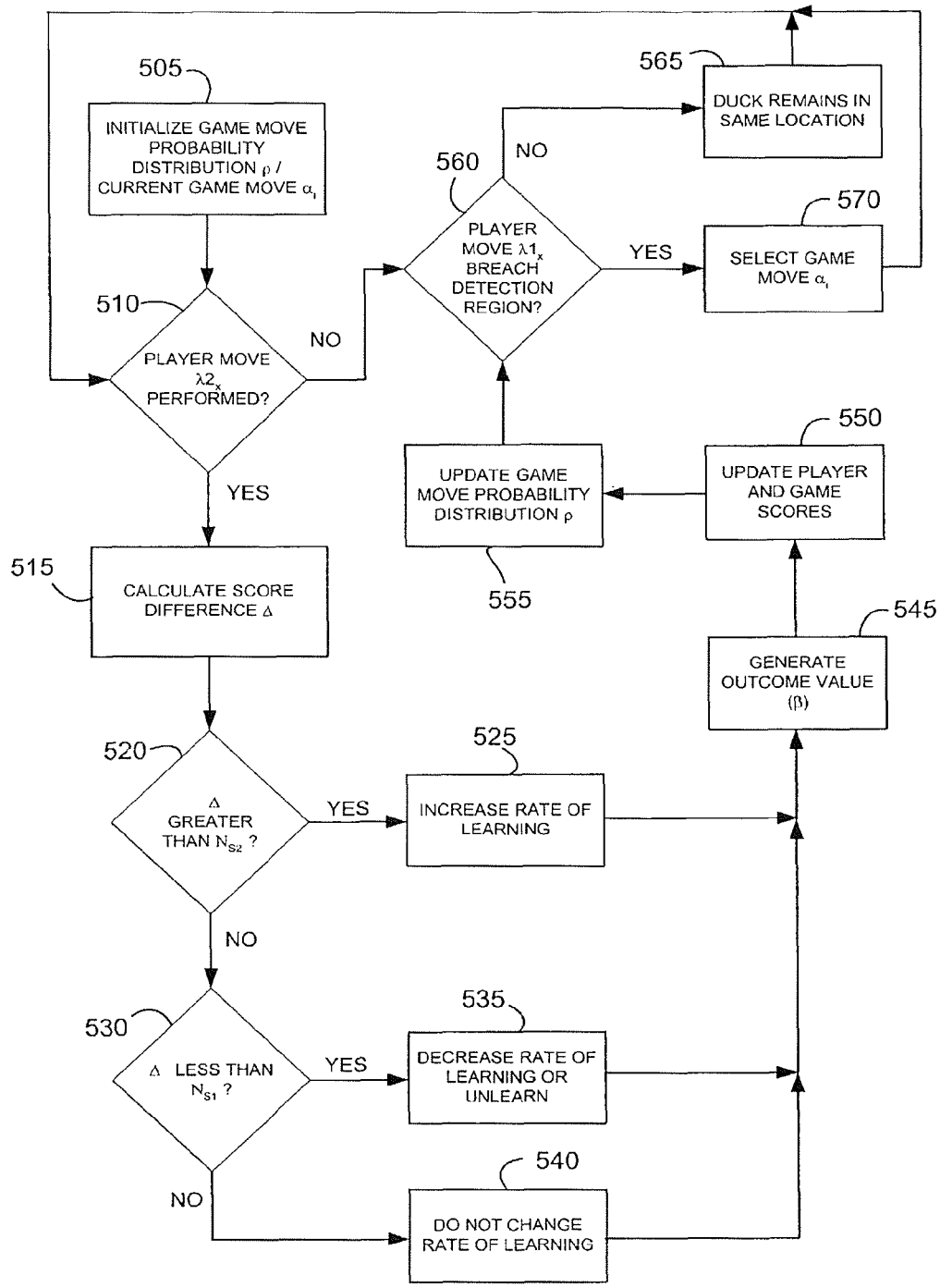
FIG. 10 is a flow diagram illustrating an alternative preferred method performed by the game program of FIG. 8.

It should be noted that, rather than use the game move subset selection technique, the other afore-described techniques used to dynamically and continuously match the skill level of the player 215 with the skill level of the game 200 can be alternatively or optionally be used as well. For example, and referring to FIG. 10, the probability update module 320 initializes the game move probability distribution p and current game move $\alpha_i$ similarly to that described in step 405 of FIG. 9. The initialization of the game move probability distribution p and current game move $\alpha_i$ is similar to that performed in step 405 of FIG. 9. Then, the game move selection module 325 determines whether a player move $\lambda 2_x$ has been performed, and specifically whether the gun 225 has been fired by clicking the mouse button 245 (step 510). If a player move $\lambda 2_x$ has been performed, the intuition module 315 modifies the functionality of the probability update module 320 based on the performance index ϕ.

Specifically, the intuition module 315 determines the relative player skill level by calculating the score difference value Δ between the player score 260 and duck score 265 (step 515). The intuition module 315 then determines whether the score difference value Δ is greater than the upper score difference threshold $N_{S2}$ (step 520). If Δ is greater than $N_{S2}$, the intuition module 315 modifies the functionality of the probability update module 320 to increase the game's 200 rate of learning using any of the techniques described herein (step 525). For example, the intuition module 315 may modify the parameters of the learning algorithms, and specifically, increase the reward and penalty parameters a and b.

If Δ is not greater than $N_{S2}$, the intuition module 315 then determines whether the score difference value Δ is less than the lower score difference threshold $N_{S1}$ (step 530). If Δ is less than $N_{S1}$, the intuition module 315 modifies the functionality of the probability update module 320 to decrease the game's 200 rate of learning (or even make the game 200 unlearn) using any of the techniques described herein (step 535). For example, the intuition module 315 may modify the parameters of the learning algorithms, and specifically, decrease the reward and penalty parameters a and b. Alternatively or optionally, the intuition module 315 may assign the reward and penalty parameters a and b negative numbers, switch the reward and penalty learning algorithms, or even modify the outcome evaluation module 330 to output an outcome value β=0 when the selected game move $\alpha_i$ is actually successful, and output an outcome value β=1 when the selected game move $\alpha_i$ is actually unsuccessful.

If Δ is not less than $N_{S2}$, it is assumed that the score difference value Δ is between $N_{S1}$ and $N_{S2}$, in which case, the intuition module 315 does not modify the probability update module 320 (step 540).

In any event, the outcome evaluation module 330 then determines whether the last game move $\alpha_i$ was successful by performing a collision detection, and then generates the outcome value β in response thereto (step 545). Of course, if the intuition module 315 modifies the functionality of the outcome evaluation module 330 during any of the steps 525 and 535, step 545 will preferably be performed during these steps. The intuition module 315 then updates the player score 260 and duck score 265 based on the outcome value β (step 550). The probability update module 320 then, using any of the updating techniques described herein, updates the game move probability distribution p based on the generated outcome value β (step 555).

After step 555, or if a player move $\lambda 2_x$ has not been performed at step 510, the game move selection module 325 determines if a player move $\lambda 1_x$ has been performed, i.e., gun 225, has breached the gun detection region 270 (step 560). If the gun 225 has not breached the gun detection region 270, the game move selection module 325 does not select a game move $\alpha_i$ from the game move set α and the duck 220 remains in the same location (step 565). Alternatively, the game move $\alpha_i$ may be randomly selected, allowing the duck 220 to dynamically wander. The game program 300 then returns to step 510 where it is again determined if a player move $\lambda 2_x$ has been performed. If the gun 225 has breached the gun detection region 270 at step 560, the game move selection module 325 pseudo-randomly selects a game move $\alpha_i$ from the game move set α and accordingly moves the duck 220 in accordance with the selected game move $\alpha_i$ (step 570). The game program 300 then returns to step 510, where it is determined again if a player move $\lambda 2_x$ has been performed.

More specific details on the above-described operation of the duck game 100 can be found in the Computer Program Listing Appendix attached hereto and previously incorporated herein by reference. It is noted that each of the files "Intuition Intelligence-duckgame1.doc" and "Intuition Intelligence-duckgame2.doc" represents the game program 300, with file "Intuition Intelligence-duckgame1.doc" utilizing the game move subset selection technique to continuously and dynamically match the respective skill levels of the game 200 and player 215, and file "Intuition "Intuition Intelligence-duckgame2.doc" utilizing the learning algorithm modification technique (specifically, modifying the respective reward and penalty parameters a and b when the score difference value Δ is too positive or too negative, and switching the respective reward and penalty equations when the score difference value Δ is too negative) to similarly continuously and dynamically match the respective skill levels of the game 200 and player 215.

Single-Player Educational Program (Single Game Move-Single Player Move)

Figure 11:
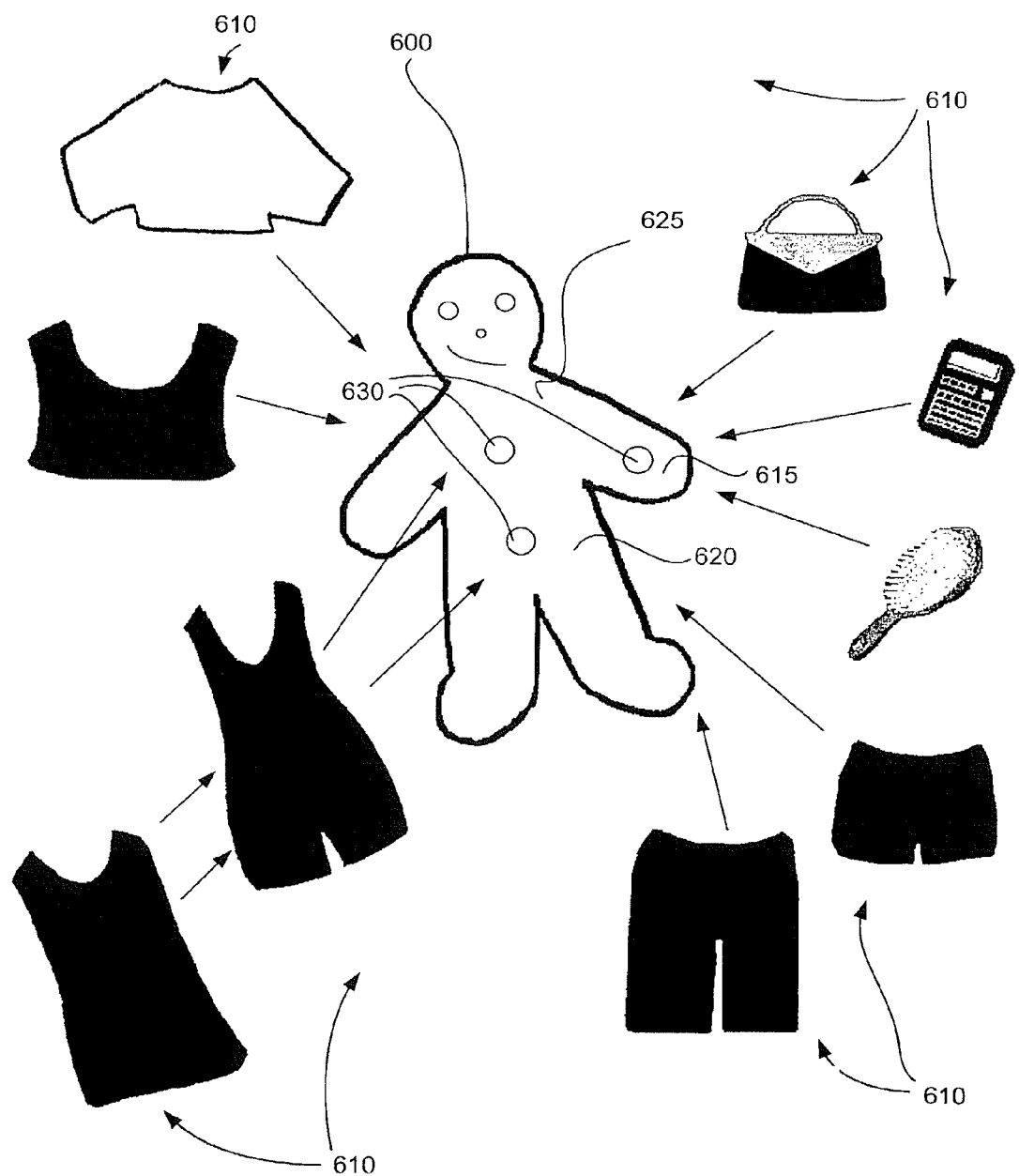
FIG. 11 is a cartoon of a single-user educational child's toy to which the generalized program of FIG. 1 can be applied.
Figure 12:
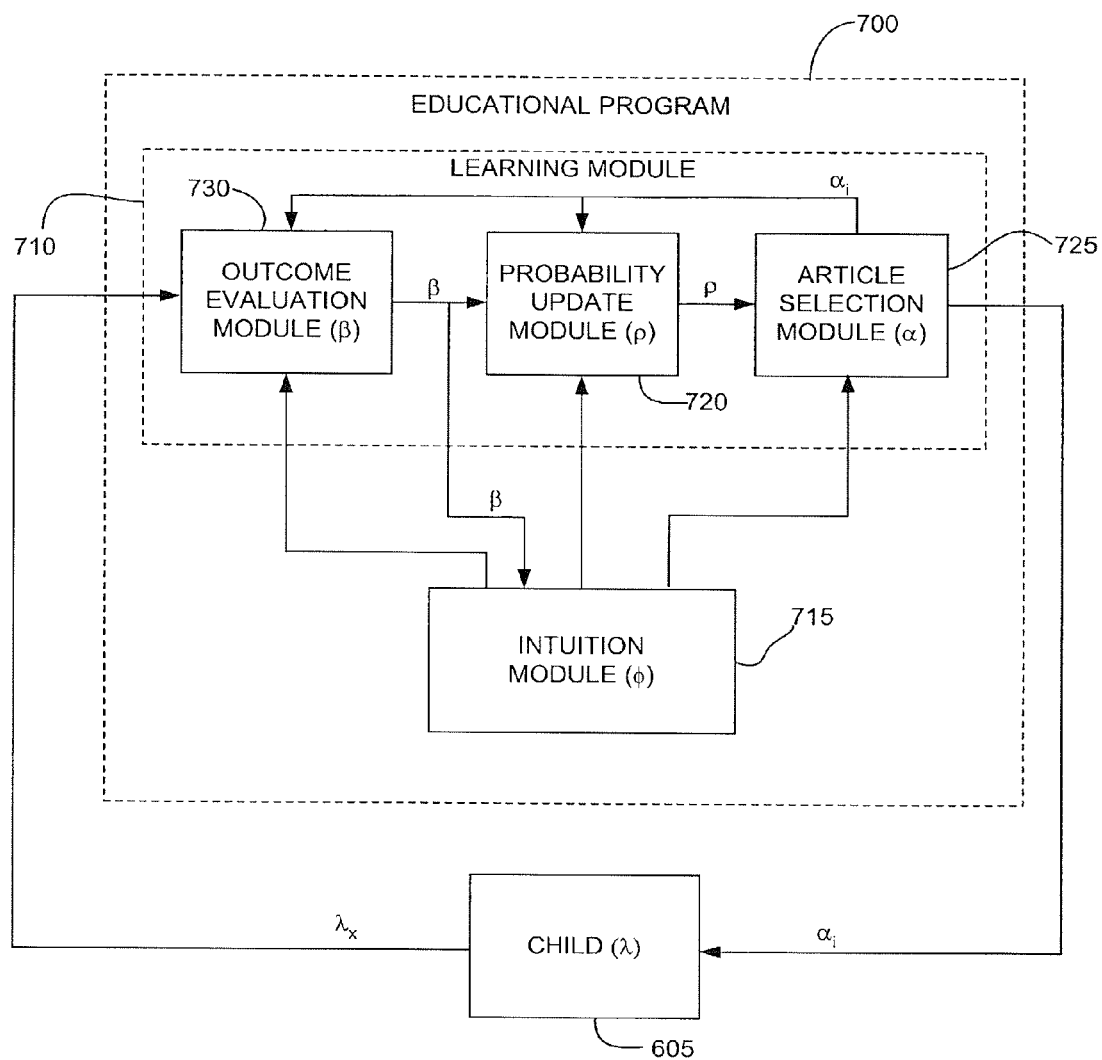
FIG. 12 is a block diagram of a single-user educational program employed in the educational child's toy of FIG. 11.

The learning program 100 can be applied to other applications besides game programs. A single-player educational program 700 (shown in FIG. 12) developed in accordance with the present inventions is described in the context of a child's learning toy 600 (shown in FIG. 11), and specifically, a doll 600 and associated articles of clothing and accessories 610 that are applied to the doll 600 by a child 605 (shown in FIG. 12). In the illustrated embodiment, the articles 610 include a (1) purse, calculator, and hairbrush, one of which can be applied to a hand 615 of the doll 600; (2) shorts and pants, one of which can be applied to a waist 620 of the doll 600; (3) shirt and tank top, one of which can be applied to a chest 625 of the doll 600; and (4) dress and overalls, one of which can be applied to the chest 625 of the doll 600. Notably, the dress and overalls cover the waist 620, so that the shorts and pants cannot be applied to the doll 600 when the dress or overalls are applied. Depending on the measured skill level of the child 605, the doll 600 will instruct the child 605 to apply either a single article, two articles, or three articles to the doll 600. For example, the doll 600 may say "Simon says, give me my calculator, pants, and tank top."

In accordance with the instructions given by the doll 600, the child 605 will then attempt to apply the correct articles 610 to the doll 600. For example, the child 605 may place the calculator in the hand 615, the pants on the waist 620, and the tank top on the chest 625. To determine which articles 610 the child 605 has applied, the doll 600 comprises sensors 630 located on the hand 615, waist 620, and chest 625. These sensors 630 sense the unique resistance values exhibited by the articles 610, so that the doll 600 can determine which of the articles 610 are being applied.

As illustrated in Tables 2-4, there are 43 combinations of articles 610 that can be applied to the doll 600. Specifically, actions $\alpha_1$-$\alpha_9$ represent all of the single article combinations, actions $\alpha_{10}$-$\alpha_{31}$ represent all of the double article combinations, and actions $\alpha_{32}$-$\alpha_{43}$ represent all of the triple article combinations that can be possibly applied to the doll 600.

TABLE 2

Exemplary Single Article Combinations for Doll

| Action ($\alpha$) | Hand | Waist | Chest |
|---|---|---|---|
| $\alpha_1$ | Purse | x | x |
| $\alpha_2$ | Calculator | x | x |
| $\alpha_3$ | Hairbrush | x | x |
| $\alpha_4$ | x | Shorts | x |
| $\alpha_5$ | x | Pants | x |
| $\alpha_6$ | x | x | Shirt |
| $\alpha_7$ | x | x | Tanktop |
| $\alpha_8$ | x | x | Dress |
| $\alpha_9$ | x | x | Overalls |

TABLE 3

Exemplary Double article combinations for Doll

| Action ($\alpha$) | Hand | Waist | Chest |
|---|---|---|---|
| $\alpha_{10}$ | Purse | Shorts | x |
| $\alpha_{11}$ | Purse | Pants | x |
| $\alpha_{12}$ | Purse | x | Shirt |
| $\alpha_{13}$ | Purse | x | Tanktop |
| $\alpha_{14}$ | Purse | x | Dress |
| $\alpha_{15}$ | Purse | x | Overalls |
| $\alpha_{16}$ | Calculator | Shorts | x |
| $\alpha_{17}$ | Calculator | Pants | x |

TABLE 3-continued

Exemplary Double article combinations for Doll

| Action ($\alpha$) | Hand | Waist | Chest |
|---|---|---|---|
| $\alpha_{18}$ | Calculator | x | Shirt |
| $\alpha_{19}$ | Calculator | x | Tanktop |
| $\alpha_{20}$ | Calculator | x | Dress |
| $\alpha_{21}$ | Calculator | x | Overalls |
| $\alpha_{22}$ | Hairbrush | Shorts | x |
| $\alpha_{23}$ | Hairbrush | Pants | x |
| $\alpha_{24}$ | Hairbrush | x | Shirt |
| $\alpha_{25}$ | Hairbrush | x | Tanktop |
| $\alpha_{26}$ | Hairbrush | x | Dress |
| $\alpha_{27}$ | Hairbrush | x | Overalls |
| $\alpha_{28}$ | x | Shorts | Shirt |
| $\alpha_{29}$ | x | Shorts | Tanktop |
| $\alpha_{30}$ | x | Pants | Shirt |
| $\alpha_{31}$ | x | Pants | Tanktop |

TABLE 4

Exemplary Three Article Combinations for Doll

| Action ($\alpha$) | Hand | Waist | Chest |
|---|---|---|---|
| $\alpha_{32}$ | Purse | Shorts | Shirt |
| $\alpha_{33}$ | Purse | Shorts | Tanktop |
| $\alpha_{34}$ | Purse | Pants | Shirt |
| $\alpha_{35}$ | Purse | Pants | Tanktop |
| $\alpha_{36}$ | Calculator | Shorts | Shirt |
| $\alpha_{37}$ | Calculator | Shorts | Tanktop |
| $\alpha_{38}$ | Calculator | Pants | Shirt |
| $\alpha_{39}$ | Calculator | Pants | Tanktop |
| $\alpha_{40}$ | Hairbrush | Shorts | Shirt |
| $\alpha_{41}$ | Hairbrush | Shorts | Tanktop |
| $\alpha_{42}$ | Hairbrush | Pants | Shirt |
| $\alpha_{43}$ | Hairbrush | Pants | Tanktop |

In response to the selection of one of these actions $\alpha_i$, i.e., prompting the child 605 to apply one of the 43 article combinations to the doll 600, the child 605 will attempt to apply the correct article combinations to the doll 600, represented by corresponding child actions $\lambda_1$-$\lambda_{43}$. It can be appreciated an article combination $\lambda_x$ will be correct if it corresponds to the article combination $\alpha_i$ prompted by the doll 600 (i.e., the child action $\lambda$ corresponds with the doll action $\alpha$), and will be incorrect if it corresponds to the article combination $\alpha_i$ prompted by the doll 600 (i.e., the child action $\lambda$ does not correspond with the doll action $\alpha$).

The doll 600 seeks to challenge the child 605 by prompting him or her with more difficult article combinations as the child 605 applies correct combinations to the doll 600. For example, if the child 605 exhibits a proficiency at single article combinations, the doll 600 will prompt the child 605 with less single article combinations and more double and triple article combinations. If the child 605 exhibits a proficiency at double article combinations, the doll 600 will prompt the child 605 with less single and double article combinations and more triple article combinations. If the child 605 exhibits a proficiency at three article combinations, the doll 600 will prompt the child 605 with even more triple article combinations.

The doll 600 also seeks to avoid over challenging the child 605 and frustrating the learning process. For example, if the child 605 does not exhibit a proficiency at triple article combinations, the doll 600 will prompt the child 605 with less triple article combinations and more single and double article combinations. If the child 605 does not exhibit a proficiency at double article combinations, the doll 600 will prompt the child 605 with less double and triple article combinations and more single article combinations. If the child 605 does not exhibit a proficiency at single article combinations, the doll 600 will prompt the child 605 with even more single article combinations.

To this end, the educational program 700 generally includes a probabilistic learning module 710 and an intuition module 715, which are specifically tailored for the doll 600. The probabilistic learning module 710 comprises a probability update module 720, an article selection module 725, and an outcome evaluation module 730. Specifically, the probability update module 720 is mainly responsible for learning the child's current skill level, with the outcome evaluation module 730 being responsible for evaluating the article combinations $\alpha_i$ prompted by the doll 600 relative to the article combinations $\lambda_x$ selected by the child 605. The article selection module 725 is mainly responsible for using the learned skill level of the child 605 to select the article combinations $\alpha_i$ that are used to prompt the child 605. The intuition module 715 is responsible for directing the learning of the educational program 700 towards the objective, and specifically, dynamically pushing the skill level of the child 605 to a higher level. In this case, the intuition module 715 operates on the probability update module 720, and specifically selects the methodology that the probability update module 720 will use to update an article probability distribution p.

To this end, the outcome evaluation module 730 is configured to receive an article combination $\alpha_i$ from the article selection module 725 (i.e., one of the forty-three article combinations that are prompted by the doll 600), and receive an article combination $\lambda_x$ from the child 605 (i.e., one of the forty-three article combinations that can be applied to the doll 600). The outcome evaluation module 730 is also configured to determine whether each article combination $\lambda_x$ received from the child 605 matches the article combination $\alpha_i$ prompted by the doll 600, with the outcome value β equaling one of two predetermined values, e.g., "0" if there is a match and "1" if there is not a match. In this case, a P-type learning methodology is used. Optionally, the outcome evaluation module 730 can generate an outcome value β equaling a value between "0" and "1." For example, if the child 605 is relatively successful by matching most of the articles within the prompted article combination $\alpha_i$, the outcome value β can be a lower value, and if the child 605 is relatively unsuccessful by not matching most of the articles within the prompted article combination $\alpha_i$, the outcome value β can be a higher value. In this case, Q- and S-type learning methodologies can be used. In contrast to the duck game 200 where the outcome value β measured the success or failure of a duck move relative to the game player, the performance of a prompted article combination $\alpha_i$ is not characterized as being successful or unsuccessful, since the doll 600 is not competing with the child 605, but rather serves to teach the child 605.

The probability update module 720 is configured to generate and update the article probability distribution p in a manner directed by the intuition module 715, with the article probability distribution p containing forty-three probability values $p_i$ corresponding to the forty-three article combinations $\alpha_i$. In the illustrated embodiment, the forty-three article combinations $\alpha_i$ are divided amongst three article combination subsets $\alpha_s$: $\alpha_{s1}$ for the nine single article combinations; $\alpha_{s2}$ for the twenty-two double article combinations; and $\alpha_{s3}$ for the twelve three article combinations. When updating the article probability distribution p, the three article combination subsets $\alpha_s$ are updated as three actions, with the effects of each updated article combination subset $\alpha_s$ being evenly distributed amongst the article combinations $\alpha_i$ in the respective subset $\alpha_s$. For example, if the single article combination subset $\alpha_{s1}$ is increased by ten percent, each of the single article combinations $\alpha_1$-$\alpha_9$ will be correspondingly increased by ten percent.

The article selection module 725 is configured for receiving the article probability distribution p from the probability update module 720, and pseudo-randomly selecting the article combination $\alpha_i$ therefrom in the same manner as the game move selection module 325 of the program 300 selects a game move $\alpha_i$ from a selected game move subset $\alpha_s$. Specifically, pseudo-random selection can be accomplished by first generating a progressive sum of the probability values $p_i$. For example, Table 5 sets forth exemplary normalized probability values and a progressive sum for the forty-three article combinations $\alpha_i$ of the article probability distribution p:

TABLE 5

Progressive Sum of Probability Values For Forty-Three Exemplary Article Combinations

| Game Move | Normalized Probability Value | Progressive Sum |
|---|---|---|
| $\alpha_1$ | 0.059 | 0.059 |
| $\alpha_2$ | 0.059 | 0.118 |
| $\alpha_3$ | 0.059 | 0.187 |
| . | . | . |
| . | . | . |
| . | . | . |
| $\alpha_9$ | 0.059 | 0.531 |
| $\alpha_{10}$ | 0.014 | 0.545 |
| $\alpha_{11}$ | 0.014 | 0.559 |
| $\alpha_{12}$ | 0.014 | 0.573 |
| . | . | . |
| . | . | . |
| $\alpha_{31}$ | 0.014 | 0.839 |
| $\alpha_{32}$ | 0.013 | 0.852 |
| $\alpha_{33}$ | 0.013 | 0.865 |
| . | . | . |
| . | . | . |
| $\alpha_{43}$ | 0.013 | 1.000 |

The article selection module 725 then selects a random number between "0" and "1", and selects the article combination $\alpha_i$ corresponding to the next highest progressive sum value. For example, if the randomly selected number is 0.562, article combination $\alpha_{11}$ (i.e., purse and pants) will be selected.

In an alternative embodiment, the article probability distribution p contains three probability values $p_i$ respectively corresponding to three article combination subsets $\alpha_s$, one of which can then be pseudo-randomly selected therefrom. In a sense, the article combination subsets $\alpha_s$ are treated as actions to be selected. For example, Table 6 sets forth exemplary normalized probability values and a progressive sum for the three article combination subsets $\alpha_s$ of the article probability distribution p:

TABLE 6

Progressive Sum of Probability Values For Three Exemplary Article Combination Subsets

| Game Move | Normalized Probability Value | Progressive Sum |
|---|---|---|
| $\alpha_1$ | 0.65 | 0.65 |
| $\alpha_2$ | 0.25 | 0.90 |
| $\alpha_3$ | 0.10 | 1.00 |

The article selection module 725 then selects a random number between "0" and "1," and selects the article combination subset $\alpha_s$ corresponding to the next highest progressive sum value. For example, if the randomly selected number is 0.78, article combination subset $\alpha_{s2}$ will be selected. After the article combination subset $\alpha_s$ has been pseudo-randomly selected, the article selection module 725 then randomly selects an article combination $\alpha_i$ from that selected combination subset $\alpha_s$. For example, if the second article combination subset $\alpha_s$ was selected, the article selection module 725 will randomly select one of the twenty-two double article combinations $\alpha_{10}$-$\alpha_{31}$.

The intuition module 715 is configured to modify the functionality of the probability update module 720 based on the performance index $\phi$, and in this case, the current skill level of the child 605 relative to the current teaching level of the doll 600. In the preferred embodiment, the performance index $\phi$ is quantified in terms of the degree of difficulty of the currently prompted article combination $\alpha_i$ and the outcome value $\beta$ (i.e., whether or not the child 605 successfully matched the article combination $\alpha_i$). In this respect, the performance index $\phi$ is instantaneous. It should be appreciated, however, that the performance of the educational program 700 can also be based on a cumulative performance index $\phi$. For example, the educational program 700 can keep track of a percentage of the child's matching article combinations $\lambda_x$ broken down by difficulty level of the prompted article combinations $\alpha_i$.

It can be appreciated, that applying only one article to the doll 600 is an easier task than applying two articles to the doll 600, which is in turn an easier task then applying three articles to the doll 600 in an given time. The intuition module 715 will attempt to "push" the child's skill level higher, so that the child 605 will consistently be able to correctly apply two articles, and then three articles 610, to the doll 600.

The intuition module 715 modifies the functionality of the probability update module 720 by determining which updating methodology will be used. The intuition module 715 also determines which article combination $\alpha$ will be rewarded or penalized, which is not necessarily the article combination that was previously selected by the article selection module 725.

Referring to FIGS. 13a-f, various methodologies can be selected by the intuition module 715 to update the article probability distribution p, given a currently prompted article combination $\alpha_i$ and outcome value $\beta$. Although, the probability values $p_i$ in the article probability distribution p have been described as corresponding to the individual article combinations $\alpha$, for purposes of simplicity and brevity, the probability values $p_i$ depicted in FIGS. 13a-f respectively correspond with the single, double and triple article combination subsets $\alpha_s$. As will be described in further detail below, the intuition module 715 directs the probability update module 720 to shift the article probability distribution p from probability value(s) $p_i$ corresponding to article combinations $\alpha_i$ associated with lesser difficult levels to probability value(s) $p_i$ corresponding to article combinations $\alpha_i$ associated with greater difficult levels when the child 605 is relatively successful at matching the prompted article combination $\alpha_i$, and to shift the article probability distribution p from probability value(s) $p_i$ corresponding to article combinations $\alpha_i$ associated with greater difficult levels to probability value(s) $p_i$ corresponding to article combinations $\alpha_i$ associated with lesser difficult levels when the child 605 is relatively unsuccessful at matching the prompted article combination $\alpha_i$. In the illustrated embodiment, P-type learning methodologies ($\beta$ equals either "0" or "1") are used, in which case, it is assumed that the child 605 is absolutely successful or unsuccessful at matching the prompted article combination $\alpha_i$. Alternatively, Q- and S-type learning methodologies ($\beta$ is between "0" and "1") are used, in which case, it is assumed that the child 605 can partially match or not match the prompted article combination $\alpha_i$. For example, the outcome value $\beta$ may be a lesser value if the child 605 matches most of the articles in the prompted article combination $\alpha_i$, (relatively successful), and may be a greater value if the child 605 does not match most of the articles in the prompted article combination $\alpha_i$, (relatively unsuccessful).

Figure 13A:
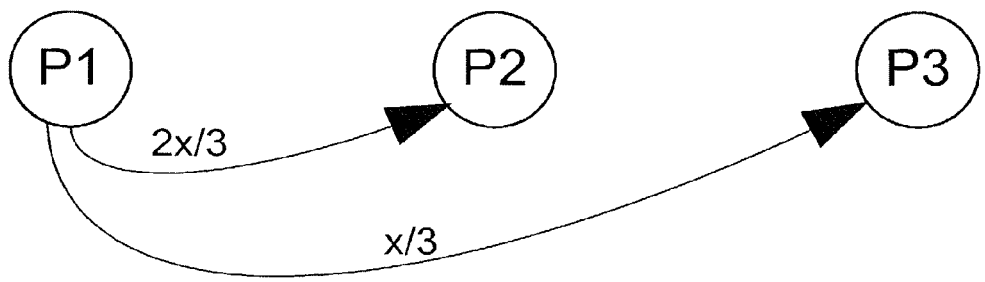
FIGS. 13a-13f are diagrams illustrating probability distribution modifications performed by the educational program of FIG. 12.

FIG. 13a illustrates a methodology used to update the article probability distribution p when a single article combination subset $\alpha_{s1}$ is currently selected, and the child 605 succeeds in matching the prompted article combination $\alpha$ (i.e., $\beta=0$). In this case, the intuition module 715 will attempt to drive the child's skill level from the single article combination subset $\alpha_{s1}$ to the double article combination subset $\alpha_{s2}$ by increasing the probability that the child 605 will subsequently be prompted by the more difficult double subset combination sets $\alpha_{s2}$ and triple subset combination sets $\alpha_{s3}$. The intuition module 715 accomplishes this be shifting the probability distribution p from the probability value $p_1$ to the probability values $p_2$ and $p_3$ Specifically, the single article combination subset $\alpha_{s1}$ is penalized by subtracting a proportionate value equal to "x" (e.g., ⅕ of $p_1$) from probability value $p_1$ and distributing it to the probability values $p_2$ and $p_3$.

Since the child's success with a single article combination set $\alpha_{s1}$ indicates that the child 605 may be relatively proficient at double article combinations $\alpha_{s2}$, but not necessarily the more difficult triple article combinations $\alpha_{s3}$, the probability value $p_2$ is increased more than the probability value $p_3$ to ensure that the child's skill level is driven from the single article combination subset $\alpha_{s1}$ to the double article combination subset $\alpha_{s2}$, and not overdriven to the third article combination subset $\alpha_{s3}$. For example, the proportions of "x" added to the probability values $p_2$ and $p_3$ can be ⅔ and ⅓, respectively. In effect, the learning process will be made smoother for the child 605. Notably, the methodology illustrated in FIG. 13a allows control over the relative amounts that are added to the probability values $p_2$ and $p_3$. That is, the amount added to the probability value $p_2$ will always be greater than the amount added to the probability value $p_3$ irrespective of the current magnitudes of the probability values $p_2$ and $p_3$, thereby ensuring a smooth learning process.

General equations [20] and [21a] can be used to implement the learning methodology illustrated in FIG. 13a. Given that $h_1(p(k))=(\tfrac{1}{5})p_1(k)$, $d_{12}=\tfrac{2}{3}$, and $d_{13}=\tfrac{1}{3}$, equations [20] and [21a] can be broken down into:

$$p_1(k+1) = p_1(k) - h_1(p(k)) = p_1(k) - \frac{1}{5}p_1(k) = \frac{4}{5}p_1(k); \qquad [20\text{-}1]$$

$$p_2(k+1) = p_2(k) + \left(\frac{2}{3}\right)\left(\frac{1}{5}\right)p_1(k) = p_2(k) + \frac{2}{15}p_1(k); \text{ and} \qquad [21a\text{-}1]$$

$$p_3(k+1) = p_3(k) + \left(\frac{1}{3}\right)\left(\frac{1}{5}\right)p_1(k) = p_3(k) + \frac{1}{15}p_1(k) \qquad [21a\text{-}2]$$

Figure 13B:
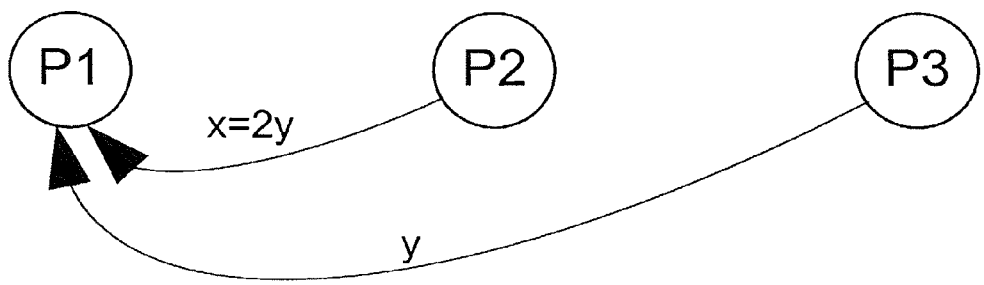

FIG. 13b illustrates a methodology used to update the article probability distribution p when a single article combination subset $\alpha_{s1}$ is currently selected, and the child 605 does not succeed in matching the prompted article combination $\alpha$ (i.e., $\beta=1$). In this case, the intuition module 715 will attempt to prevent over-challenging the child 605 by decreasing the probability that the child 605 will subsequently be prompted by the more difficult double and triple subset combination sets $\alpha_{s2}$ and $\alpha_{s3}$. The intuition module 715 accomplishes this be shifting the probability distribution p from the probability values $p_2$ and $p_3$ to the probability value $p_1$. Specifically, the single article combination subset $\alpha_{s1}$ is rewarded by subtracting a proportional value equal to "x" from probability value $p_2$ and adding it to the probability value $p_1$, and subtracting a proportionate value equal to "y" from probability value $p_3$ and adding it to the probability value $p_1$.

Since the child's failure with a single article combination set $\alpha_{s1}$ indicates that the child 605 may not be proficient at double and triple article combinations $\alpha_{s2}$ and $\alpha_{s3}$, the intuition module 715 attempts to adapt to the child's apparently low skill level by decreasing the probability values $p_2$ and $p_3$ as quickly as possible. Because the probability value $p_2$ will most likely be much greater than the probability value $p_3$ if the child 605 is not proficient at the single article combination sets $\alpha_{s2}$, the intuition module 715 adapts to the child's low skill level by requiring that the proportionate amount that is subtracted from the probability value $p_2$ be greater than that subtracted from the probability value $p_3$, i.e., the proportionate value "x" is set higher than the proportional value "y". For example, "x" can equal 2/15 and "y" can equal 1/15.

Notably, the methodology illustrated in FIG. 13b allows control over the proportionate amounts that are subtracted from the probability values $p_2$ and $p_3$ and added to the probability value $p_1$, so that the doll 600 can quickly adapt to a child's lower skill level in a stable manner. That is, if the probability values $p_2$ and $p_3$ are relatively high, a proportionate amount subtracted from these probability values will quickly decrease them and increase the probability value $p_1$, whereas if the probability values $p_2$ and $p_3$ are relatively low, a proportionate amount subtracted from these probability values will not completely deplete them.

General equations [6a]-[7a] can be used to implement the learning methodology illustrated in FIG. 13b. Given that $g_{12}(k)=(2/15)p_2(k)$ and $g_{13}(p(k))=(1/15)p_3(k)$, equations [6a]-[7a] can be broken down into:

$$p_1(k+1) = p_1(k) + \sum_{j=2}^{3} g_{1j}(p(k)) \qquad [6a\text{-}1]$$
$$= p_1(k) + \frac{2}{15}p_2(k) + \frac{1}{15}p_3(k);$$

$$p_2(k+1) = p_2(k) - g_{12}(p(k)) \qquad [7a\text{-}1]$$
$$= p_2(k) - \frac{2}{15}p_2(k)$$
$$= \frac{13}{15}p_2(k); \text{ and}$$

$$p_3(k+1) = p_3(k) - g_{13}(p(k)) \qquad [7a\text{-}2]$$
$$= p_3(k) - \frac{1}{15}p_3(k)$$
$$= \frac{14}{15}p_3(k)$$

Figure 13C:
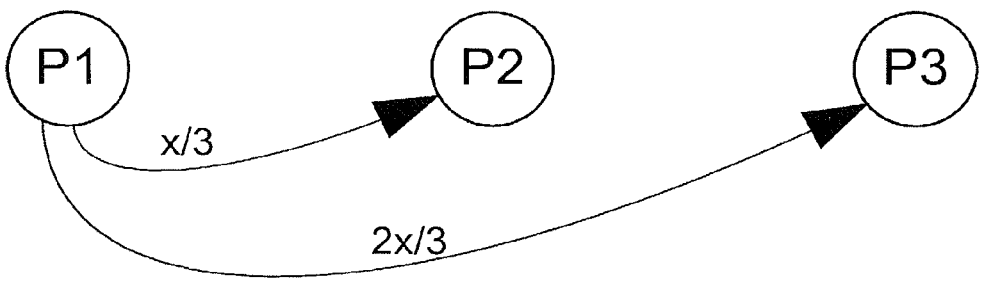

FIG. 13c illustrates a methodology used to update the article probability distribution p when a double article combination subset $\alpha_{s2}$ is currently selected, and the child 605 succeeds in matching the prompted article combination $\alpha$ (i.e., $\beta=0$). In this case, the intuition module 715 will attempt to drive the child's skill level from the double article combination subset $\alpha_{s2}$ to the triple article combination subset $\alpha_{s3}$ by increasing the probability that the child 605 will subsequently be prompted by the more difficult triple subset combination sets $\alpha_{s3}$. The intuition module 715 accomplishes this be shifting the probability distribution p from the probability value $p_1$ to the probability values $p_2$ and $p_3$. Specifically, the single article combination subset $\alpha_{s1}$ is penalized by subtracting a proportionate value equal to "x" (e.g., 1/5 of $p_1$) from probability value $p_1$ and distributing it to the probability values $p_2$ and $p_3$.

Since the child's success with a double article combination set $\alpha_{s2}$ indicates that the child 605 may be relatively proficient at triple article combinations $\alpha_{s2}$, the probability value $p_3$ is increased more than the probability value $p_2$ to ensure that the child's skill level is driven from the double article combination subset $\alpha_{s2}$ to the triple article combination subset $\alpha_{s3}$. For example, the proportions of "x" added to the probability values $p_2$ and $p_3$ can be 1/3 and 2/3, respectively. Notably, the methodology illustrated in FIG. 13c allows control over the relative amounts that are added to the probability values $p_2$ and $p_3$. That is, the amount added to the probability value $p_3$ will always be greater than the amount added to the probability value $p_2$ irrespective of the current magnitudes of the probability values $p_2$ and $p_3$, thereby ensuring that the child's skill level is driven towards the triple article combination subset $\alpha_{s3}$, rather than maintaining the child's skill level at the double article combination subset $\alpha_{s2}$.

General equations [20] and [21a] can be used to implement the learning methodology illustrated in FIG. 13c. Given that $h_1(p(k))=(1/5)p_1(k)$, $d_{12}=1/3$, and $d_{13}=2/3$, equations [20] and [21a] can be broken down into:

$$p_1(k+1) = p_1(k) - h_1(p(k)) = p_1(k) - \frac{1}{5}p_1(k) = \frac{4}{5}p_1(k); \qquad [20\text{-}2]$$

$$p_2(k+1) = p_2(k) + \left(\frac{1}{3}\right)\left(\frac{1}{5}\right)p_1(k) = p_2(k) + \frac{1}{15}p_1(k); \qquad [21a\text{-}3]$$

and $$p_3(k+1) = p_3(k) + \left(\frac{2}{3}\right)\left(\frac{1}{5}\right)p_1(k) = p_3(k) + \frac{2}{15}p_1(k) \qquad [21a\text{-}4]$$

Figure 13D:
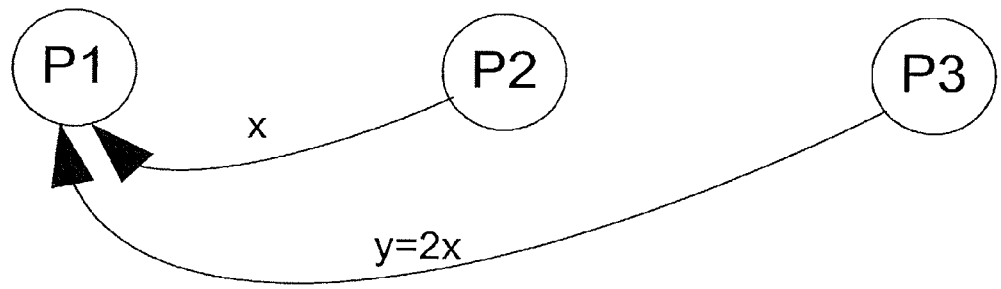

FIG. 13d illustrates a methodology used to update the article probability distribution p when a double article combination subset $\alpha_{s2}$ is currently selected, and the child 605 does not succeed in matching the prompted article combination $\alpha$ (i.e., $\beta=1$). In this case, the intuition module 715 will attempt to prevent over-challenging the child 605 by decreasing the probability that the child 605 will subsequently be prompted by the more difficult double and triple subset combination sets $\alpha_{s2}$ and $\alpha_{s3}$. The intuition module 715 accomplishes this by shifting the probability distribution p from the probability values $p_2$ and $p_3$ to the probability value $p_1$. Specifically, the single article combination subset $\alpha_{s1}$ is rewarded by subtracting a proportional value equal to "x" from probability value $p_2$ and adding it to the probability value $p_1$, and subtracting a proportionate value equal to "y" from probability value $p_3$ and adding it to the probability value $p_1$.

Since the child's failure with a double article combination set $\alpha_{s2}$ indicates that the child 605 may not be proficient at triple article combinations $\alpha_{s2}$, the probability value $p_3$ is decreased more than the probability value $p_2$. The intuition module 715 accomplishes this by requiring that the proportionate amount that is subtracted from the probability value $p_3$ be greater than that subtracted from the probability value $p_2$, i.e., the proportionate value "y" is set higher than the proportional value "x". For example, "x" can equal 1/15 and "y" can equal 2/15.

Notably, the methodology illustrated in FIG. 13d allows control over the proportionate amounts that are subtracted from the probability values $p_2$ and $p_3$ and added to the probability value $p_1$, so that the doll 600 can quickly adapt to a child's lower skill level in a stable manner. That is, if the probability values $p_2$ and $p_3$ are relatively high, a proportionate amount subtracted from these probability values will quickly decrease them and increase the probability value $p_1$, whereas if the probability values $p_2$ and $p_3$ are relatively low, a proportionate amount subtracted from these probability values will not completely deplete them.

General equations [6a]-[7a] can be used to implement the learning methodology illustrated in FIG. 13d. Given that $g_{12}(p(k))=(1/15)p_2(k)$ and $g_{13}p(k))=(2/15)p_3(k)$, equations [6a]-[7a] can be broken down into:

$$p_1(k+1) = p_1(k) + \sum_{j=2}^{3} g_{1j}(p(k)) \quad [6a\text{-}2]$$

$$= p_1(k) + \frac{1}{15}p_2(k) + \frac{2}{15}p_3(k);$$

$$p_2(k+1) = p_2(k) - g_{12}(p(k)) \quad [7a\text{-}3]$$

$$= p_2(k) - \frac{1}{15}p_2(k)$$

$$= \frac{14}{15}p_2(k);$$

and $$p_3(k+1) = p_3(k) - g_{13}(p(k)) \quad [7a\text{-}4]$$

$$= p_3(k) - \frac{2}{15}p_3(k)$$

$$= \frac{13}{15}p_3(k)$$

Figure 13E:
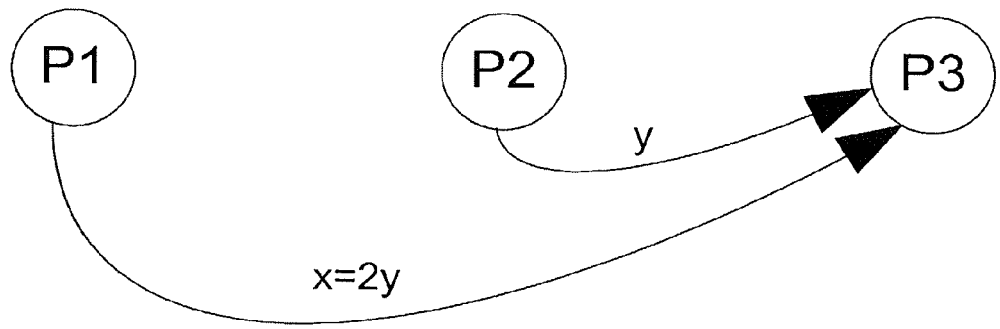

FIG. 13e illustrates a methodology used to update the article probability distribution p when a triple article combination subset $\alpha_{s3}$ is currently selected, and the child 605 succeeds in matching the prompted article combination $\alpha$ (i.e., $\beta=0$). In this case, the intuition module 715 will attempt to drive the child's skill level further to the triple article combination subset $\alpha_{s3}$ by increasing the probability that the child 605 will subsequently be prompted by the more difficult triple subset combination sets $\alpha_{s3}$. The intuition module 715 accomplishes this be shifting the probability distribution p from the probability values $p_1$ and $p_2$ to the probability value $p_3$. Specifically, the triple article combination subset $\alpha_{s1}$ is rewarded by subtracting a proportional value equal to "x" from probability value $p_1$ and adding it to the probability value $p_3$, and subtracting a proportionate value equal to "y" from probability value $p_2$ and adding it to the probability value $p_3$.

Since the child 605 is much more proficient at single article combinations $\alpha_{s1}$ than with double article combinations $\alpha_{s2}$, the intuition module 715 attempts to reduce the probability value $p_1$ more than the probability value $p_2$. The intuition module 715 accomplishes this by requiring that the proportionate amount that is subtracted from the probability value $p_1$ be greater than that subtracted from the probability value $p_2$, i.e., the proportionate value "x" is set higher than the proportional value "y". For example, "x" can equal $2/15$ and "y" can equal $1/15$.

Notably, the methodology illustrated in FIG. 13e allows control over the proportionate amounts that are subtracted from the probability values $p_2$ and $p_3$ and added to the probability value $p_1$, so that the doll 600 can quickly adapt to a child's higher skill level in a stable manner. That is, if the probability values $p_1$ and $p_2$ are relatively high, a proportionate amount subtracted from these probability values will quickly decrease them and increase the probability value $p_3$, whereas if the probability values $p_1$ and $p_2$ are relatively low, a proportionate amount subtracted from these probability values will not completely deplete them.

General equations [6a]-[7a] can be used to implement the learning methodology illustrated in FIG. 13e. Given that $g_{31}(p(k))=(2/15)p_1(k)$ and $g_{32}(p(k))=(1/15)p_2(k)$, equations [6a]-[7a] can be broken down into:

$$p_3(k+1) = p_3(k) + \sum_{j=1}^{2} g_{3j}(p(k)) \quad [6a\text{-}3]$$

$$= p_3(k) + \frac{2}{15}p_1(k) + \frac{1}{15}p_2(k);$$

$$p_1(k+1) = p_1(k) - g_{31}(p(k)) \quad [7a\text{-}5]$$

$$= p_1(k) - \frac{2}{15}p_1(k)$$

$$= \frac{13}{15}p_1(k);$$

and $$p_2(k+1) = p_2(k) - g_{32}(p(k)) \quad [7a\text{-}6]$$

$$= p_2(k) - \frac{1}{15}p_2(k)$$

$$= \frac{14}{15}p_2(k)$$

Figure 13F:
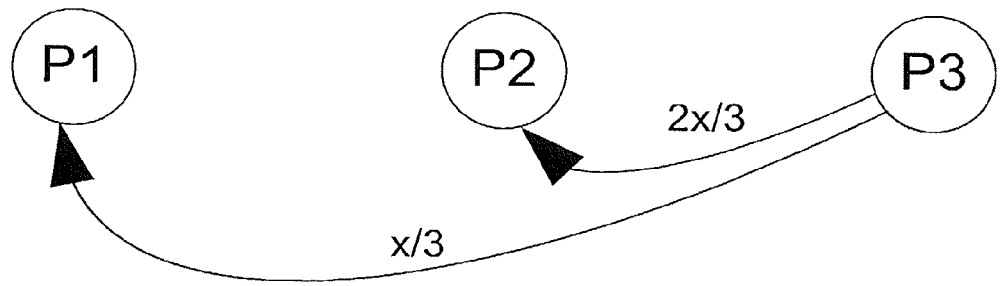

FIG. 13f illustrates a methodology used to update the article probability distribution p when a triple article combination subset $\alpha_{s3}$ is currently selected, and the child 605 does not succeed in matching the prompted article combination $\alpha$ (i.e., $\beta=1$). In this case, the intuition module 715 will attempt to prevent over-challenging the child 605 by decreasing the probability that the child 605 will subsequently be prompted by the more difficult triple subset combination set $\alpha_{s3}$. The intuition module 715 accomplishes this be shifting the probability distribution p from the probability value $p_3$ to the probability values $p_1$ and $p_2$. Specifically, the triple article combination subset $\alpha_{s3}$ is penalized by subtracting a proportionate value equal to "x" (e.g., $1/5$ of $p_3$) from probability value $p_3$ and distributing it to the probability values $p_1$ and $p_2$.

Since the child's failure with a triple article combination set $\alpha_{s1}$ indicates that the child 605 may not be relatively proficient at double article combinations $\alpha_{s2}$, but not necessarily not proficient with the easier single article combinations $\alpha_{s1}$, the probability value $p_2$ is increased more than the probability value $p_1$ to ensure that the child 605 is not under-challenged with single article combination subsets $\alpha_{s1}$. For example, the proportions of "x" added to the probability values $p_1$ and $p_2$ can be $1/3$ and $2/3$, respectively. Notably, the methodology illustrated in FIG. 13f allows control over the relative amounts that are added to the probability values $p_1$ and $p_2$. That is, the amount added to the probability value $p_2$ will always be greater than the amount added to the probability value $p_1$ irrespective of the current magnitudes of the probability values $p_1$ and $p_2$, thereby ensuring that the child 605 is not under-challenged with single article combination subsets $\alpha_{s1}$.

General equations [20] and [21a] can be used to implement the learning methodology illustrated in FIG. 13f. Given that $h_3(p(k))=(1/5)p_3(k)$, $d_{31}=1/3$, and $d_{32}=2/3$, equations [20] and [21a] can be broken down into:

$$p_3(k+1) = p_3(k) - h_3(p(k)) = p_3(k) - \frac{1}{5}p_3(k) = \frac{4}{5}p_3(k); \quad [20\text{-}3]$$

$$p_1(k+1) = p_1(k) + \left(\frac{1}{3}\right)\left(\frac{1}{5}\right)p_3(k) = p_1(k) + \frac{1}{15}p_3(k); \quad [21a\text{-}5]$$

and $$p_2(k+1) = p_2(k) + \left(\frac{2}{3}\right)\left(\frac{1}{5}\right)p_3(k) = p_2(k) + \frac{2}{15}p_3(k) \quad [21a\text{-}6]$$

Although the intuition module 715 has been previously described as selecting the learning methodologies based merely on the difficulty of the currently prompted article combination $\alpha_i$ and the outcome value $\beta$, the intuition module 715 may base its decision on other factors, such as the current probability values $p_i$. For example, assuming a single article combination subset $\alpha_{s1}$ is currently selected, and the child 605 succeeds in matching the prompted article combination $\alpha$ (i.e., $\beta=0$), if probability value $p_3$ is higher than probability value $p_2$, a modified version of the learning methodology illustrated in FIG. 13*a* can be selected, wherein the all of the amount subtracted from probability value $p_1$ can be added to probability value $p_2$ to make the learning transition smoother.

Figure 14:
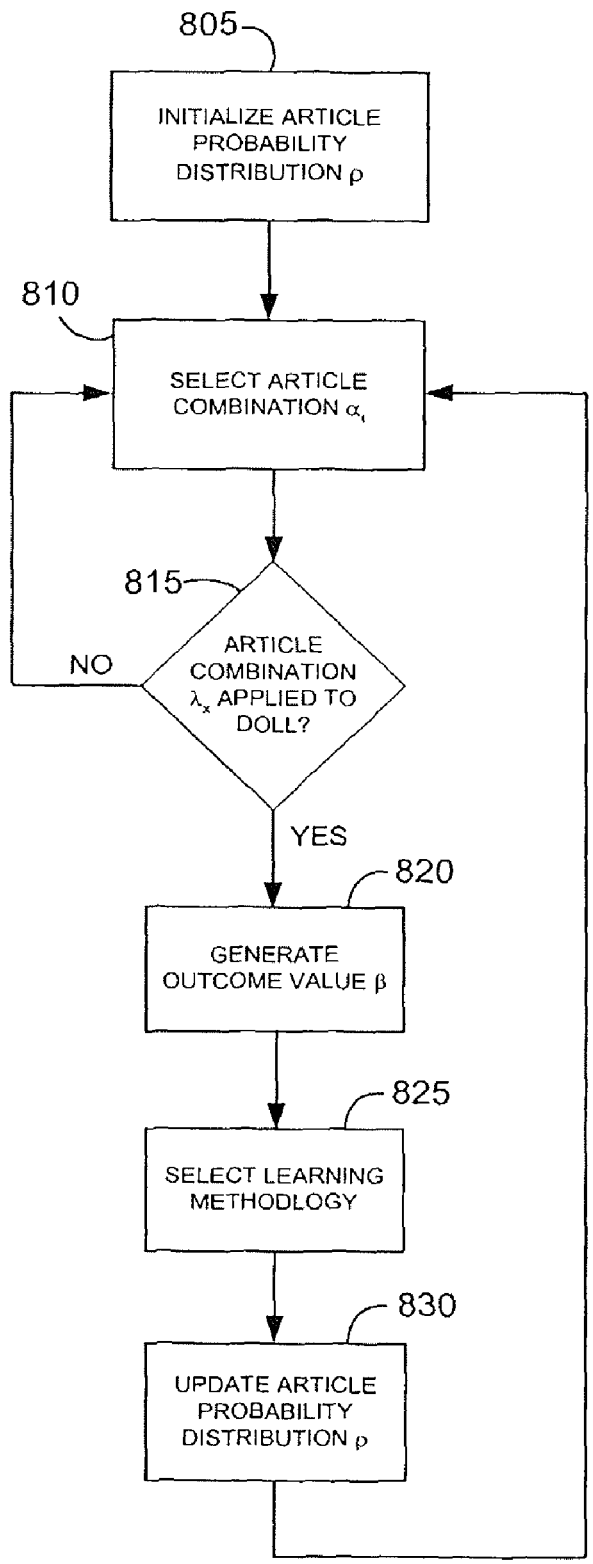
FIG. 14 is a flow diagram illustrating a preferred method performed by the educational program of FIG. 12.

Having now described the structure of the educational program 700, the steps performed by the educational program 700 will be described with reference to FIG. 14. First, the probability update module 720 initializes the article probability distribution p (step 805). For example, the educational program 700 may assume that the child 605 initially exhibits a relatively low skill level with the doll 600, in which case, the initial combined probability values $p_i$ corresponding to the single article combination subset $\alpha_{s1}$ can equal 0.80, and the initial combined probability values $p_i$ corresponding to the double article combination subset $\alpha_{s2}$ can equal 0.20. Thus, the probability distribution p is weighted towards the single article combination subset $\alpha_{s1}$, so that, initially, there is a higher probability that the child 605 will be prompted with the easier single article combinations $\alpha_i$.

The article selection module 725 then pseudo-randomly selects an article combination $\alpha_i$ from the article probability distribution p, and accordingly prompts the child 605 with that selected article combination $\alpha_i$ (step 810). In the alternative case where the article probability distribution p only contains three probability values $p_i$ for the respective three article combination subsets $\alpha_s$, the article section module 725 pseudo-randomly selects an article combination subset $\alpha_s$, and then from the selected article combination subset $\alpha_s$, randomly selects an article combination $\alpha_i$.

After the article combination $\alpha_i$ has been selected, the outcome evaluation module 730 then determines whether the article combination $\lambda_x$ has been selected by the child 605, i.e., whether the child has applied the articles 610 to the doll 600 (step 815). To allow the child 605 time to apply the articles 610 to the doll 600 or to change misapplied articles 610, this determination can be made after a certain period of time has expired (e.g., 10 seconds). If an article combination $\lambda_x$ has not been selected by the child 605 at step 815, the educational program 700 then returns to step 815 where it is again determined if an article combination $\lambda_x$ has been selected. If an article combination $\lambda_x$ has been selected by the child 605, the outcome evaluation module 730 then determines if it matches the article combination $\alpha_i$ prompted by the doll 600, and generates the outcome value $\beta$ in response thereto (step 820).

The intuition module 715 then modifies the functionality of the probability update module 720 by selecting the learning methodology that is used to update the article probability distribution p based on the outcome value $\beta$ and the number of articles contained within the prompted article combination $\alpha_i$ (step 825). Specifically, the intuition module 715 selects (1) equations [20-1], [21a-1], and [21a-2] if the article combination $\lambda_x$ selected by the child 605 matches a prompted single article combination $\alpha_i$; (2) equations [6a-1], [7a-1], and [7a-2] if the article combination $\lambda_x$ selected by the child 605 does not match a prompted single article combination $\alpha_i$; (3) equations [20-2], [21a-3], and [21a-4] if the article combination $\lambda_x$ selected by the child 605 matches a prompted double article combination $\alpha_i$; (4) equations [6a-2], [7a-3], and [7a-4] if the article combination $\lambda_x$ selected by the child 605 does not match a prompted double article combination $\alpha_i$; (5) equations [6a-3], [7a-5], and [7a-6] if the article combination $\lambda_x$ selected by the child 605 matches a prompted triple article combination $\alpha_i$; and (6) equations [20-3], [21a-5], and [21a-6] if the article combination $\lambda_x$ selected by the child 605 does not match a prompted triple article combination $\alpha_i$.

The probability update module 720 then, using equations selected by the intuition module 715, updates the article probability distribution p (step 830). Specifically, when updating the article probability distribution p, the probability update module 720 initially treats the article probability distribution p as having three probability values $p_i$ corresponding to the three article combination subsets $\alpha_s$. After the initial update, the probability update module 720 then evenly distributes the three updated probability values $p_i$ among the probability values $p_i$ corresponding to the article combinations $\alpha$. That is, the probability value $p_i$ corresponding to the single article combination subset $\alpha_{s1}$ is distributed among the probability values $p_i$ corresponding to the nine single article combinations $\alpha_i$; the probability value $p_i$ corresponding to the double article combination subset $\alpha_{s2}$ is distributed among the probability values $p_i$ corresponding to the twenty-two double article combinations $\alpha_i$; and the probability value $p_i$ corresponding to the triple article combination subset $\alpha_{s3}$ is distributed among the probability values $p_i$ corresponding to the twelve triple article combinations $\alpha_i$. In the alternative embodiment where the article probability distribution p actually contains three article probability values $p_i$ corresponding to the three article combination subsets $\alpha_s$, the probability update module 720 simply updates the three article probability values $p_i$, which are subsequently selected by the article selection module 725. The program 700 then returns to step 810.

Figure 15:
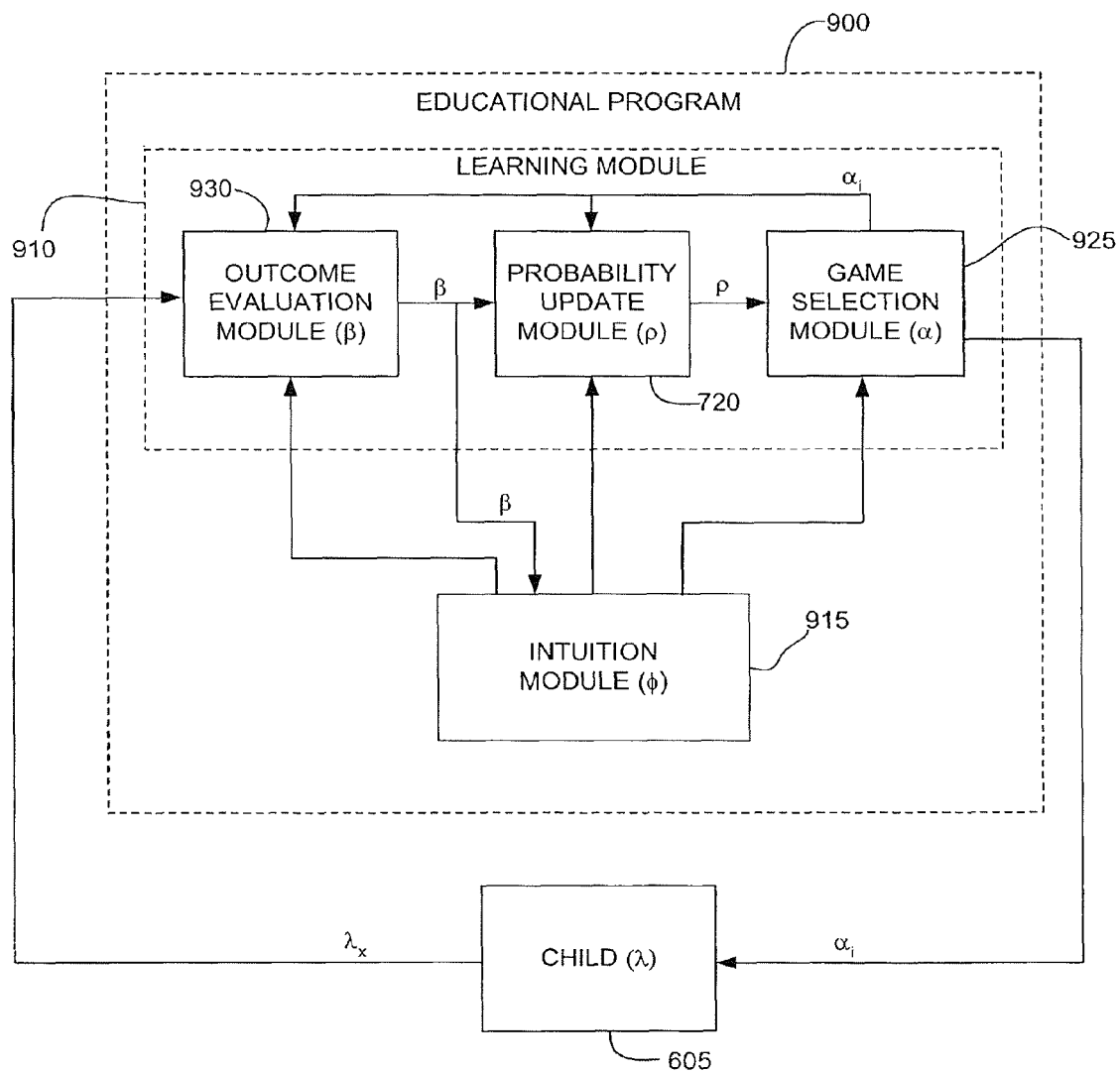
FIG. 15 is a block diagram of another single-user educational program that can be employed in a modification of the educational child's toy of FIG. 11.

Although the actions on which the program 700 operates has previously been described as related to prompted tasks, e.g., article combinations, the actions can also relate to educational games that can be played by the child 605. Another single-player educational program 900 (shown in FIG. 15) developed in accordance with the present inventions is described in the context of a modification of the previously described child's learning toy 600 (shown in FIG. 11).

The modified doll 600 can contain three educational games (represented by games $\alpha_1$-$\alpha_3$) that can be presented to the child 605. These educational games will have different degrees of difficulty. For example, the first game $\alpha_1$ can be a relatively easy article matching game that prompts the child 605 to apply the articles one at a time to the doll 600. The second game $\alpha_2$ can be a more difficult color matching memory game that prompts the child 605 with a series of colors that the child 605 could input using a color keypad (not shown). The third game $\alpha_3$ can be an even more difficult cognition game that prompts the child 605 with a number that the child 605 responds with color coded numbers the sum of which should add up to the prompted number.

In this case, the doll 600 seeks to challenge the child 605 by presenting him or her with more difficult games as the child 605 masters the doll 600. For example, if the child 605 exhibits a proficiency at the article matching game $\alpha_1$, the doll 600 will less frequently present the child 605 with the article matching game $\alpha_1$, and more frequently present the child 605 with color matching memory game $\alpha_2$ and cognition game $\alpha_3$. If the child 605 exhibits a proficiency at the color matching memory game $\alpha_2$, the doll 600 will less frequently present the child 605 with the article matching game $\alpha_1$ and color matching memory game $\alpha_2$, and more frequently present the child 605 with the cognition game $\alpha_3$. If the child 605 exhibits a proficiency at the cognition game $\alpha_3$, the doll 600 will even more frequently present the cognition game $\alpha_3$ to the child 605.

The doll 600 also seeks to avoid over challenging the child 605 and frustrating the learning process. For example, if the child 605 does not exhibit a proficiency at the cognition game $\alpha_3$, the doll 600 will less frequently present the child 605 with the cognition game $\alpha_3$ and more frequently present the child 605 with the article matching game $\alpha_1$ and color matching memory game $\alpha_2$. If the child 605 does not exhibit a proficiency at the color matching memory game $\alpha_2$, the doll 600 will less frequently present the child 605 with the color matching memory game $\alpha_2$ and cognition game $\alpha_3$, and more frequently present the child 605 with the article matching game $\alpha_1$. If the child 605 does not exhibit a proficiency at the article matching game $\alpha_1$, the doll 600 will even more frequently present the article matching game $\alpha_1$ to the child 605.

The educational program 900 is similar to the previously described educational program 700 with the exception that it treats the actions $\alpha_i$ as educational games, rather than article combinations, and treats the child actions $\lambda_x$ as actions to be input by the child 605 as specified by the currently played educational game, i.e., inputting articles in the case of the article matching game $\lambda_1$, inputting colors in the case of the color matching memory game $\alpha_2$, and inputting number coded colors in the case of the cognition game $\alpha_3$.

To this end, the educational program 900 generally includes a probabilistic learning module 910 and an intuition module 915, which are specifically tailored for the modified doll 600. The probabilistic learning module 910 comprises a probability update module 920, a game selection module 925, and an outcome evaluation module 930. Specifically, the probability update module 920 is mainly responsible for learning the child's current skill level, with the outcome evaluation module 930 being responsible for evaluating the educational games $\alpha_i$ presented by the doll 600 relative to the actions $\lambda_x$ selected by the child 605. The game selection module 925 is mainly responsible for using the learned skill level of the child 605 to select the games $\alpha_i$ that presented to the child 605. The intuition module 915 is responsible for directing the learning of the educational program 900 towards the objective, and specifically, dynamically pushing the skill level of the child 605 to a higher level. In this case, the intuition module 915 operates on the probability update module 920, and specifically selects the methodology that the probability update module 920 will use to update a game probability distribution p.

To this end, the outcome evaluation module 930 is configured to receive an educational game $\alpha_i$ from the game selection module 925 (i.e., one of the three educational games to be presented to the child 605 by the doll 600), and receive actions $\lambda_x$ from the child 605 (i.e., actions that the child 605 inputs into doll 600 during the current educational game $\alpha_i$). The outcome evaluation module 930 is also configured to determine whether the actions $\lambda_x$ received from the child 605 are successful within the selected educational game $\alpha_i$, with the outcome value $\beta$ equaling one of two predetermined values, e.g., "0" if the child actions $\lambda_x$ are successful within the selected educational game $\alpha_i$, and "1" if the child actions $\lambda_x$ is not successful within the selected educational game $\alpha_i$. In this case, a P-type learning methodology is used. Optionally, Q- and S-type learning methodologies can be used to quantify child actions $\lambda_x$ that are relatively successful or unsuccessful.

The probability update module 920 is configured to generate and update the game probability distribution p in a manner directed by the intuition module 915, with the article probability distribution p containing three probability values $p_i$ corresponding to the three educational games $\alpha_i$. The game selection module 925 is configured for receiving the article probability distribution p from the probability update module 920, and pseudo-randomly selecting the education game $\alpha_i$ therefrom in the same manner as the article selection module 725 of the program 700 selects article combination subsets $\alpha_s$.

The intuition module 915 is configured to modify the functionality of the probability update module 920 based on the performance index $\phi$, and in this case, the current skill level of the child 605 relative to the current teaching level of the doll 600. In the preferred embodiment, the performance index $\phi$ is quantified in terms of the degree of difficulty of the currently selected educational game $\alpha_i$ and the outcome value $\beta$ (i.e., whether or not the actions $\lambda_x$ selected by the child 605 are successful). In this respect, the performance index $\phi$ is instantaneous. It should be appreciated, however, that the performance of the educational program 900 can also be based on a cumulative performance index $\phi$. For example, the educational program 900 can keep track of a percentage of the child's successful with the educational games $\alpha_i$.

The intuition module 915 modifies the functionality of the probability update module 920 is the same manner as the previously described intuition module 715 modifies the functionality of the probability update module 720. That is, the intuition module 915 determines which updating methodology will be used and which educational game $\alpha$ will be rewarded or penalized in a manner similar to that described with respect to FIGS. 13a-f. For example, the intuition module 915 directs the probability update module 920 to shift the game probability distribution p from probability value(s) $p_i$ corresponding to educational games $\alpha_i$ associated with lesser difficult levels to probability value(s) $p_i$ corresponding to educational games $\alpha_i$ associated with greater difficult levels when the child 605 is relatively successful at the currently selected education game $\alpha_i$, and to shift the game probability distribution p from probability value(s) $p_i$ corresponding to educational games $\alpha_i$ associated with greater difficult levels to probability value(s) $p_i$ corresponding to educational games $\alpha_i$ associated with lesser difficult levels when the child 605 is relatively unsuccessful at the currently selected education game $\alpha_i$.

In the illustrated embodiment, P-type learning methodologies ($\beta$ equals either "0" or "1") are used, in which case, it is assumed that the child 605 is absolutely successful or unsuccessful in any given educational game $\alpha_i$. Alternatively, Q- and S-type learning methodologies ($\beta$ is between "0" and "1") are used, in which case, it is assumed that the child 605 can be partially successful or unsuccessful in any given educational game $\alpha_i$. For example, the outcome value $\beta$ may be a lesser value if most of the child actions $\lambda_x$ are successful, and may be a greater value if most of the child actions $\lambda_x$ are unsuccessful.

The intuition module 915 can select from the learning methodologies illustrated in FIGS. 13a-f. For example, the intuition module 915 can select (1) the methodology illustrated in FIG. 13a if the child 605 succeeds in the article matching game $\alpha_1$; (2) the methodology illustrated in FIG. 13b if the child 605 does not succeed in the article matching game $\alpha_1$; (3) the methodology illustrated in FIG. 13c if the child 605 succeeds in the color matching memory game $\alpha_2$; (4) the methodology illustrated in FIG. 13d if the child 605 does not succeed in the color matching memory game $\alpha_2$; (5) the methodology illustrated in FIG. 13e if the child 605 succeeds in the cognition game $\alpha_3$; and (6) the methodology illustrated in FIG. 13f if the child 605 does not succeed in the cognition game $\alpha_3$.

So that selection of the educational games $\alpha_i$ is not too erratic, the intuition module 915 may optionally modify the game selection module 925, so that it does not select the relatively easy article matching game $\alpha_1$ after the relatively difficult cognition game $\alpha_3$ has been selected, and does not select the relatively difficult cognition game $\alpha_3$ after the relatively easy article matching game $\alpha_1$ has been selected. Thus, the teaching level of the doll 600 will tend to play the article matching game $\alpha_1$, then the color matching memory game $\alpha_2$, and then the cognition game $\alpha_3$, as the child 605 learns.

Figure 16:
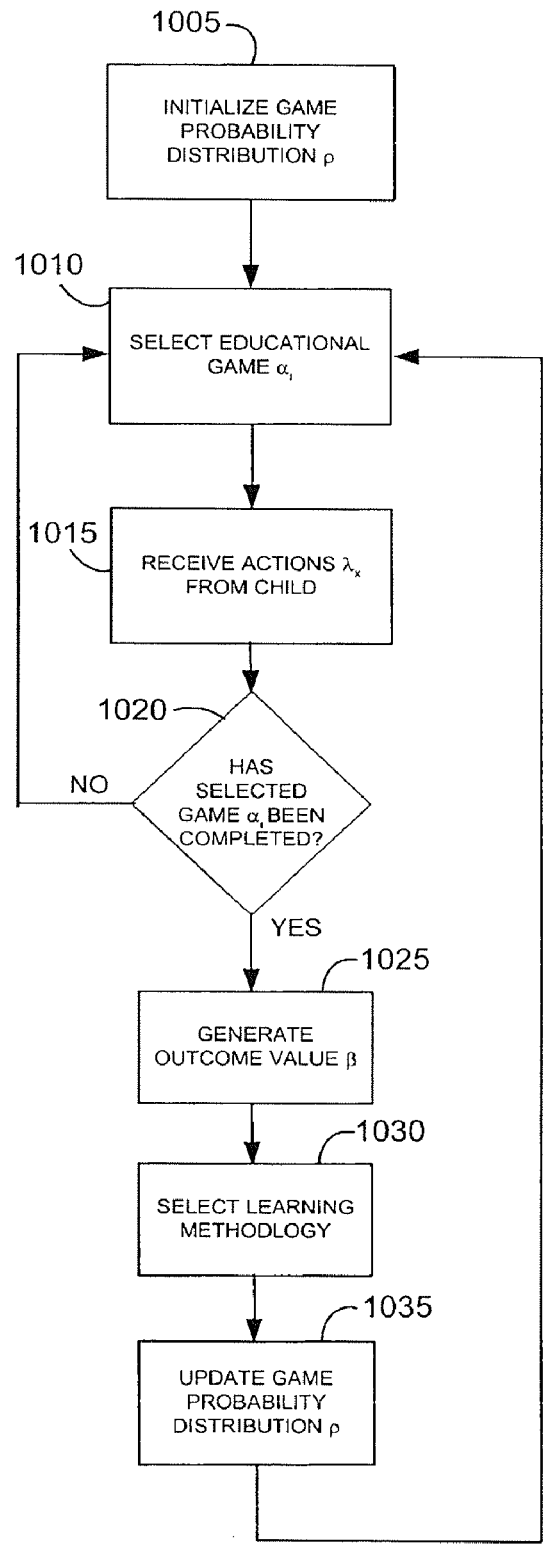
FIG. 16 is a flow diagram illustrating a preferred method performed by the educational program of FIG. 15.

Having now described the structure of the educational program 900, the steps performed by the educational program 900 will be described with reference to FIG. 16. First, the probability update module 920 initializes the game probability distribution p (step 1005). For example, the educational program 900 may assume that the child 605 initially exhibits a relatively low skill level with the doll 600, in which case, the initial probability values $p_i$ corresponding to the relatively easy article matching game $\alpha_1$ can equal 0.80, and the initial probability value $p_i$ corresponding to the color matching memory game $\alpha_2$ can equal 0.20. Thus, the probability distribution p is weighted towards the article matching game $\alpha_1$, so that, initially, there is a higher probability that the child 605 will be prompted with the easier article matching game $\alpha_i$.

The game selection module 925 then pseudo-randomly selects an educational game $\alpha_i$ from the game probability distribution p, and accordingly presents the child 605 with that selected game $\alpha_i$ (step 1010).

After the educational game $\alpha_i$ has been selected, the outcome evaluation module 930 then receives actions $\lambda_x$ from the child 605 (step 1015) and determines whether the game $\alpha_i$ has been completed (step 1020). If the selected educational game $\alpha_i$ has not been completed at step 1015, the educational program 900 then returns to step 1015 where it receives actions $\lambda_x$ from the child 605. If the selected educational game $\alpha_i$ has been completed at step 1015, the outcome evaluation module 930 then determines whether the actions $\lambda_x$ from the child 605 are successful, and generates the outcome value β in response thereto (step 1025).

The intuition module 915 then modifies the functionality of the probability update module 920 by selecting the learning methodology that is used to update the article probability distribution p based on the outcome value β and the currently played educational game $\alpha_i$ (step 1030). Specifically, the intuition module 915 selects (1) equations [20-1], [21a-1], and [21a-2] if the actions $\lambda_x$ selected by the child 605 within the article matching game $\alpha_i$ are relatively successful; (2) equations [6a-1], [7a-1], and [7a-2] if the actions $\lambda_x$ selected by the child 605 within the article matching game $\alpha_i$ are relatively unsuccessful; (3) equations [20-2], [21a-3], and [21a-4] if the actions $\lambda_x$ selected by the child 605 within the color matching memory game $\alpha_2$ are relatively successful; (4) equations [6a-2], [7a-3], and [7a-4] if the actions $\lambda_x$ selected by the child 605 within the color matching memory game $\alpha_2$ are relatively unsuccessful; (5) equations [6a-3], [7a-5], and [7a-6] if the actions $\lambda_x$ selected by the child 605 within the cognition game $\alpha_3$ are relatively successful; and (6) equations [20-3], [21a-5], and [21a-6] if the actions $\lambda_x$ selected by the child 605 within the cognition game $\alpha_3$ are relatively unsuccessful.

The probability update module 920 then, using equations selected by the intuition module 915, updates the article probability distribution p (step 1035). The program 900 then returns to step 1010 where the game selection module 925 again pseudo-randomly selects an educational game $\alpha_i$ from the game probability distribution p, and accordingly presents the child 605 with that selected game $\alpha_i$.

More Specific details on the above-described operation of the toy 600 can be found in the computer program listing appendix attached hereto and previously incorporated herein by reference. It is noted that the file "Intuition Intelligence-simonsays.doc" shows that the game can be played in two modes.

Specifically, in the hardware mode (communication through USB), the toy is connected to a digital logic board on a USB Controller board. A USB cable connects the USB port on the PC and the USB Controller board. A simple USB software driver on the PC aids in reading the "code" that is generated by the digital logic. The digital logic is connected to the various switches and the sensor points of the toy. The sensors are open circuits that are closed when an accessory is placed (or connected to a sensor) on the toy. Each article or accessory of the toy has different resistor values. The digital logic determines which sensors circuits are closed and open, which switches are ON and OFF, and the resistor value of the article connected to the sensor. Based on these inputs digital logic generates different codes. Digital logic generated code is processed by the program in the PC.

In the software mode, the hardware communication is simulated by typing in the code directly to a text box. The software version emulation eliminates the need for USB communication and the digital logic circuit code generation. The code that is needed for the game play is pre-initialized in variables for different prompts. The code that is expected by the toy is also shown on the screen, so that the toy can be tested. If the code expected and the code typed in the text box (or the hardware generated code) are the same, it is consider a success for the child.

Single-User Phone Number Listing Program

Figure 17:
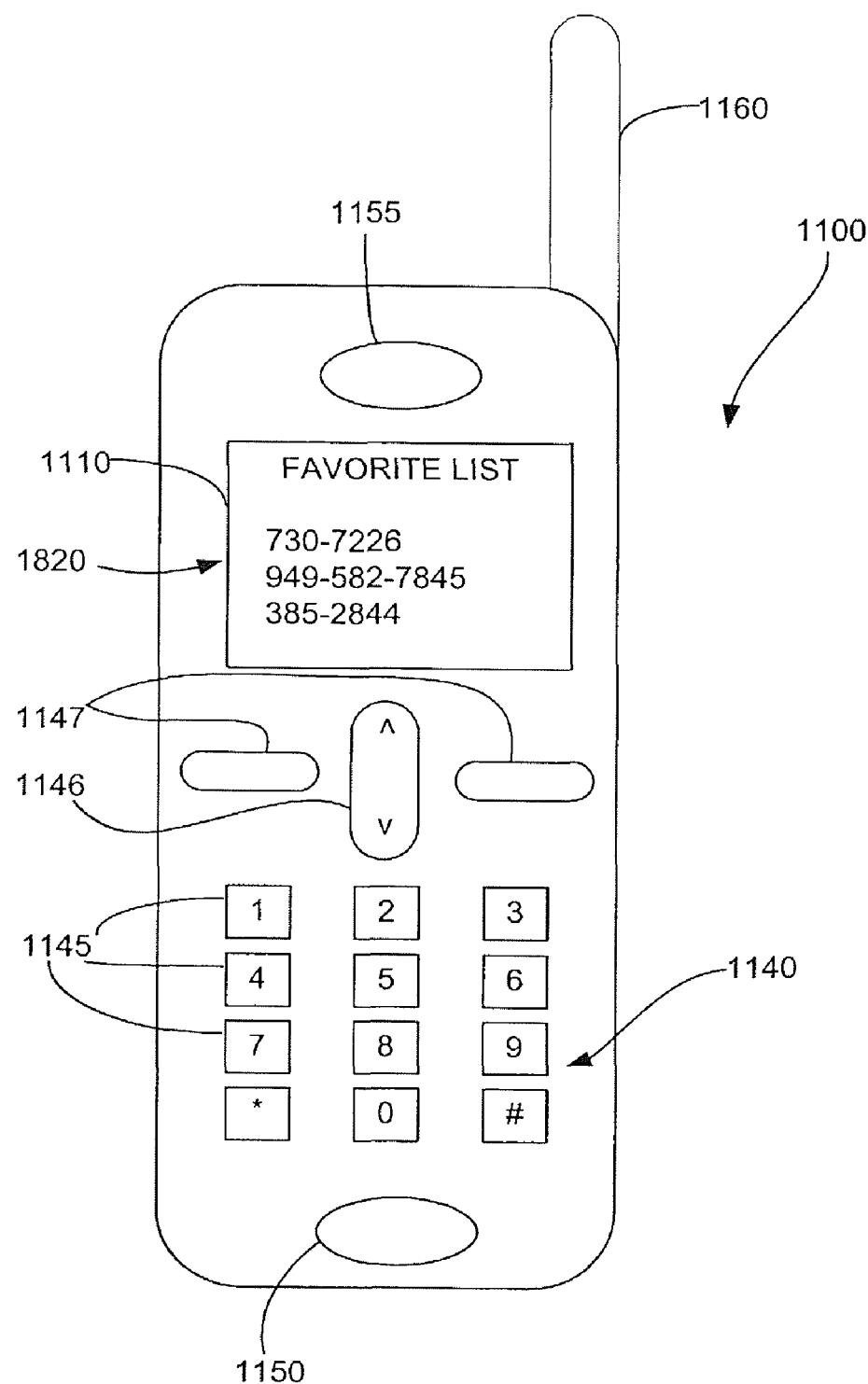
FIG. 17 is a plan view of a mobile phone to which the generalized program of FIG. 1 can be applied.
Figure 18:
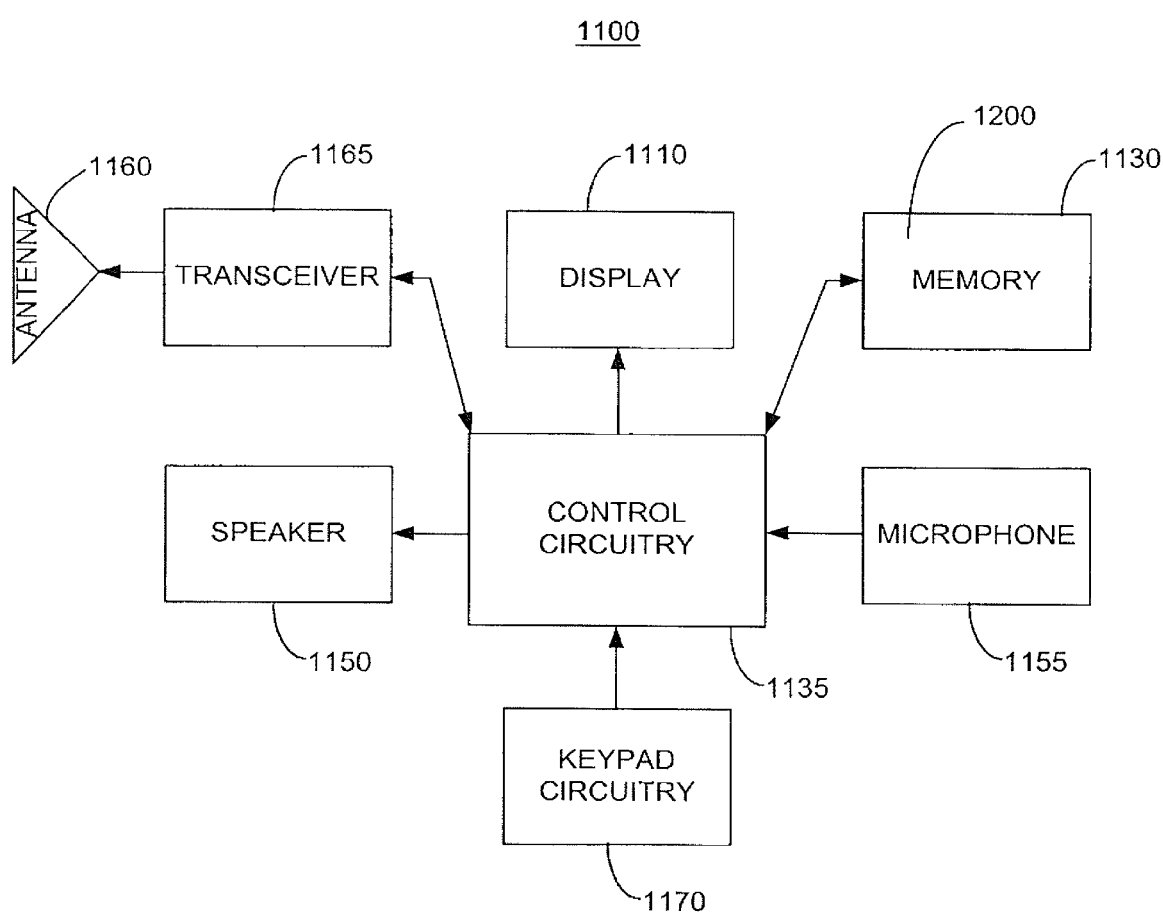
FIG. 18 is a block diagram illustrating the components of the mobile phone of FIG. 17.

Although game and toy applications have only been described in detail so far, the learning program 100 can have even more applications. For example, referring to FIGS. 17 and 18, a priority listing program 1200 (shown in FIG. 19) developed in accordance with the present inventions is described in the context of a mobile phone 1100. The mobile phone 1100 comprises a display 1110 for displaying various items to a phone user 1115 (shown in FIG. 19). The mobile phone 1100 further comprises a keypad 1140 through which the phone user 1115 can dial phone numbers and program the functions of the mobile phone 1100. To the end, the keypad 1140 includes number keys 1145, a scroll key 1146, and selection keys 1147. The mobile phone 1100 further includes a speaker 1150, microphone 1155, and antenna 1160 through which the phone user 1115 can wirelessly carry on a conversation. The mobile phone 1100 further includes keypad circuitry 1170, control circuitry 1135, memory 1130, and a transceiver 1165.

The keypad circuitry 1170 decodes the signals from the keypad 1140, as entered by the phone user 1115, and supplies them to the control circuitry 1135. The control circuitry 1135 controls the transmission and reception of call and voice signals. During a transmission mode, the control circuitry 1135 provides a voice signal from the microphone 1155 to the transceiver 1165. The transceiver 1165 transmits the voice signal to a remote station (not shown) for communication through the antenna 1160. During a receiving mode, the transceiver 1165 receives a voice signal from the remote station through the antenna 1160. The control circuitry 1135 then provides the received voice signal from the transceiver 1165 to the speaker 1150, which provides audible signals for the phone user 1115. The memory 1130 stores programs that are executed by the control circuitry 1135 for basic functioning of the mobile phone 1100. In many respects, these elements are standard in the industry, and therefore their general structure and operation will not be discussed in detail for purposes of brevity.

In addition to the standard features that typical mobile phones have, however, the mobile phone 1100 displays a favorite phone number list 1120 from which the phone user 1115 can select a phone number using the scroll and select buttons 1146 and 1147 on the keypad 1140. In the illustrated embodiment, the favorite phone number list 1120 has six phone numbers 1820 at any given time, which can be displayed to the phone user 1115 in respective sets of two and four numbers. It should be noted, however, that the total number of phone numbers within the list 1120 may vary and can be displayed to the phone user 1115 in any variety of manners.

The priority listing program 1200, which is stored in the memory 1130 and executed by the control circuitry 1135, dynamically updates the telephone number list 1120 based on the phone user's 1115 current calling habits. For example, the program 1200 maintains the favorite phone number list 1120 based on the number of times a phone number has been called, the recent activity of the called phone number, and the time period (e.g., day, evening, weekend, weekday) in which the phone number has been called, such that the favorite telephone number list 1120 will likely contain a phone number that the phone user 1115 is anticipated to call at any given time. As will be described in further detail below, the listing program 1200 uses the existence or non-existence of a currently called phone number on a comprehensive phone number list as a performance index $\phi$ in measuring its performance in relation to its objective of ensuring that the favorite phone number list 1120 will include future called phone numbers, so that the phone user 1115 is not required to dial the phone number using the number keys 1145. In this regard, it can be said that the performance index $\phi$ is instantaneous. Alternatively or optionally, the listing program 1200 can also use the location of the phone number on the comprehensive phone number list as a performance index $\phi$.

Figure 19:
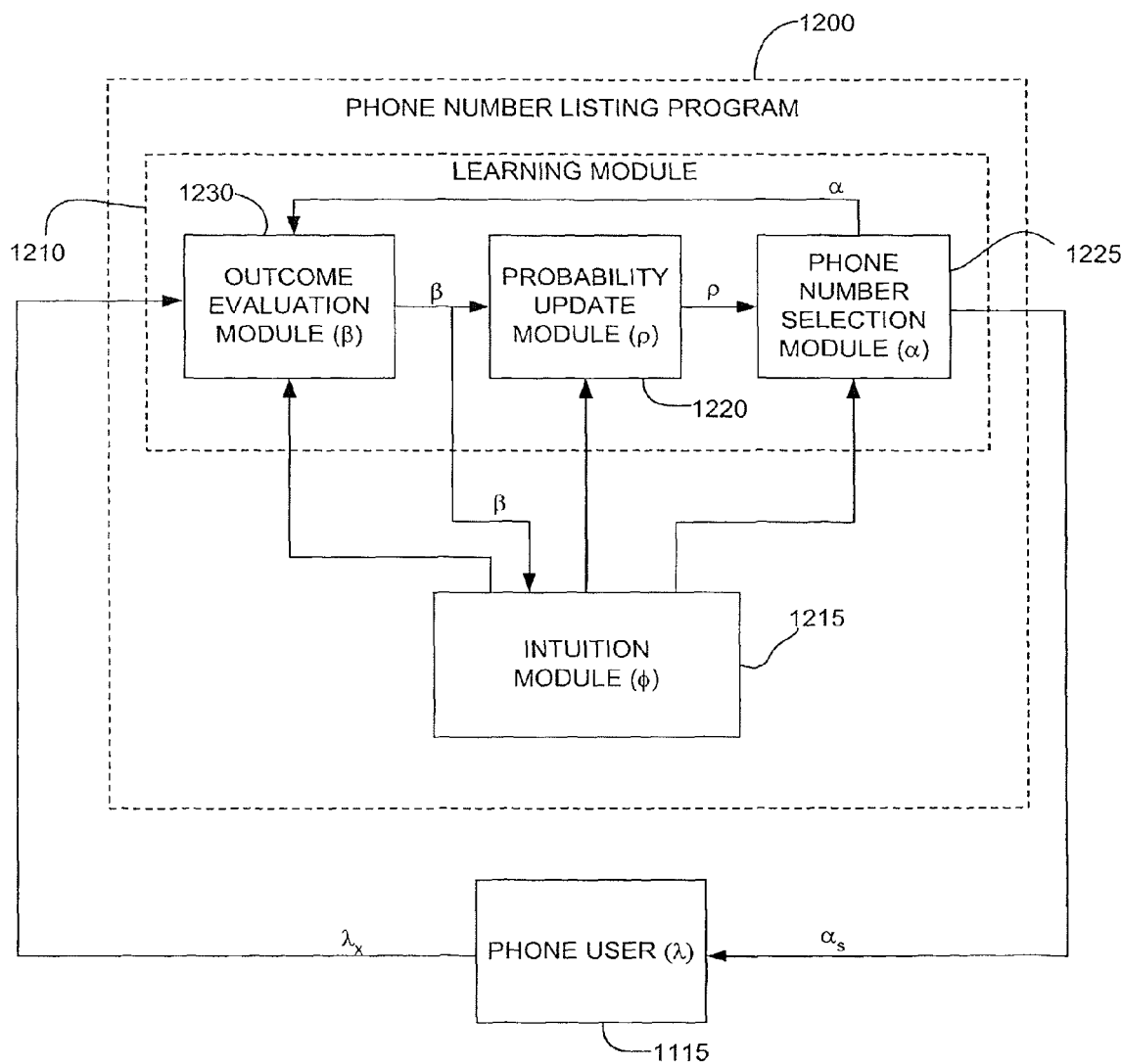
FIG. 19 is a block diagram of a priority listing program employed in the mobile phone of FIG. 17.

Referring now to FIG. 19, the listing program 1200 generally includes a probabilistic learning module 1210 and an intuition module 1215, which are specifically tailored for the mobile phone 1100. The probabilistic learning module 1210 comprises a probability update module 1220, a phone number selection module 1225, and an outcome evaluation module 1230. Specifically, the probability update module 1220 is mainly responsible for learning the phone user's 1115 calling habits and updating a comprehensive phone number list $\alpha$ that places phone numbers in the order that they are likely to be called in the future during any given time period. The outcome evaluation module 1230 is responsible for evaluating the comprehensive phone number list $\alpha$ relative to current phone numbers $\lambda_x$ called by the phone user 1115. The phone number selection module 1225 is mainly responsible for selecting a phone number subset $\alpha_s$ from the comprehensive phone number list $\alpha$ for eventual display to the phone user 1115 as the favorite phone number list 1120. The intuition module 1215 is responsible for directing the learning of the listing program 1200 towards the objective, and specifically, displaying the favorite phone number list 1120 that is likely to include the phone user's 1115 next called phone number. In this case, the intuition module 1215 operates on the probability update module 1220, the details of which will be described in further detail below.

To this end, the phone number selection module 1225 is configured to receive a phone number probability distribution p from the probability update module 1220, which is similar to equation [1] and can be represented by the following equation:

$$p(k)=[p_1(k),p_2(k),p_3(k)\ldots p_n(k)], \quad [1\text{-}2]$$

where $p_i$ is the probability value assigned to a specific phone number $\alpha_i$; n is the number of phone numbers $\alpha_i$ within the comprehensive phone number list $\alpha$, and k is the incremental time at which the phone number probability distribution p was updated.

Based on the phone number probability distribution p, the phone number selection module 1225 generates the comprehensive phone number list $\alpha$, which contains the listed phone numbers $\alpha_i$ ordered in accordance with their associated probability values $p_i$. For example, the first listed phone number $\alpha_i$ will be associated with the highest probability value $p_i$, while the last listed phone number $\alpha_i$ will be associated with the lowest probability value $p_i$. Thus, the comprehensive phone number list $\alpha$ contains all phone numbers ever called by the phone user 1115 and is unlimited. Optionally, the comprehensive phone number list $\alpha$ can contain a limited amount of phone numbers, e.g., 100, so that the memory 1130 is not overwhelmed by seldom called phone numbers. In this case, seldom called phone numbers $\alpha_i$ may eventually drop off of the comprehensive phone number list $\alpha$.

It should be noted that a comprehensive phone number list $\alpha$ need not be separate from the phone number probability distribution p, but rather the phone number probability distribution p can be used as the comprehensive phone number list $\alpha$ to the extent that it contains a comprehensive list of phone numbers $\alpha_i$ corresponding to all of the called phone numbers $\lambda_x$. However, it is conceptually easier to explain the aspects of the listing program 1200 in the context of a comprehensive phone number list that is ordered in accordance with the corresponding probability values $p_i$, rather than in accordance with the order in which they are listed in the phone number probability distribution p.

From the comprehensive phone number list $\alpha$, the phone number selection module 1225 selects the phone number subset $\alpha_s$ (in the illustrated embodiment, six phone numbers $\alpha_i$) that will be displayed to the phone user 1115 as the favorite phone number list 1120. In the preferred embodiment, the selected phone number subset $\alpha_s$ will contain those phone numbers $\alpha_i$ that correspond to the highest probability values $p_i$, i.e., the top six phone numbers $\alpha_i$ on the comprehensive phone number list $\alpha$.

As an example, consider Table 7, which sets forth in exemplary comprehensive phone number list $\alpha$ with associated probability values $p_i$.

TABLE 7

Exemplary Probability Values for Comprehensive Phone Number List

| Number | Listed Phone Numbers ($\alpha_i$) | Probability Values ($p_i$) |
|---|---|---|
| 1 | 949-339-2932 | 0.253 |
| 2 | 343-3985 | 0.183 |
| 3 | 239-3208 | 0.128 |
| 4 | 239-2908 | 0.102 |
| 5 | 343-1098 | 0.109 |

TABLE 7-continued

Exemplary Probability Values for Comprehensive Phone Number List

| Number | Listed Phone Numbers ($\alpha i$) | Probability Values (pi) |
|---|---|---|
| 6 | 349-0085 | 0.073 |
| 7 | 239-3833 | 0.053 |
| 8 | 239-4043 | 0.038 |
| . | . | . |
| . | . | . |
| . | . | . |
| 96 | 213-483-3343 | 0.009 |
| 97 | 383-303-3838 | 0.007 |
| 98 | 808-483-3984 | 0.007 |
| 99 | 398-3838 | 0.005 |
| 100 | 239-3409 | 0.002 |

In this exemplary case, phone numbers 949-339-2932, 343-3985, 239-3208, 239-2908, 343-1098, and 349-0085 will be selected as the favorite phone number list 1220, since they are associated with the top six probability values $p_i$.

The outcome evaluation module 1230 is configured to receive a called phone number $\lambda_x$ from the phone user 1115 via the keypad 1140 and the comprehensive phone number list $\alpha$ from the phone number selection module 1225. For example, the phone user 1115 can dial the phone number $\lambda_x$ using the number keys 1145 of the keypad 1140, selecting the phone number $\lambda_x$ from the favorite phone number list 1120 by operating the scroll and selection keys 1146 and 1147 of the keypad 1140, or through any other means. In this embodiment, the phone number $\lambda_x$ can be selected from a virtually infinite set of phone numbers $\lambda$, i.e., all valid phone numbers that can be called by the mobile phone 1100. The outcome evaluation module 1230 is further configured to determine and output an outcome value $\beta$ that indicates if the currently called phone number $\lambda_x$ is on the comprehensive phone number list $\alpha$. In the illustrated embodiment, the outcome value $\beta$ equals one of two predetermined values: "1" if the currently called phone number $\lambda_x$ matches a phone number $\alpha_i$ on the comprehensive phone number list $\alpha$, and "0" if the currently called phone number $\lambda_x$ does not match a phone number $\alpha_i$ on the comprehensive phone number list $\alpha$.

It can be appreciated that unlike in the duck game 300 where the outcome value $\beta$ is partially based on the selected game move $\alpha_i$, the outcome value $\beta$ is technically not based on listed phone numbers $\alpha_i$ selected by the phone number selection module 1225, i.e., the phone number subset $\alpha_s$, but rather whether a called phone number $\lambda_x$ is on the comprehensive phone number list $\alpha$ irrespective of whether it is in the phone number subset $\alpha_s$. It should be noted, however, that the outcome value $\beta$ can optionally or alternatively be partially based on the selected phone number subset $\alpha_s$, as will be described in further detail below.

The intuition module 1215 is configured to receive the outcome value $\beta$ from the outcome evaluation module 1230 and modify the probability update module 1220, and specifically, the phone number probability distribution p, based thereon. Specifically, if the outcome value $\beta$ equals "0," indicating that the currently called phone number $\lambda_x$ was not found on the comprehensive phone number list $\alpha$, the intuition module 1215 adds the called phone number $\lambda_x$ to the comprehensive phone number list $\alpha$ as a listed phone number $\alpha_i$.

The phone number $\alpha_i$ can be added to the comprehensive phone number list $\alpha$ in a variety of ways. In general, the location of the added phone number $\alpha_i$ within the comprehensive phone number list $\alpha$ depends on the probability value $p_i$ assigned or some function of the probability value $p_i$ assigned.

For example, in the case where the number of phone numbers $\alpha_i$ is not limited or has not reached its limit, the phone number $\alpha_i$ may be added by assigning a probability value $p_i$ to it and renormalizing the phone number probability distribution p in accordance with the following equations:

$$p_i(k+1)=f(x); \quad [22]$$

$$p_j(k+1)=p_j(k)(1-f(x)); j \neq i \quad [23]$$

where i is the added index corresponding to the newly added phone number $\alpha_i$, $p_i$ is the probability value corresponding to phone number $\alpha_i$ added to the comprehensive phone number list $\alpha$, f(x) is the probability value $p_i$ assigned to the newly added phone number $\alpha_i$, $p_j$ is each probability value corresponding to the remaining phone numbers $\alpha_j$ on the comprehensive phone number list $\alpha$, and k is the incremental time at which the phone number probability distribution was updated.

In the illustrated embodiment, the probability value $p_i$ assigned to the added phone number $\alpha_i$ is simply the inverse of the number of phone numbers $\alpha_i$ on the comprehensive phone number list $\alpha$, and thus f(x) equals 1/(n+1), where n is the number of phone numbers on the comprehensive phone number list $\alpha$ prior to adding the phone number $\alpha_i$. Thus, equations [22] and [23] break down to:

$$p_i(k+1) = \frac{1}{n+1}; \quad [22\text{-}1]$$

$$p_j(k+1) = p_j(k)\frac{n}{n+1}; j \neq i \quad [23\text{-}1]$$

In the case where the number of phone numbers $\alpha_i$ is limited and has reached its limit, the phone number $\alpha$ with the lowest corresponding priority value $p_i$ is replaced with the newly called phone number $\lambda_x$ by assigning a probability value $p_i$ to it and renormalizing the phone number probability distribution p in accordance with the following equations:

$$p_i(k+1) = f(x); \quad [24]$$

$$p_j(k+1) = \frac{p_j(k)}{\sum_{j \neq i}^{n} p_j(k)}(1 - f(x)); j \neq i \quad [25]$$

where i is the index used by the removed phone number $\alpha_i$, $p_i$ is the probability value corresponding to phone number $\alpha_i$ added to the comprehensive phone number list $\alpha$, f(x) is the probability value $p_m$ assigned to the newly added phone number $\alpha_i$, $p_j$ is each probability value corresponding to the remaining phone numbers $\alpha_j$ on the comprehensive phone number list $\alpha$, and k is the incremental time at which the phone number probability distribution was updated.

As previously stated, in the illustrated embodiment, the probability value $p_i$ assigned to the added phone number $\alpha_i$ is simply the inverse of the number of phone numbers $\alpha_i$ on the comprehensive phone number list $\alpha$, and thus f(x) equals 1/n, where n is the number of phone numbers on the comprehensive phone number list $\alpha$. Thus, equations [24] and [25] break down to:

$$p_i(k+1) = \frac{1}{n};  \qquad [24\text{-}1]$$

$$p_j(k+1) = \frac{p_j(k)}{\sum_{j=1 \atop j \neq i}^{n} p_j(k)} \left(\frac{n-1}{n}\right); \ j \neq i \qquad [25\text{-}1]$$

It should be appreciated that the speed in which the automaton learns can be controlled by adding the phone number $\alpha_i$ to specific locations within the phone number probability distribution p. For example, the probability value $p_i$ assigned to the added phone number $\alpha_i$ can be calculated as the mean of the current probability values $p_i$ such that the phone number $\alpha_i$ will be added to the middle of the comprehensive phone number list $\alpha$ to effect an average learning speed. The probability value $p_i$ assigned to the added phone number $\alpha_i$ can be calculated as an upper percentile (e.g. 25%) to effect a relatively quick learning speed. Or the probability value $p_i$ assigned to the added phone number $\alpha_i$ can be calculated as a lower percentile (e.g. 75%) to effect a relatively slow learning speed. It should be noted that if there is a limited number of phone numbers $\alpha_i$ on the comprehensive phone number list $\alpha$, thereby placing the lowest phone numbers $\alpha_i$ in the likelihood position of being deleted from the comprehensive phone number list $\alpha$, the assigned probability value $p_i$ should be not be so low as to cause the added phone number $\alpha_i$ to oscillate on and off of the comprehensive phone number list $\alpha$ when it is alternately called and not called.

In any event, if the outcome value $\beta$ received from the outcome evaluation module 1230 equals "1," indicating that the currently called phone number $\lambda_x$ was found on the comprehensive phone number list $\alpha$, the intuition module 1215 directs the probability update module 1220 to update the phone number probability distribution p using a learning methodology. In the illustrated embodiment, the probability update module 1220 utilizes a linear reward-inaction P-type update.

As an example, assume that a currently called phone number $\lambda_x$ matches a phone number $\alpha_{10}$ on the comprehensive phone number list $\alpha$, thus creating an outcome value $\beta=1$. Assume also that the comprehensive phone number list $\alpha$ currently contains 50 phone numbers $\alpha_i$. In this case, general updating equations [6] and [7] can be expanded using equations [10] and [11], as follows:

$$p_{10}(k+1) = p_{10}(k) + \sum_{j=1 \atop j \neq 10}^{50} ap_j(k);$$

$$p_1(k+1) = p_1(k) - ap_1(k);$$

$$p_2(k+1) = p_2(k) - ap_2(k);$$

$$p_4(k+1) = p_4(k) - ap_4(k);$$

$$\vdots$$

$$p_{50}(k+1) = p_{50}(k) - ap_{50}(k)$$

Thus, the corresponding probability value $p_{10}$ is increased, and the phone number probability values $p_i$ corresponding to the remaining phone numbers $\alpha_i$ are decreased. The value of a is selected based on the desired learning speed. The lower the value of a, the slower the learning speed, and the higher the value of a, the higher the learning speed. In the preferred embodiment, the value of a has been chosen to be 0.02. It should be noted that the penalty updating equations [8] and [9] will not be used, since in this case, a reward-penalty P-type update is not used.

Thus, it can be appreciated that, in general, the more a specific listed phone number $\alpha_i$ is called relative to other listed phone numbers $\alpha_i$, the more the corresponding probability value $p_i$ is increased, and thus the higher that listed phone number $\alpha_i$ is moved up on the comprehensive phone number list $\alpha$. As such, the chances that the listed phone number $\alpha_i$ will be contained in the selected phone number subset $\alpha_s$ and displayed to the phone user 1115 as the favorite phone number list 1120 will be increased. In contrast, the less a specific listed phone number $\alpha_i$ is called relative to other listed phone numbers $\alpha_i$, the more the corresponding probability value $p_i$ is decreased (by virtue of the increased probability values $p_i$ corresponding to the more frequently called listed phone numbers $\alpha_i$), and thus the lower that listed phone number $\alpha_i$ is moved down on the comprehensive phone number list $\alpha$. As such, the chances that the listed phone number $\alpha_i$ will be contained in the phone number subset $\alpha_s$ selected by the phone number selection module 1225 and displayed to the phone user 1115 as the favorite phone number list 1120 will be decreased.

It can also be appreciated that due to the nature of the learning automaton, the relative movement of a particular listed phone number $\alpha_i$ is not a matter of how many times the phone number $\alpha_i$ is called, and thus, the fact that the total number of times that a particular listed phone number $\alpha_i$ has been called is high does not ensure that it will be contained in the favorite phone number list 1120. In reality, the relative placement of a particular listed phone number $\alpha_i$ within the comprehensive phone number list $\alpha_s$ is more of a function of the number of times that the listed phone number $\alpha_i$ has been recently called. For example, if the total number of times a listed phone number $\alpha_i$ is called is high, but has not been called in the recent past, the listed phone number $\alpha_i$ may be relatively low on the comprehensive phone number list $\alpha$, and thus it may not be contained in the favorite phone number list 1120. In contrast, if the total number of times a listed phone number $\alpha_i$ is called is low, but it has been called in the recent past, the listed phone number $\alpha_i$ may be relatively high on the comprehensive phone number list $\alpha$, and thus it may be contained in the favorite phone number list 1120. As such, it can be appreciated that the learning automaton quickly adapts to the changing calling patterns of a particular phone user 1115.

It should be noted, however, that a phone number probability distribution p can alternatively be purely based on the frequency of each of the phone numbers $\lambda_x$. For example, given a total of n phone calls made, and a total number of times that each phone number is received $f_1, f_2, f_3 \ldots$, the probability values $p_i$ for the corresponding listed phone calls $\alpha_i$ can be:

$$p_i(k+1) = \frac{fi}{n} \qquad [26]$$

Noteworthy, each probability value $p_i$ is not a function of the previous probability value $p_i$ (as characterized by learning automaton methodology), but rather the frequency of the listed phone number $\alpha_i$ and total number of phone calls n. With the purely frequency-based learning methodology, when a new phone number $\alpha_i$ is added to the phone list $\alpha$, its corresponding probability value $p_i$ will simply be 1/n, or alternatively, some other function of the total number of phone calls n. Optionally, the total number of phone calls n is not absolute, but rather represents the total number of phone calls n made in a specific time period, e.g., the last three months, last month, or last week. In other words, the phone number probability distribution p can be based on a moving average. This provides the frequency-based learning methodology with more dynamic characteristics.

In any event, as described above, a single comprehensive phone number list α that contains all phone numbers called regardless of the time and day of the week is generated and updated. Optionally, several comprehensive phone number lists α can be generated and updated based on the time and day of the week. For example, Tables 8 and 9 below set forth exemplary comprehensive phone number lists α1 and α2 that respectively contain phone numbers $\alpha 1_i$ and $\alpha 2_i$ that are called during the weekdays and weekend.

TABLE 8

Exemplary Probability Values for Comprehensive Weekday Phone Number List

| Number | Listed Weekday Phone Numbers ($\alpha 1i$) | Probability Values (pi) |
|---|---|---|
| 1 | 349-0292 | 0.223 |
| 2 | 349-0085 | 0.213 |
| 3 | 343-3985 | 0.168 |
| 4 | 343-2922 | 0.122 |
| 5 | 328-2302 | 0.111 |
| 6 | 928-3882 | 0.086 |
| 7 | 343-1098 | 0.073 |
| 8 | 328-4893 | 0.032 |
| . | . | . |
| . | . | . |
| . | . | . |
| 96 | 493-3832 | 0.011 |
| 97 | 383-303-3838 | 0.005 |
| 98 | 389-3898 | 0.005 |
| 99 | 272-3483 | 0.003 |
| 100 | 213-483-3343 | 0.001 |

TABLE 9

Exemplary Probability Values for Comprehensive Weekend Phone Number List

| Number | Listed Weekend Phone Numbers ($\alpha 2i$) | Probability Values (pi) |
|---|---|---|
| 1 | 343-3985 | 0.238 |
| 2 | 343-1098 | 0.194 |
| 3 | 949-482-2382 | 0.128 |
| 4 | 343-2922 | 0.103 |
| 5 | 483-4838 | 0.085 |
| 6 | 349-0292 | 0.073 |
| 7 | 349-4929 | 0.062 |
| 8 | 493-4893 | 0.047 |
| . | . | . |
| . | . | . |
| . | . | . |
| 96 | 202-3492 | 0.014 |
| 97 | 213-403-9232 | 0.006 |
| 98 | 389-3893 | 0.003 |
| 99 | 272-3483 | 0.002 |
| 100 | 389-3898 | 0.001 |

Notably, the top six locations of the exemplary comprehensive phone number lists α1 and α2 contain different phone numbers $\alpha 1_i$ and $\alpha 2_i$, presumably because certain phone numbers $\alpha 1_i$ (e.g., 349-0085, 328-2302, and 928-3882) were mostly only called during the weekdays, and certain phone numbers $\alpha 2_i$ (e.g., 343-1098, 949-482-2382 and 483-4838) were mostly only called during the weekends. The top six locations of the exemplary comprehensive phone number lists α1 and α2 also contain common phone numbers $\alpha 1_i$ and $\alpha 2_i$, presumably because certain phone numbers $\alpha 1_i$ and $\alpha 2_i$ (e.g., 349-0292, 343-3985, and 343-2922) were called during the weekdays and weekends. Notably, these common phone numbers $\alpha 1_i$ and $\alpha 2_i$ are differently ordered in the exemplary comprehensive phone number lists α1 and α2, presumably because the phone user's 1115 weekday and weekend calling patterns have differently influenced the ordering of these phone numbers. Although not shown, the comprehensive phone number lists α1 and α2 can be further subdivided, e.g., by day and evening.

When there are multiple comprehensive phone number lists α that are divided by day and/or time, the phone selection module 1225, outcome evaluation module 1230, probability update module 1220, and intuition module 1215 operate on the comprehensive phone number lists α based on the current day and/or time (as obtained by a clock or calendar stored and maintained by the control circuitry 1135). Specifically, the intuition module 1215 selects the particular comprehensive list α that will be operated on. For example, during a weekday, the intuition module 1215 will select the comprehensive phone number lists α1, and during the weekend, the intuition module 1215 will select the comprehensive phone number lists α2.

The phone selection module 1225 will maintain the ordering of all of the comprehensive phone number lists α, but will select the phone number subset $\alpha_s$ from the particular comprehensive phone number lists α selected by the intuition module 1215. For example, during a weekday, the phone selection module 1225 will select the favorite phone number list $\alpha_s$ from the comprehensive phone number list α1, and during the weekend, the phone selection module 1225 will select the favorite phone number list $\alpha_s$ from the comprehensive phone number list α2. Thus, it can be appreciated that the particular favorite phone number list 1120 displayed to the phone user 1115 will be customized to the current day, thereby increasing the chances that the next phone number $\lambda_x$ called by the phone user 1115 will be on the favorite phone number list 1120 for convenient selection by the phone user 1115.

The outcome evaluation module 1230 will determine if the currently called phone number $\lambda_x$ matches a phone number $\alpha_i$ contained on the comprehensive phone number list α selected by the intuition module 1215 and generate an outcome value β based thereon, and the intuition module 1215 will accordingly modify the phone number probability distribution p corresponding to the selected comprehensive phone number list α. For example, during a weekday, the outcome evaluation module 1230 determines if the currently called phone number $\lambda_x$ matches a phone number $\alpha_i$ contained on the comprehensive phone number list α1, and the intuition module 1215 will then modify the phone number probability distribution p corresponding to the comprehensive phone number list α1. During a weekend, the outcome evaluation module 1230 determines if the currently called phone number $\lambda_x$ matches a phone number $\alpha_i$ contained on the comprehensive phone number list α2, and the intuition module 1215 will then modify the phone number probability distribution p corresponding to the comprehensive phone number list α2.

In the illustrated embodiment, the outcome evaluation module 1230, probability update module 1220, and intuition module 1215 only operate on the comprehensive phone number list α and were not concerned with the favorite phone number list $\alpha_s$. It was merely assumed that a phone number $\alpha_i$ corresponding to a frequently and recently called phone number $\alpha_i$ that was not currently in the selected phone number subset $\alpha_s$ would eventually work its way into the favorite phone number list 1120, and a phone number $\alpha_i$ corresponding to a seldom called phone number $\alpha_i$ that was currently in the selected phone number subset $\alpha_s$ would eventually work its way off of the favorite phone number list 1120.

Optionally, the outcome evaluation module 1230, probability update module 1220, and intuition module 1215 can be configured to provide further control over this process to increase the chances that the next called phone number $\lambda_x$ will match a phone number $\alpha_i$ in the selected phone number list $\alpha_s$ for display to the user 1115 as the favorite phone number list 1120.

For example, the outcome evaluation module 1230 may generate an outcome value $\beta$ equal to "1" if the currently called phone number $\lambda_x$ matches a phone number $\alpha_i$ in the previously selected phone number subset $\alpha_s$, "0" if the currently called phone number $\lambda_x$ does not match a phone number $\alpha_i$ on the comprehensive phone number list $\alpha$, and "2" if the currently called phone number $\lambda_x$ matches a phone number $\alpha_i$ on the comprehensive phone number list $\alpha$, but not in the previously selected phone number subset $\alpha_s$. If the outcome value is "0" or "1", the intuition module 1215 will direct the probability update module 1220 as previously described. If the outcome value is "2", however, the intuition module 1215 will not direct the probability update module 1220 to update the phone number probability distribution p using a learning methodology, but instead will assign a probability value $p_i$ to the listed phone number $\alpha_i$. For example, the assigned probability value $p_i$ may be higher than that corresponding to the last phone number $\alpha_i$ in the selected phone number subset $\alpha_s$, in effect, replacing that last phone number $\alpha_i$ with the listed phone number $\alpha_i$ corresponding to the currently called phone number $\lambda_x$. The outcome evaluation module 1230 may generate an outcome value $\beta$ equal to other values, e.g., "3" if the a phone number $\lambda_x$ corresponding to a phone number $\alpha_i$ not in the selected phone number subset $\alpha_s$ has been called a certain number of times within a defined period, e.g., 3 times in one day or 24 hours. In this case, the intuition module 1215 may direct the probability update module 1220 to assign a probability value $p_i$ to the listed phone number $\alpha_i$, perhaps placing the corresponding phone number $\alpha_i$ on the favorite phone number list $\alpha_s$.

As another example to provide better control over the learning process, the phone number probability distribution p can be subdivided into two sub-distributions $p_1$ and $p_2$, with the first sub-distribution $p_1$ corresponding to the selected phone number subset $\alpha_s$, and the second sub-distribution $p_2$ corresponding to the remaining phone numbers $\alpha_i$ on the comprehensive phone number list $\alpha$. In this manner, the first and second sub-distributions $p_1$ and $p_2$ will not affect each other, thereby preventing the relatively high probability values $p_i$ corresponding to the favorite phone number list $\alpha_s$ from overwhelming the remaining probability values $p_i$, which might otherwise slow the learning of the automaton. Thus, each of the first and second sub-distributions $p_1$ and $p_2$ are independently updated with the same or even different learning methodologies. Modification of the probability update module 1220 can be accomplished by the intuition module 1215 in the foregoing manners.

The intuition module 1215 may also prevent any one probability value $p_i$ from overwhelming the remaining probability values $p_i$ by limiting it to a particular value, e.g., 0.5. In this sense, the learning module 1210 will not converge to any particular probability value $p_i$, which is not the objective of the mobile phone 1100. That is, the objective is not to find a single favorite phone number, but rather a list of favorite phone numbers that dynamically changes with the phone user's 1115 changing calling patterns. Convergence to a single probability value $p_i$ would defeat this objective.

So far, it has been explained that the listing program 1200 uses the instantaneous outcome value $\beta$ as a performance index $\phi$ in measuring its performance in relation to its objective of maintaining favorite phone number list 1120 to contain future called telephone numbers. It should be appreciated, however, that the performance of the listing program 1200 can also be based on a cumulative performance index $\phi$. For example, the listing program 1200 can keep track of a percentage of the called phone numbers $\lambda_x$ that match phone numbers $\alpha_i$ in the selected phone number subset $\alpha_s$ or a consecutive number of called phone numbers $\lambda_x$ that do not match phone numbers $\alpha_i$ not found in the selected phone number subset $\alpha_s$, based on the outcome value $\beta$, e.g., whether the outcome value $\beta$ equals "2." Based on this cumulative performance index $\phi$, the intuition module 1215 can modify the learning speed or nature of the learning module 1210.

It has also been described that the phone user 1115 actions encompass phone numbers $\lambda_x$ from phone calls made by the mobile phone 1100 (i.e., outgoing phone calls) that are used to generate the outcome values $\beta$. Alternatively or optionally, the phone user 1115 actions can also encompass other information to improve the performance of the listing program 1200. For example, the phone user 1115 actions can include actual selection of the called phone numbers $\lambda_x$ from the favorite phone number list $\alpha_s$. With this information, the intuition module 1215 can, e.g., remove phone numbers $\alpha_i$ that have not been selected by the phone user 1115, but are nonetheless on the favorite phone number list 1120. Presumably, in these cases, the phone user 1115 prefers to dial this particular phone number $\lambda_x$ using the number keys 1145 and feels he or she does not need to select it, e.g., if the phone number is well known to the phone user 1115. Thus, the corresponding listed phone number $\alpha_i$ will be replaced on the favorite phone number list $\alpha_s$ with another phone number $\alpha_i$.

As another example, the phone user 1115 actions can include phone numbers from phone calls received by the mobile phone 1100 (i.e., incoming phone calls), which presumably correlate with the phone user's 1115 calling patterns to the extent that the phone number that is received represents a phone number that will likely be called in the future. In this case, the listing program 1200 may treat the received phone number similar to the manner in which it treats a called phone number $\lambda_x$, e.g., the outcome evaluation module 1230 determines whether the received phone number is found on the comprehensive phone number list $\alpha$ and/or the selected phone number subset $\alpha_s$, and the intuition module 1215 accordingly modifies the phone number probability distribution p based on this determination. Alternatively, a separate comprehensive phone number list can be maintained for the received phone numbers, so that a separate favorite phone number list associated with received phone numbers can be displayed to the user.

As still another example, the outcome value $\beta$ can be time-based in that the cumulative time of a specific phone call (either incoming or outgoing) can be measured to determine the quality of the phone call, assuming that the importance of a phone call is proportional to its length. If the case of a relatively lengthy phone call, the intuition module 1215 can assign a probability value (if not found on the comprehensive phone number list $\alpha$) or increase the probability value (if found on the comprehensive phone number list $\alpha$) of the corresponding phone number higher than would otherwise be assigned or increased. In contrast, in the case of a relatively short phone call, the intuition module 1215 can assign a probability value (if not found on the comprehensive phone number list α) or increase the probability value (if found on the comprehensive phone number list α) of the corresponding phone number lower than would otherwise be assigned or increased. When measuring the quality of the phone call, the processing can be performed after the phone call is terminated.

Figure 20:
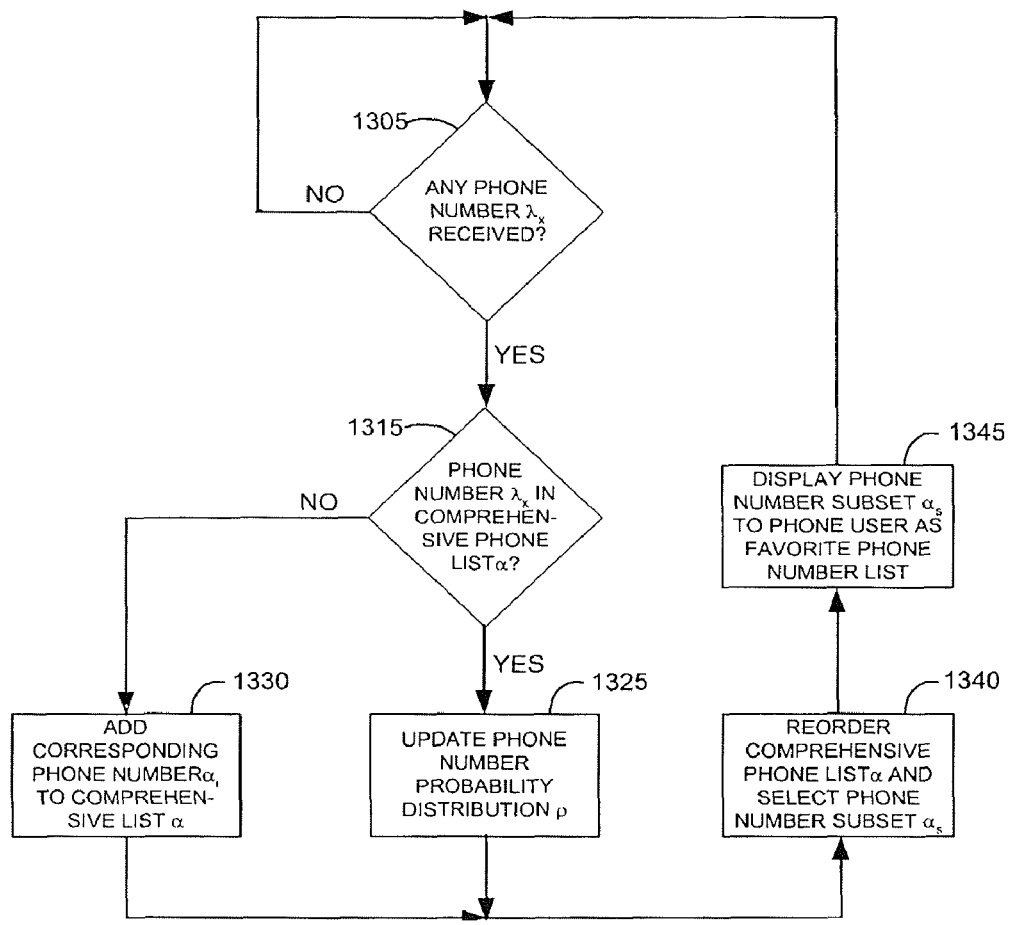
FIG. 20 is a flow diagram illustrating a preferred method performed by the priority listing program of FIG. 19.

Having now described the structure of the listing program 1200, the steps performed by the listing program 1200 will be described with reference to FIG. 20. In this process, the intuition module 1215 does not distinguish between phone numbers $\alpha_i$ that are listed in the phone number subset $\alpha_s$ and those that are found on the remainder of the comprehensive phone number list α.

First, the outcome evaluation module 1230 determines whether a phone number $\lambda_x$ has been called (step 1305). Alternatively or optionally, the evaluation module 1230 may also determine whether a phone number $\lambda_x$ has been received. If a phone number $\lambda_x$ has not been received, the program 1200 goes back to step 1305. If a phone number $\lambda_x$ has been called and/or received, the outcome evaluation module 1230 determines whether it is on the comprehensive phone number list α and generates an outcome value β in response thereto (step 1315). If so (β=1), the intuition module 1215 directs the probability update module 1220 to update the phone number probability distribution p using a learning methodology to increase the probability value $p_i$ corresponding to the listed phone number $\alpha_i$ (step 1325). If not (β=0), the intuition module 1215 generates a corresponding phone number $\alpha_i$ and assigns a probability value $p_i$ to it, in effect, adding it to the comprehensive phone number list α (step 1330).

The phone number selection module 1225 then reorders the comprehensive phone number list α, and selects the phone number subset $\alpha_s$ therefrom, and in this case, the listed phone numbers $\alpha_i$ with the highest probability values $p_i$ (e.g., the top six) (step 1340). The phone number subset $\alpha_s$ is then displayed to the phone user 1115 as the favorite phone number list 1120 (step 1345). The listing program 1200 then returns to step 1305, where it is determined again if phone number $\lambda_x$ has been called and/or received.

Figure 21:
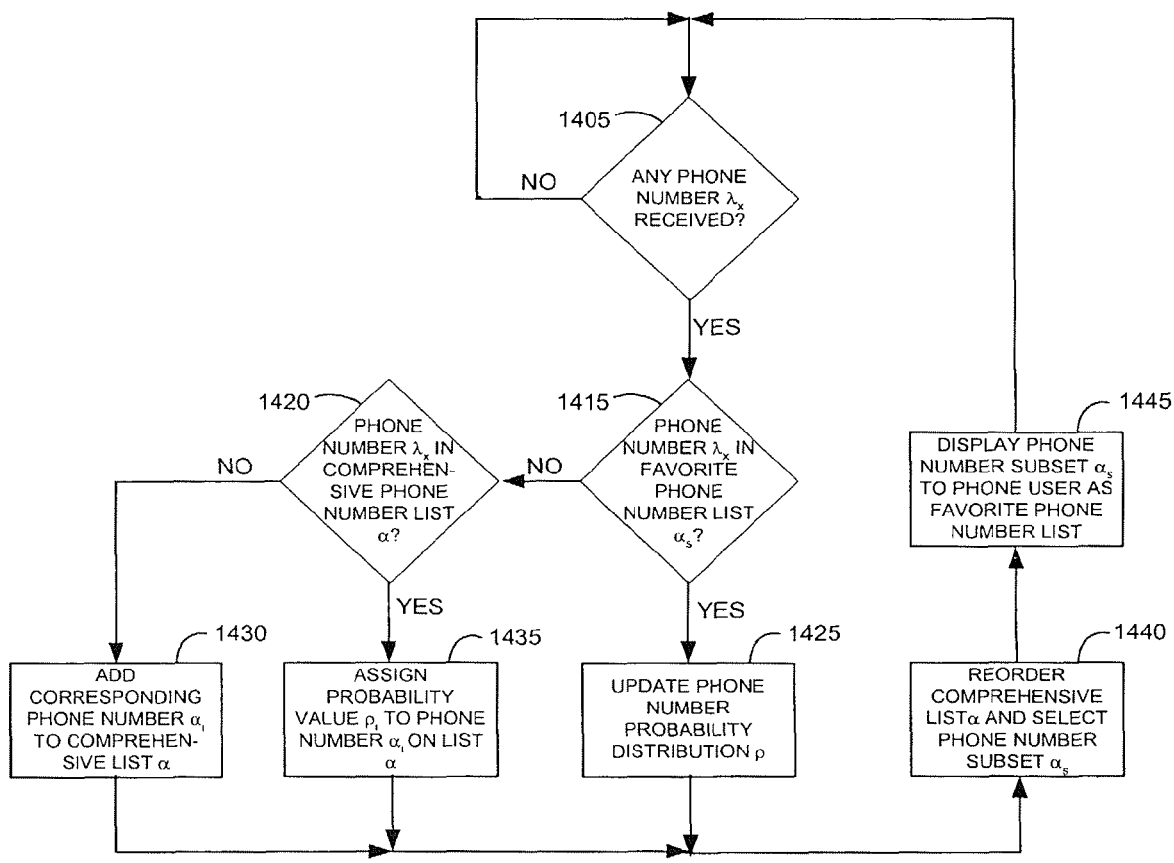
FIG. 21 is a flow diagram illustrating an alternative preferred method performed by the priority listing program of FIG. 19.

Referring to FIG. 21, the operation of the listing program 1200 will be described, wherein the intuition module 1215 does distinguish between phone numbers $\alpha_i$ that are listed in the phone number subset $\alpha_s$ and those that are found on the remainder of the comprehensive phone number list α.

First, the outcome evaluation module 1230 determines whether a phone number $\lambda_x$ has been called and/or received (step 1405). If a phone number $\lambda_x$ has been called and/or received, the outcome evaluation module 1230 determines whether it matches a phone number $\alpha_i$ in either of the phone number subset $\alpha_s$ (in effect, the favorite phone number list 1120) or the comprehensive phone number list α and generates an outcome value β in response thereto (steps 1415 and 1420). If the phone number $\lambda_x$ matches a phone number $\alpha_i$ on the favorite phone number list $\alpha_s$ (β=1), the intuition module 1215 directs the probability update module 1220 to update the phone number probability distribution p (or phone number probability sub-distributions p1 and p2) using a learning methodology to increase the probability value $p_i$ corresponding to the listed phone number $\alpha_i$ (step 1425). If the called phone number $\lambda_x$ does not match a phone number $\alpha_i$ on the comprehensive phone number list (β=0), the intuition module 1215 generates a corresponding phone number $\alpha_i$ and assigns a probability value $p_i$ to it, in effect, adding it to the comprehensive phone number list α (step 1430). If the called phone number $\lambda_x$ does not match a phone number $\alpha_i$ on the favorite phone number list $\alpha_s$, but matches one on the comprehensive phone number list α (β=2), the intuition module 1215 assigns a probability value $p_i$ to the already listed phone number $\alpha_i$ to, e.g., place the listed phone number $\alpha_i$ within or near the favorite phone number list $\alpha_s$ (step 1435).

The phone number selection module 1225 then reorders the comprehensive phone number list α, and selects the phone number subset $\alpha_s$ therefrom, and in this case, the listed phone numbers $\alpha_i$ with the highest probability values $p_i$ (e.g., the top six) (step 1440). The phone number subset $\alpha_s$ is then displayed to the phone user 1115 as the favorite phone number list 1120 (step 1445). The listing program 1200 then returns to step 1405, where it is determined again if phone number $\lambda_x$ has been called and/or received.

Figure 22:
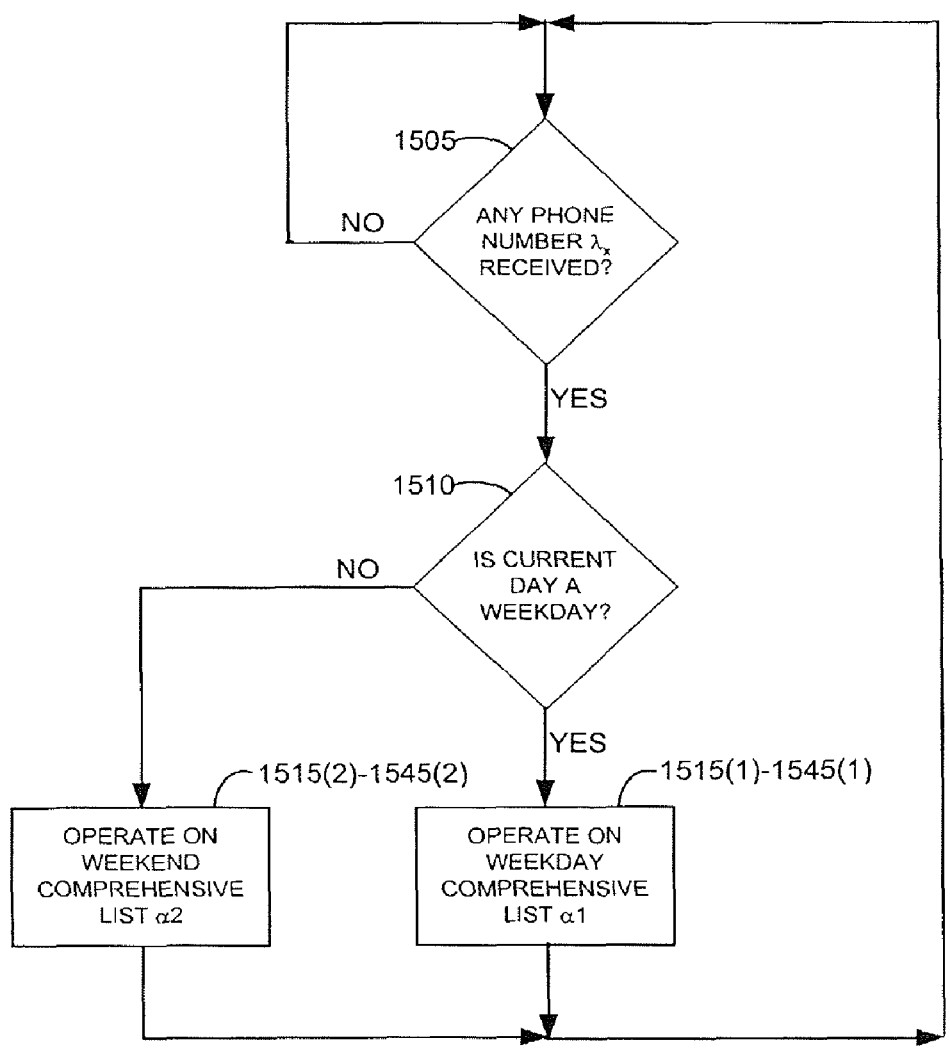
FIG. 22 is a flow diagram illustrating still another preferred method performed by the priority listing program of FIG. 19.

Referring to FIG. 22, the operation of the listing program 1200 will be described, wherein the intuition module 1215 distinguishes between weekday and weekend phone calls.

First, the outcome evaluation module 1230 determines whether a phone number $\lambda_x$ has been called (step 1505). Alternatively or optionally, the evaluation module 1230 may also determine whether a phone number $\lambda_x$ has been received. If a phone number $\lambda_x$ has not been received, the program 1200 goes back to step 1505. If a phone number $\lambda_x$ has been called and/or received, the intuition module 1215 determines whether the current day is a weekday day or a weekend (step 1510). If the current day is a weekday, the weekday comprehensive phone list α1 is operated on in steps 1515(1)-1545(1) in a similar manner as the comprehensive phone list α is operated on in steps 1415-1440 in FIG. 21. In this manner, a favorite phone number list 1120 customized to weekday calling patterns is displayed to the phone user 1115. If the current day is a weekend day, the weekend comprehensive phone list α2 is operated on in steps 1515(2)-1545(2) in a similar manner as the comprehensive phone list α is operated on in steps 1415-1440 in FIG. 21. In this manner, a favorite phone number list 1120 customized to weekend calling patterns is displayed to the phone user 1115. Optionally, rather than automatically customizing the favorite phone number list 1120 to the weekday or weekend for display to the phone user 1115, the phone user 1115 can select which customized favorite phone number list 1120 will be displayed. The listing program 1200 then returns to step 1505, where it is determined again if phone number $\lambda_x$ has been called and/or received.

More specific details on the above-described operation of the mobile phone 1100 can be found in the Computer Program Listing Appendix attached hereto and previously incorporated herein by reference. It is noted that the file "Intuition Intelligence-mobilephone-outgoing.doc" generates a favorite phone number list only for outgoing phone calls, that is, phone calls made by the mobile phone. It does not distinguish between the favorite phone number list and the remaining phone numbers on the comprehensive list when generating outcome values, but does distinguish between weekday phone calls and weekend phone calls. The file "Intuition Intelligence-mobilephone-incoming.doc" generates a favorite phone number list only for incoming phone calls; that is, phone calls received by the mobile phone. It does not distinguish between the favorite phone number list and the remaining phone numbers on the comprehensive list when generating outcome values, and does not distinguish between weekday phone calls and weekend phone calls.

It should be noted that the files "Intuition Intelligence-mobilephone-outgoing.doc" and "Intuition Intelligence-mobilephone-incoming.doc" simulation programs were designed to emulate real-world scenarios and to demonstrate the learning capability of the priority listing program. To this end, the software simulation is performed on a personal computer with Linux Operating System Mandrake Version 8.2.

This operating system was selected because the MySQL database, PHP and Apache Web Server are natively built in. The MySQL database acts as a repository and stores the call logs and tables utilized in the programs. The MySQL database is a very fast, multi-user relational database management system that is used for storing and retrieving information. The PHP is a cross-platform, Hyper Text Markup Language (HTML)-embedded, server-side, web scripting language to provide and process dynamic content. The Apache Web Server is a public-domain web server that receives a request, processes a request, and sends the response back to the requesting entity. Because a phone simulator was not immediately available, the phone call simulation was performed using a PyWeb Deckit Wireless Application Protocol (WAP) simulator, which is a front-end tool/browser that emulates the mobile phone, and is used to display wireless language content debug the code. It is basically a browser for handheld devices. The Deckit transcoding technology is built-in to allow one to test and design the WAP site offline. The transcoding is processed locally on the personal computer.

Single-User Television Channel Listing Program

Figure 23:
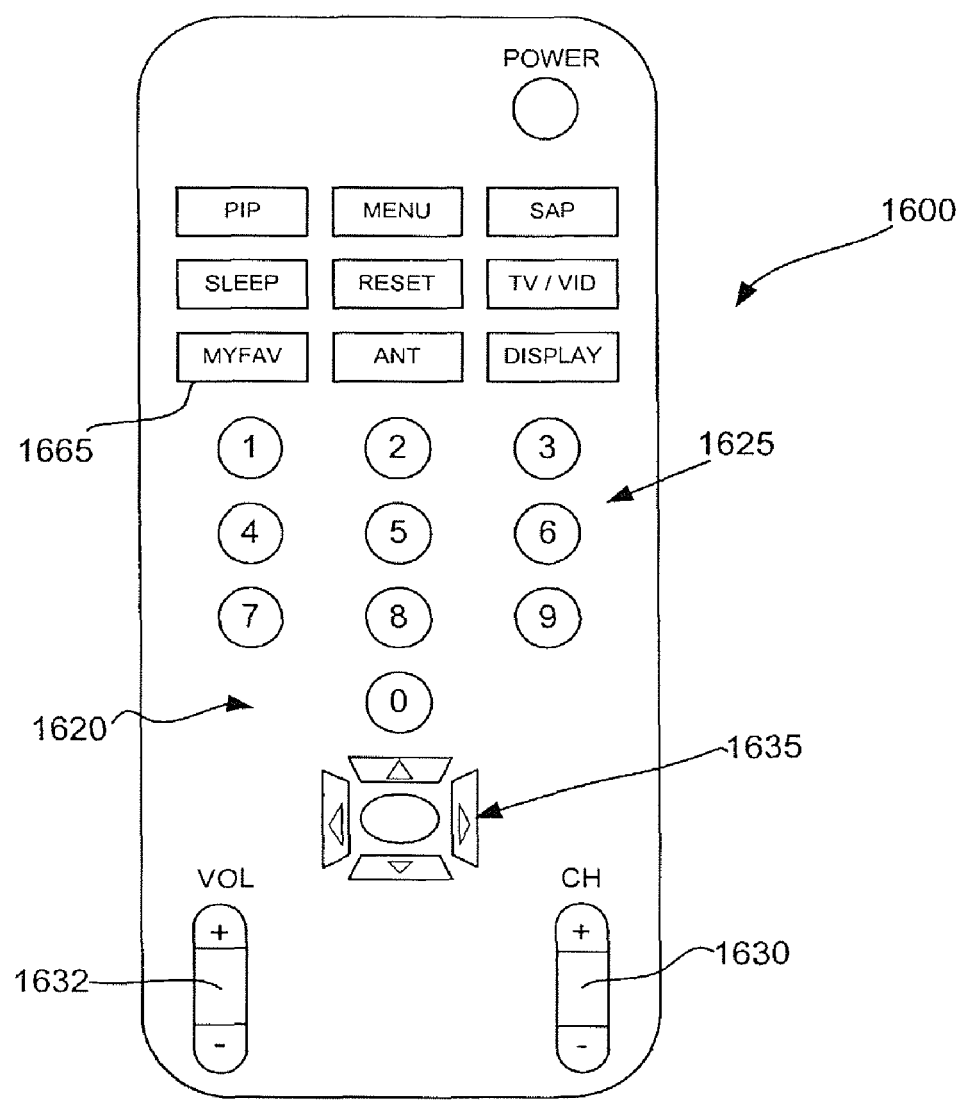
FIG. 23 is a plan view of a television remote control unit to which the generalized program of FIG. 1 can be applied.
Figure 24:
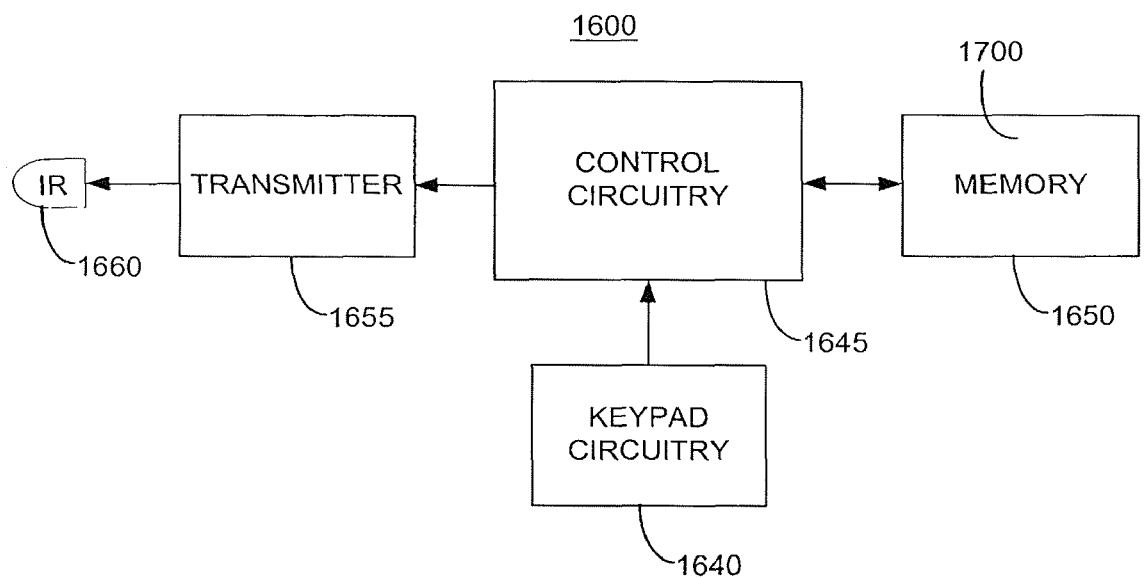
FIG. 24 is a block diagram illustrating the components of the remote control of FIG. 23.

The afore-described listing programs can be used for other applications besides prioritizing and anticipating watched television channels on a telephone. For example, referring to FIG. 23, a priority listing program 1700 (shown in FIG. 25) developed in accordance with the present inventions is described in the context of a television remote control 1600. The remote control 1600 comprises a keypad 1620 through which a remote control user 1615 (shown in FIG. 25) can remotely control a television (not shown), and which contains standard keys, such as number keys 1625, a channel up and down key 1630, a volume up and down key 1632, a scroll/selection keys 1635, and various other function keys. Referring further to FIG. 24, the remote control 1600 further includes keypad circuitry 1640, control circuitry 1645, memory 1650, a transmitter 1655, and an infrared (IR) emitter (or alternatively a light emitting diode (LED)) 1660. The keypad circuitry 1640 decodes the signals from the keypad 1620, as entered by the remote control user 1615, and supplies them to the control circuitry 1645. The control circuitry 1645 then provides the decoded signals to the transmitter 1655, which wirelessly transmits the signals to the television through the IR emitter 1660. The memory 1650 stores programs that are executed by the control circuitry 1645 for basic functioning of the remote control 1600. In many respects, these elements are standard in the industry, and therefore their general structure and operation will not be discussed in detail for purposes of brevity.

In addition to the standard features that typical remote controls have, however, the keypad 1620 contains a favorite channel key 1665 referred to as a "MYFAV" key. Much like the channel up or down keys 1630, operation of the favorite channel key 1665 immediately tunes (or switches) the television from the current television channel to the next television channel. Repetitive operation of the favorite channel key 1665 will switch the television from this new current television channel to the next one, and so on. Unlike the channel up or down keys 1630, however, the next television channel will not necessarily be the channel immediately above or below the current channel, but will tend to be one of the favorite television channels of the remote control user 1615.

It should be noted that rather than immediately and automatically switching television channels to a favorite television channel, operation of the favorite channel key 1665 can cause favorite television channel lists to be displayed on the television, similar to the previously described favorite phone number lists that were displayed on the mobile phone 1100. These lists will contain television channels that correspond to the remote control user 1615 favorite television channels, as determined by the remote control 1600. Once displayed on the television, the user can use the scroll/selection key 1635 on the keypad 1620 to select a desired channel from the favorite television channel list.

In any event, the priority listing program 1700, which is stored in the memory 1650 and executed by the control circuitry 1645, dynamically updates a comprehensive television channel list (described in further detail below) from which the next television channel will be selected. Preferably, the first channel on the comprehensive television channel list will be selected, then the second channel, then the third channel, and so on. The program 1700 updates the comprehensive television channel list based on the user's 1615 television watching pattern. For example, the program 1700 may maintain the comprehensive television channel list based on the number of times a television channel has been watched and the recent activity of the television channel, such that the comprehensive television channel list will likely contain a television channel that the remote control user 1615 is anticipated to watch at any given time. For example, if channels 2, 4, 6, and 7 have recently been watched numerous times, the program 1700 will tend to maintain these channels at the top of the comprehensive television channel list, so that they will be selected when the remote control user 1615 operates the favorite television channel key 1665.

To further improve the accuracy of anticipating the next channel that will be watched by the remote control user 1615, the program 1700 may optionally maintain several comprehensive television channel lists based on temporal information, such as, e.g., the day of the week (weekend or weekday) and/or time of day (day or evening). For example, a user 1615 may tend to watch a specific set of channels (e.g., 2, 4, and 8) between 8 pm and 10 pm on weekdays, and other set of channels (2, 5, and 11) between 3 pm and 6 pm on weekends. Or a user 1615 may tend to watch news programs between 10 pm and 12 pm on weekdays, and cartoons between 10 am and 12 pm on weekends. Thus, to further refine the process, the comprehensive television channel list can be divided into sublists that are selected and applied based on the current day of the week and/or time of the day.

To ensure that television channels that are quickly switched are not registered as being watched, the program 1700 only assumes that a program is watched if the remote control user 1615 has continuously watched the television channel for more than a specified period of time (e.g., five minutes). Thus, a television channel will only affect the comprehensive television channel list if this period of time is exceeded. This period of time can be fixed for all lengths of television programs, or optionally, can be based on the length of the television program (e.g., the longer the television program, the longer the time period). Optionally, programming information contained in a device, such as, e.g., a set top box or a video cassette recorder, can be used to determine if a television program is actually watched or not.

It should also be noted that although only a single user is illustrated, multiple users can obviously use the remote control 1600. In this case, usage of the remote control 1600 by multiple users will be transparent to the program 1700, which will maintain the comprehensive television channel list as if a single user was always using the remote control 1600. As will be described in further detail below, the program can be modified to maintain a television channel list for each of the users 1615, so that the television channel patterns of one user do not dilute or interfere with the television channel patterns of another user. In this manner, the comprehensive television channel list can be customized to the particular user that is currently operating the remote control 1600.

As will be described in further detail below, the listing program 1700 uses the existence or non-existence of a watched television channel on a comprehensive television channel list as a performance index φ in measuring its performance in relation to its objective of ensuring that the comprehensive channel list will include the future watched television channel, so that the remote control user 1615 is not required to "surf" through all of the television channels or manually punch in the television channel using the number keys. In this regard, it can be said that the performance index φ is instantaneous. Alternatively or optionally, the listing program 1700 can also use the location of the television channel on the comprehensive channel list as a performance index φ.

Figure 25:
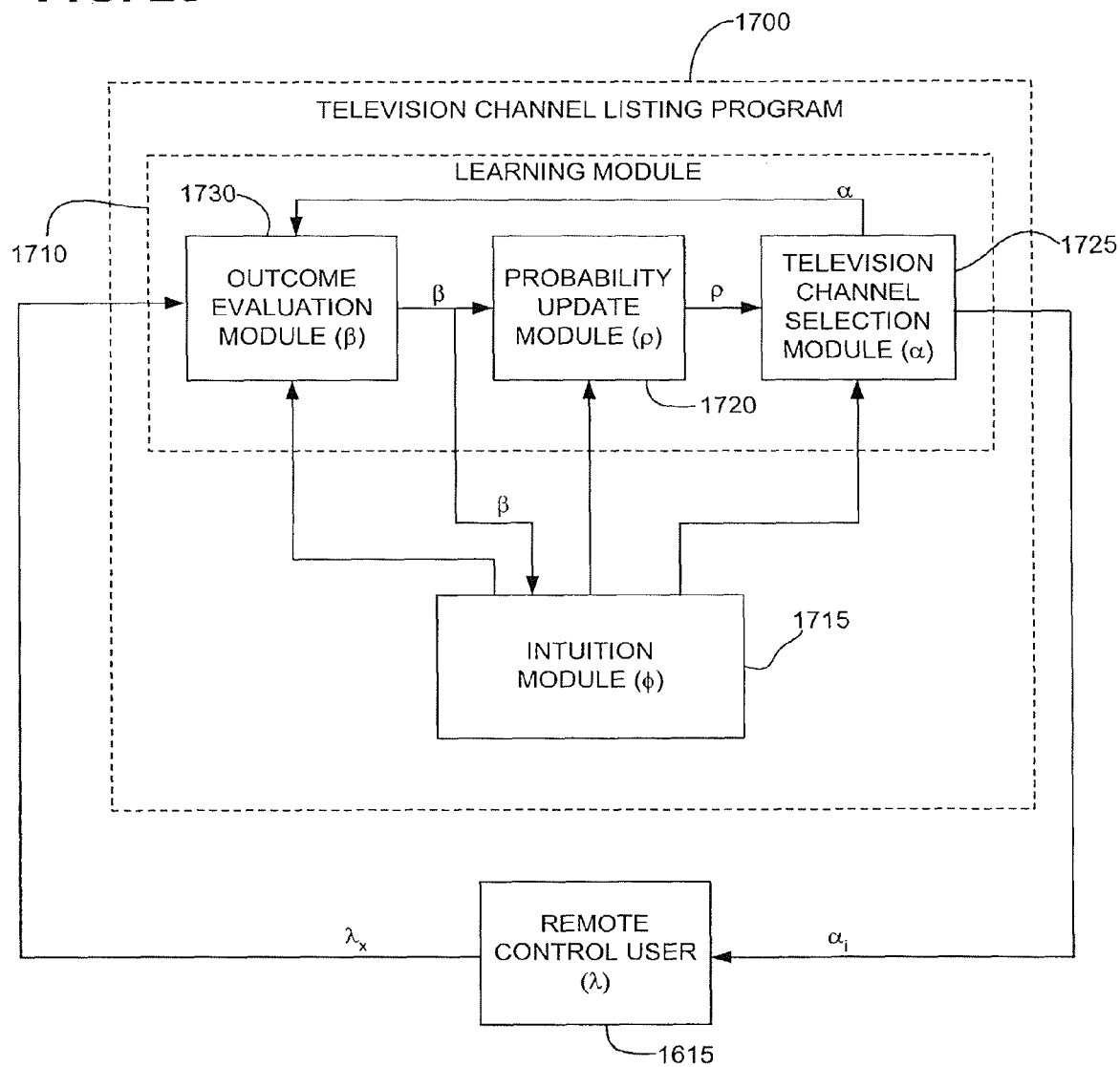
FIG. 25 is a block diagram of a priority listing program employed in the remote control of FIG. 23.

Referring now to FIG. 25, the listing program 1700 includes a probabilistic learning module 1710 and an intuition module 1715, which are specifically tailored for the remote control 1600. The probabilistic learning module 1710 comprises a probability update module 1720, a television channel selection module 1725, and an outcome evaluation module 1730. Specifically, the probability update module 1720 is mainly responsible for learning the remote control user's 1615 television watching habits and updating the previously described comprehensive television channel list α that places television channels in the order that they are likely to be watched in the future during any given time period. The outcome evaluation module 1730 is responsible for evaluating the comprehensive channel list α relative to current television channels $\lambda_x$ watched by the remote control user 1615. The channel selection module 1725 is mainly responsible for selecting a television channel from the comprehensive channel list α upon operation of the favorite television channel key 1665. Preferably, this is accomplished by selecting the channel at the top of the comprehensive channel list α, then the second channel, third channel, and so on, as the favorite television channel key 1665 is repeatedly operated. The intuition module 1715 is responsible for directing the learning of the listing program 1700 towards the objective of selecting the television channel that is likely to be the remote control user's 1615 next watched television channel. In this case, the intuition module 1715 operates on the probability update module 1720, the details of which will be described in further detail below.

To this end, the channel selection module 1725 is configured to receive a television channel probability distribution p from the probability update module 1720, which is similar to equation [1] and can be represented by the following equation:

$$p(k)=[p_1(k), p_2(k), p_3(k) \ldots p_n(k)], \quad [1\text{-}3]$$

where $p_i$ is the probability value assigned to a specific television channel $\alpha_i$; n is the number of television channels $\alpha_i$ on the comprehensive channel list α, and k is the incremental time at which the television channel probability distribution was updated.

Based on the television channel probability distribution p, the channel selection module 1725 generates the comprehensive channel list α, which contains the listed television channels $\alpha_i$ ordered in accordance with their associated probability values $p_i$. For example, the first listed television channel $\alpha_i$ will be associated with the highest probability value $p_i$, while the last listed television channel $\alpha_i$ will be associated with the lowest probability value $p_i$. Thus, the comprehensive channel list α contains all television channels ever watched by the remote control user 1615 and is unlimited. Optionally, the comprehensive channel list α can contain a limited amount of television channels $\alpha_i$, e.g., 10, so that the memory 1650 is not overwhelmed by seldom watched television channels, which may eventually drop off of the comprehensive channel list α.

It should be noted that a comprehensive television channel list α need not be separate from the television channel probability distribution p, but rather the television channel probability distribution p can be used as the comprehensive channel list α to the extent that it contains a comprehensive list of television channels $\alpha_i$ matching all of the watched television channels $\lambda_x$. However, it is conceptually easier to explain the aspects of the listing program 1700 in the context of a comprehensive television channel list that is ordered in accordance with the corresponding probability values $p_i$, rather than in accordance with the order in which they are listed in the television channel probability distribution p.

From the comprehensive channel list α, the channel selection module 1725 selects the television channel $\alpha_i$ that the television will be switched to. In the preferred embodiment, the selected television channel $\alpha_i$ will be that which corresponds to the highest probability value $p_i$, i.e., the top television channel $\alpha_i$ on the comprehensive channel list α. The channel selection module 1725 will then select the next television channel $\alpha_i$ that the television will be switched to, which preferably corresponds to the next highest probability value $p_i$, i.e., the second television channel $\alpha_i$ on the comprehensive channel list α, and so on. As will be described in further detail below, this selection process can be facilitated by using a channel list pointer, which is incremented after each channel is selected, and reset to "1" (so that it points to the top channel) after a television channel has been deemed to be watched or after the last channel on the comprehensive channel list α has been reached.

As an example, consider Table 10, which sets forth in exemplary comprehensive television channel list α with associated probability values $p_i$.

TABLE 10

Exemplary Probability Values for Comprehensive Television Channel List

| Number | Listed Television Channels ($\alpha_i$) | Probability Values ($p_i$) |
|---|---|---|
| 1 | 2 | 0.286 |
| 2 | 11 | 0.254 |
| 3 | 4 | 0.142 |
| 4 | 26 | 0.114 |
| 5 | 35 | 0.097 |
| 6 | 9 | 0.054 |
| 7 | 48 | 0.033 |
| 8 | 76 | 0.012 |
| 9 | 5 | 0.008 |
| 10 | 15 | 0.003 |

In this exemplary case, channel 2, then channel 11, then channel 4, and so on, will be selected as the television channels to which the television will be sequentially switched. Optionally, these channels can selected as a favorite television channel list to be displayed on the television, since they are associated with the top three probability values $p_i$.

The outcome evaluation module 1730 is configured to receive a watched television channel $\lambda_x$ from the remote control user 1615 via the keypad 1620 of the remote control 1600. For example, the remote control user 1615 can switch the television to the television channel $\lambda_x$ using the number keys 1625 or channel-up or channel-down keys 1630 on the keypad 1620, operating the favorite channel key 1665 on the keypad 1620, or through any other means, including voice activation. In this embodiment, the television channel $\lambda_x$ can be selected from a complete set of television channels λ, i.e., all valid television channels that can be watched on the television. As previously discussed, the switched television channel will be considered to be a watched television channel only after a certain period of time has elapsed while the television is on that television channel. The outcome evaluation module 1730 is further configured to determine and output an outcome value β that indicates if the currently watched television channel $λ_x$ matches a television channel $α_i$ on the comprehensive channel list α. In the illustrated embodiment, the outcome value β equals one of two predetermined values: "1" if the currently watched television channel $λ_x$ matches a television channel $α_i$ on the comprehensive channel list α, and "0" if the currently watched television channel $λ_x$ does not match a television channel $α_i$ on the comprehensive channel list α.

It can be appreciated that unlike in the duck game 300 where the outcome value β is partially based on the selected game move $α_i$, the outcome value β is technically not based on the listed television channel $α_i$ selected by the channel selection module 1725, but rather whether a watched television channel $λ_x$ matches a television channel $α_i$ on the comprehensive channel list α irrespective of whether it is the selected television channel. It should be noted, however, that the outcome value β can optionally or alternatively be partially based on a selected television channel.

The intuition module 1715 is configured to receive the outcome value β from the outcome evaluation module 1730 and modify the probability update module 1720, and specifically, the television channel probability distribution p, based thereon. Specifically, if the outcome value β equals "0," indicating that the currently watched television channel $λ_x$ does not match a television channel $α_i$ on the comprehensive channel list α, the intuition module 1715 adds the watched television channel $λ_x$ to the comprehensive channel list α as a listed television channel $α_i$.

The television channel $α_i$ can be added to the comprehensive channel list α in a variety of ways, including in the manner used by the program 1700 to add a telephone number in the mobile phone 1100. Specifically, the location of the added television channel $α_i$ on the comprehensive channel list α depends on the probability value $p_i$ assigned or some function of the probability value $p_i$ assigned.

For example, in the case where the number of television channels $α_i$ is not limited, or the number of television channels $α_i$ has not reached its limit, the television channel $α_i$ may be added by assigning a probability value $p_i$ to it and renormalizing the television channel probability distribution p in accordance with the following equations:

$$p_i(k+1) = f(x); \quad [27]$$

$$p_j(k+1) = p_j(k)(1-f(x)); j \neq i \quad [28]$$

where i is the added index corresponding to the newly added television channel $α_i$, $p_i$ is the probability value corresponding to television channel $α_i$ added to the comprehensive channel list α, f(x) is the probability value $p_i$ assigned to the newly added television channel $α_i$, $p_j$ is each probability value corresponding to the remaining television channels $α_j$ on the comprehensive channel list α, and k is the incremental time at which the television channel probability distribution was updated.

In the illustrated embodiment, the probability value $p_i$ assigned to the added television channel $α_i$ is simply the inverse of the number of television channels $α_i$ on the comprehensive channel list α, and thus f(x) equals 1/(n+1), where n is the number of television channels on the comprehensive channel list α prior to adding the television channel $α_i$. Thus, equations [27] and [28] break down to:

$$p_i(k+1) = \frac{1}{n+1}; \quad [27\text{-}1]$$

$$p_j(k+1) = p_j(k)\frac{n}{n+1}; j \neq i \quad [28\text{-}1]$$

In the case where the number of television channels $α_i$ is limited and has reached its limit, the television channel α with the lowest corresponding priority value $p_i$ is replaced with the newly watched television channel $λ_x$ by assigning a probability value $p_i$ to it and renormalizing the television channel probability distribution p in accordance with the following equations:

$$p_i(k+1) = f(x); \quad [29]$$

$$p_j(k+1) = \frac{p_j(k)}{\sum_{j \neq i}^{n} p_j(k)}(1-f(x)); j \neq i \quad [30]$$

where i is the index used by the removed television channel $α_i$, $p_i$ is the probability value corresponding to television channel $α_i$ added to the comprehensive channel list α, f(x) is the probability value $p_m$ assigned to the newly added television channel $α_i$, $p_j$ is each probability value corresponding to the remaining television channels $α_j$ on the comprehensive channel list α, and k is the incremental time at which the television channel probability distribution was updated.

As previously stated, in the illustrated embodiment, the probability value $p_i$ assigned to the added television channel $α_i$ is simply the inverse of the number of television channels $α_i$ on the comprehensive channel list α, and thus f(x) equals 1/n, where n is the number of television channels on the comprehensive channel list α. Thus, equations [35] and [36] break down to:

$$p_i(k+1) = \frac{1}{n}; \quad [29\text{-}1]$$

$$p_j(k+1) = \frac{p_j(k)}{\sum_{j \neq i}^{n} p_j(k)}\left(\frac{n-1}{n}\right); j \neq i \quad [30\text{-}1]$$

It should be appreciated that the speed in which the automaton learns can be controlled by adding the television channel $α_i$ to specific locations within the television channel probability distribution p. For example, the probability value $p_i$ assigned to the added television channel $α_i$ can be calculated as the mean of the current probability values $p_i$, such that the television channel $α_i$ will be added to the middle of the comprehensive channel list α to effect an average learning speed. The probability value $p_i$ assigned to the added television channel $α_i$ can be calculated as an upper percentile (e.g. 25%) to effect a relatively quick learning speed. Or the probability value $p_i$ assigned to the added television channel $α_i$ can be calculated as a lower percentile (e.g. 75%) to effect a relatively slow learning speed. It should be noted that if there is a limited number of television channels $α_i$ on the comprehensive channel list α, thereby placing the lowest television channels $α_i$ in the likelihood position of being deleted from the comprehensive channel list α, the assigned probability value $p_i$ should be not be so low as to cause the added television channel $\alpha_i$ to oscillate on and off of the comprehensive channel list $\alpha$ when it is alternately watched and not watched.

In any event, if the outcome value $\beta$ received from the outcome evaluation module 1730 equals "1," indicating that the currently watched television channel $\lambda_x$ matches a television channel $\alpha_i$ on the comprehensive channel list $\alpha$, the intuition module 1715 directs the probability update module 1720 to update the television channel probability distribution p using a learning methodology. In the illustrated embodiment, the probability update module 1720 utilizes a linear reward-inaction P-type update.

As an example, assume that a currently watched television channel $\lambda_x$ matches a television channel $\alpha_5$ on the comprehensive channel list $\alpha$, thus creating an outcome value $\beta=1$. Assume also that the comprehensive channel list $\alpha$ currently contains 10 television channels $\alpha_i$. In this case, general updating equations [6] and [7] can be expanded using equations [10] and [11], as follows:

$$p_5(k+1) = p_5(k) + \sum_{\substack{j=1 \\ j \neq 5}}^{10} ap_j(k);$$

$$p_1(k+1) = p_1(k) - ap_1(k);$$

$$p_2(k+1) = p_2(k) - ap_2(k);$$

$$p_3(k+1) = p_3(k) - ap_3(k);$$

$$p_4(k+1) = p_4(k) - ap_4(k);$$

$$p_6(k+1) = p_6(k) - ap_6(k);$$

$$p_7(k+1) = p_7(k) - ap_7(k);$$

$$p_8(k+1) = p_8(k) - ap_8(k);$$

$$p_9(k+1) = p_9(k) - ap_9(k);$$

$$p_{10}(k+1) = p_{10}(k) - ap_{10}(k)$$

Thus, the corresponding probability value $p_5$ is increased, and the television channel probability values $p_i$ corresponding to the remaining television channels $\alpha_i$ are decreased. The value of a is selected based on the desired learning speed. The lower the value of a, the slower the learning speed, and the higher the value of a, the higher the learning speed. In the preferred embodiment, the value of a has been chosen to be 0.03. It should be noted that the penalty updating equations [8] and [9] will not be used, since in this case, a reward-penalty P-type update is not used.

Thus, it can be appreciated that, in general, the more a specific listed television channel $\alpha_i$ is watched relative to other listed television channels $\alpha_i$, the more the corresponding probability value $p_i$ is increased, and thus the higher that listed television channel $\alpha_i$ is moved up on the comprehensive channel list $\alpha$. As such, the chances that the listed television channel $\alpha_i$ will be selected will be increased. In contrast, the less a specific listed television channel $\alpha_i$ is watched relative to other listed television channels $\alpha_i$, the more the corresponding probability value $p_i$ is decreased (by virtue of the increased probability values $p_i$ corresponding to the more frequently watched listed television channels $\alpha_i$), and thus the lower that listed television channel $\alpha_i$ is moved down on the comprehensive channel list $\alpha$. As such, the chances that the listed television channel $\alpha_i$ will be selected by the channel selection module 1725 will be decreased.

It can also be appreciated that due to the nature of the learning automaton, the relative movement of a particular listed television channel $\alpha_i$ is not a matter of how many times the television channel $\alpha_i$ is watched, and thus, the fact that the total number of times that a particular listed television channel $\alpha_i$ has been watched is high does not ensure that it will be selected. In reality, the relative placement of a particular listed television channel $\alpha_i$ on the comprehensive channel list $\alpha_s$ is more of a function of the number of times that the listed television channel $\alpha_i$ has been recently watched. For example, if the total number of times a listed television channel $\alpha_i$ is watched is high, but has not been watched in the recent past, the listed television channel $\alpha_i$ may be relatively low on the comprehensive channel list $\alpha$, and thus it may not be selected. In contrast, if the total number of times a listed television channel $\alpha_i$ is watched is low, but it has been watched in the recent past, the listed television channel $\alpha_i$ may be relatively high on the comprehensive channel list $\alpha$, and thus it may be selected. As such, it can be appreciated that the learning automaton quickly adapts to the changing watching patterns of a particular remote control user 1615.

It should be noted, however, that a television channel probability distribution p can alternatively be purely based on the frequency of each of the television channels $\lambda_x$. For example, given a total of n television channels watched, and a total number of times that each television channel is watched $f_1$, $f_2$, $f_3$ . . . , the probability values $p_i$ for the corresponding listed television channels $\alpha_i$ can be:

$$p_i(k+1) = \frac{fi}{n} \quad [31]$$

Noteworthy, each probability value $p_i$ is not a function of the previous probability value $p_i$ (as characterized by learning automaton methodology), but rather the frequency of the listed television channel $\alpha_i$ and total number of watched television channels n. With the purely frequency-based learning methodology, when a new television channel $\alpha_i$ is added to the comprehensive channel list $\alpha$, its corresponding probability value $p_i$ will simply be 1/n, or alternatively, some other function of the total number of watched television channels n. Optionally, the total number of watched television channels n is not absolute, but rather represents the total number of watched television channels n made in a specific time period, e.g., the last three months, last month, or last week. In other words, the television channel probability distribution p can be based on a moving average. This provides the frequency-based learning methodology with more dynamic characteristics.

In any event, as described above, a single comprehensive television channel list $\alpha$ that contains all television channels watched regardless of the time and day of the week is generated and updated. Optionally, several comprehensive television channel lists $\alpha$ can be generated and updated based on the time and day of the week. For example, Tables 11 and 12 below set forth exemplary comprehensive television channel lists $\alpha 1$ and $\alpha 2$ that respectively contain television channels $\alpha 1_i$ and $\alpha 2_i$ that are watched during the weekdays and weekend.

TABLE 11

Exemplary Probability Values for Comprehensive Weekday Television Channel List

| Number | Listed Weekday Television Channels ($\alpha 1_i$) | Probability Values ($p_i$) |
|---|---|---|
| 1 | 4 | 0.263 |
| 2 | 11 | 0.188 |

TABLE 11-continued

Exemplary Probability Values for Comprehensive Weekday Television Channel List

| Number | Listed Weekday Television Channels ($\alpha 1_i$) | Probability Values ($p_i$) |
|---|---|---|
| 3 | 48 | 0.162 |
| 4 | 29 | 0.133 |
| 5 | 9 | 0.103 |
| 6 | 2 | 0.075 |
| 7 | 88 | 0.033 |
| 8 | 38 | 0.025 |
| 9 | 7 | 0.014 |
| 10 | 15 | 0.004 |

TABLE 12

Exemplary Probability Values for Comprehensive Weekend Television Channel List

| Number | Listed Weekday Television Channels ($\alpha 1_i$) | Probability Values ($p_i$) |
|---|---|---|
| 1 | 11 | 0.256 |
| 2 | 7 | 0.209 |
| 3 | 4 | 0.153 |
| 4 | 38 | 0.125 |
| 5 | 93 | 0.083 |
| 6 | 29 | 0.067 |
| 7 | 48 | 0.043 |
| 8 | 9 | 0.032 |
| 9 | 2 | 0.020 |
| 10 | 8 | 0.012 |

Notably, the top five locations of the exemplary comprehensive television channel lists α1 and α2 contain different television channels $\alpha 1_i$ and $\alpha 2_i$, presumably because certain television channels $\alpha 1_i$ (e.g., 48, 29, and 9) were mostly only watched during the weekdays, and certain television channels $\alpha 2_i$ (e.g., 7, 38, and 93) were mostly only watched during the weekends. The top five locations of the exemplary comprehensive television channel lists α1 and α2 also contain common television channels $\alpha 1_i$ and $\alpha 2_i$, presumably because certain television channels $\alpha 1_i$ and $\alpha 2_i$ (e.g., 4 and 11) were watched during the weekdays and weekends. Notably, these common television channels $\alpha 1_i$ and $\alpha 2_i$ are differently ordered in the exemplary comprehensive television channel lists α1 and α2, presumably because the remote control user's 1615 weekday and weekend watching patterns have differently influenced the ordering of these television channels. Although not shown, the single comprehensive list α can be subdivided, or the comprehensive channel lists α1 and α2 can be further subdivided, e.g., by day and evening.

When there are multiple comprehensive television channel lists α that are divided by day and/or time, the channel selection module 1725, outcome evaluation module 1730, probability update module 1720, and intuition module 1715 operate on the comprehensive channel lists α based on the current day and/or time (as obtained by a clock or calendar stored and maintained by the control circuitry 1645). Specifically, the intuition module 1715 selects the particular comprehensive list α that will be operated on. For example, during a weekday, the intuition module 1715 will select the comprehensive channel lists α1, and during the weekend, the intuition module 1715 will select the comprehensive channel lists α2.

The channel selection module 1725 will maintain the ordering of all of the comprehensive channel lists α, but will select the television channel from the particular comprehensive television channel list α selected by the intuition module 1715. For example, during a weekday, the channel selection module 1725 will select the television channel from the comprehensive channel list α1, and during the weekend, the channel selection module 1725 will select the television channel from the comprehensive channel list α2. Thus, it can be appreciated that the particular television channel to which the television will be switched will be customized to the current day, thereby increasing the chances that the next television channel $\lambda_x$ watched by the remote control user 1615 will be the selected television channel.

The outcome evaluation module 1730 will determine if the currently watched television channel $\lambda_x$ matches a television channel $\alpha_i$ on the comprehensive channel list α selected by the intuition module 1715 and generate an outcome value β based thereon, and the intuition module 1715 will accordingly modify the television channel probability distribution p corresponding to the selected comprehensive television channel list α. For example, during a weekday, the outcome evaluation module 1730 determines if the currently watched television channel $\lambda_x$ matches a television channel $\alpha_i$ on the comprehensive channel list α1, and the intuition module 1715 will then modify the television channel probability distribution p corresponding to the comprehensive channel list α1. During a weekend, the outcome evaluation module 1730 determines if the currently watched television channel $\lambda_x$ matches a television channel $\alpha_i$ on the comprehensive channel list α2, and the intuition module 1715 will then modify the television channel probability distribution p corresponding to the comprehensive channel list α2.

The intuition module 1715 may also prevent any one probability value $p_i$ from overwhelming the remaining probability values $p_i$ by limiting it to a particular value, e.g., 0.5. In this sense, the learning module 1710 will not converge to any particular probability value $p_i$, which is not the objective of the remote control 1600. That is, the objective is not to find a single favorite television channel, but rather a list of favorite television channels that dynamically changes with the remote control user's 1615 changing watching patterns. Convergence to a single probability value $p_i$ would defeat this objective.

So far, it has been explained that the listing program 1700 uses the instantaneous outcome value β as a performance index φ in measuring its performance in relation to its objective of select a television channel that will be watched by the remote control user 1615. It should be appreciated, however, that the performance of the listing program 1700 can also be based on a cumulative performance index φ. For example, the listing program 1700 can keep track of a percentage of the watched television channels $\lambda_x$ that match a television channel $\alpha_i$ on the comprehensive channel list α or portion thereof, or a consecutive number of watched television channels $\lambda_x$ that do not match a television channel $\alpha_i$ on the comprehensive channel list α or portion thereof, based on the outcome value β. Based on this cumulative performance index φ, the intuition module 1715 can modify the learning speed or nature of the learning module 1710.

Optionally, the outcome value β can be time-based in that the cumulative time that a television channel is watched can be measured to determine the quality of the watched television channel. If the case of a relatively lengthy time the television channel is watched, the intuition module 1715 can assign a probability value (if not found on the comprehensive channel list α) or increase the probability value (if found on the comprehensive channel list α) of the corresponding television channel higher than would otherwise be assigned or increased. In contrast, in the case of a relatively short time the television channel is watched, the intuition module 1715 can assign a probability value (if not found on the comprehensive channel list α) or increase the probability value (if found on the comprehensive channel list α) of the corresponding television channel lower than would otherwise be assigned or increased. When measuring the quality of the watched television channel, the processing can be performed after the television channel is switched.

It should be noted that, in the case where a comprehensive television channel list is displayed on the screen of the television for selection by the remote control user 1615, the channel selection module 1725 may optionally select a television channel subset from the comprehensive channel list α for eventual display to the remote control user 1615 as a comprehensive television channel list. Updating of a comprehensive television channel list that contains a television channel subset, and selection of the comprehensive television channel list for display, is similar to that accomplished in the previously described mobile phone 1100 when updating the comprehensive phone number list and selecting the favorite phone number therefrom.

Although the program 1700 is described as being stored within a remote control 1600, it can be distributed amongst several components within a remote control television system, or another component within the remote control television system, e.g., within the television, itself, or some other device associated with the television, e.g., a cable box, set top box, or video cassette recorder. In addition, although the program 1700 is described for use with a television, it should be noted that it can be applied to other consumer electronic equipment on which users can watch or listen to programs by switching channels, e.g., stereo equipment, satellite radio, MP3 player, Web devices, etc.

Figure 26:
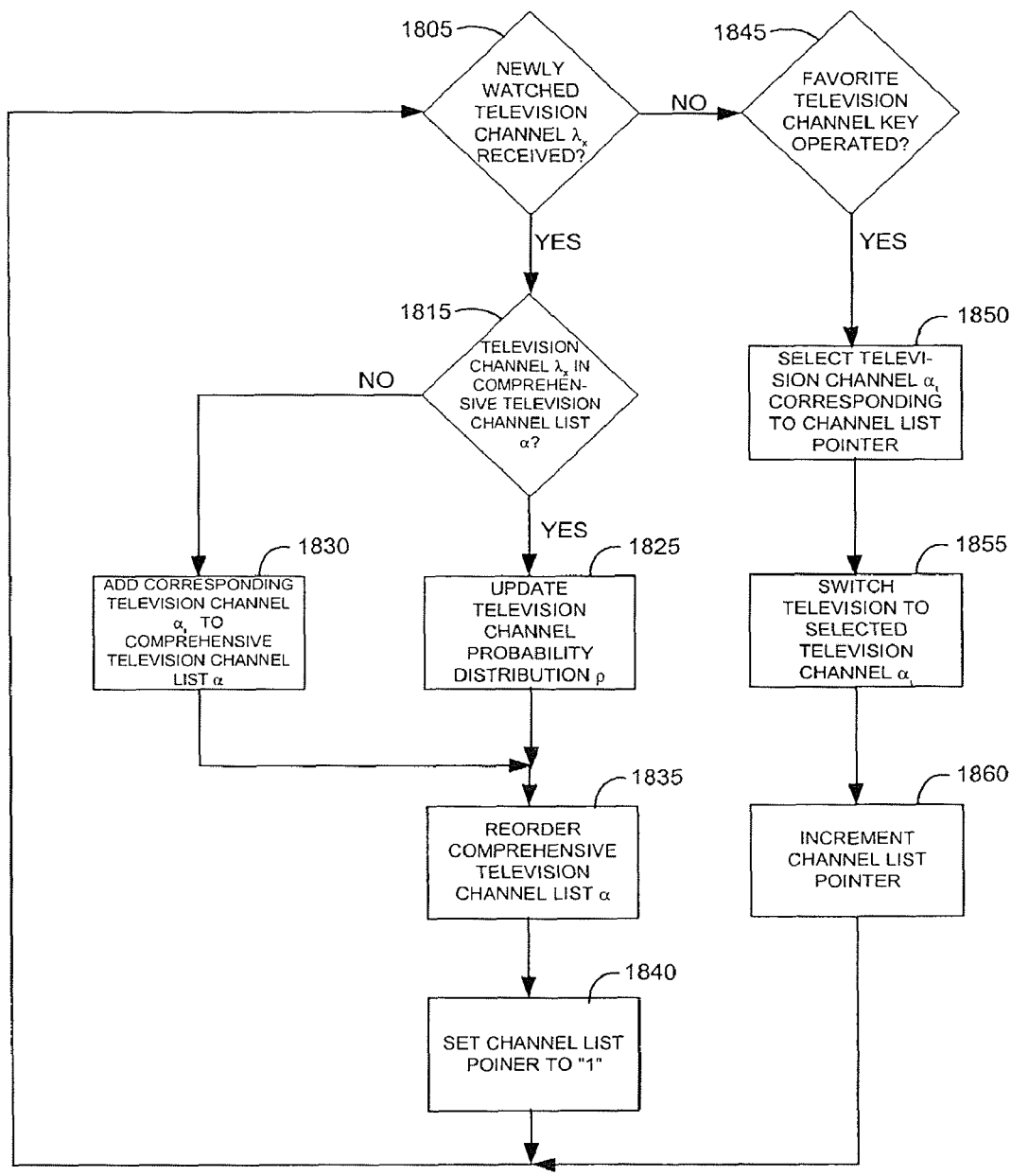
FIG. 26 is a flow diagram illustrating a preferred method performed by the priority listing program of FIG. 25.

Having now described the structure of the listing program 1700, the steps performed by the listing program 1700 will be described with reference to FIG. 26. First, the outcome evaluation module 1730 determines whether a television channel $\lambda_x$ has been newly watched (step 1805). As previously discussed, this occurs when a predetermined period of time has elapsed while the television is tuned to the television channel. If a television channel $\lambda_x$ has been newly watched, the outcome evaluation module 1730 determines whether it matches a television channel $\alpha_i$ on the comprehensive channel list α and generates an outcome value β in response thereto (step 1815). If so (β=1), the intuition module 1715 directs the probability update module 1720 to update the television channel probability distribution p using a learning methodology to increase the probability value $p_i$ corresponding to the listed television channel $\alpha_i$ (step 1825). If not (β=0), the intuition module 1715 generates a corresponding television channel $\alpha_i$ and assigns a probability value $p_i$ to it, in effect, adding it to the comprehensive channel list α (step 1830). The channel selection module 1725 then reorders the comprehensive channel list α (step 1835), sets the channel list pointer to "1" (step 1840), and returns to step 1805.

If a television channel $\lambda_x$ has not been newly watched at step 1805, e.g., if the predetermined period of time has not expired, the channel selection module 1725 determines whether the favorite channel key 1665 has been operated (step 1845). If so, the channel selection module 1725 selects a listed television channel $\alpha_i$, and in this case, the listed television channel $\alpha_i$ corresponding to the channel list pointer (step 1850). The television is then switched to the selected television channel $\alpha_i$ (step 1855), and the channel list pointer is incremented (step 1860). After step 1860, or if the favorite channel key 1665 has not been operated at step 1845, the listing program 1700 then returns to step 1805, where it is determined again if television channel $\lambda_x$ has been watched.

Figure 27:
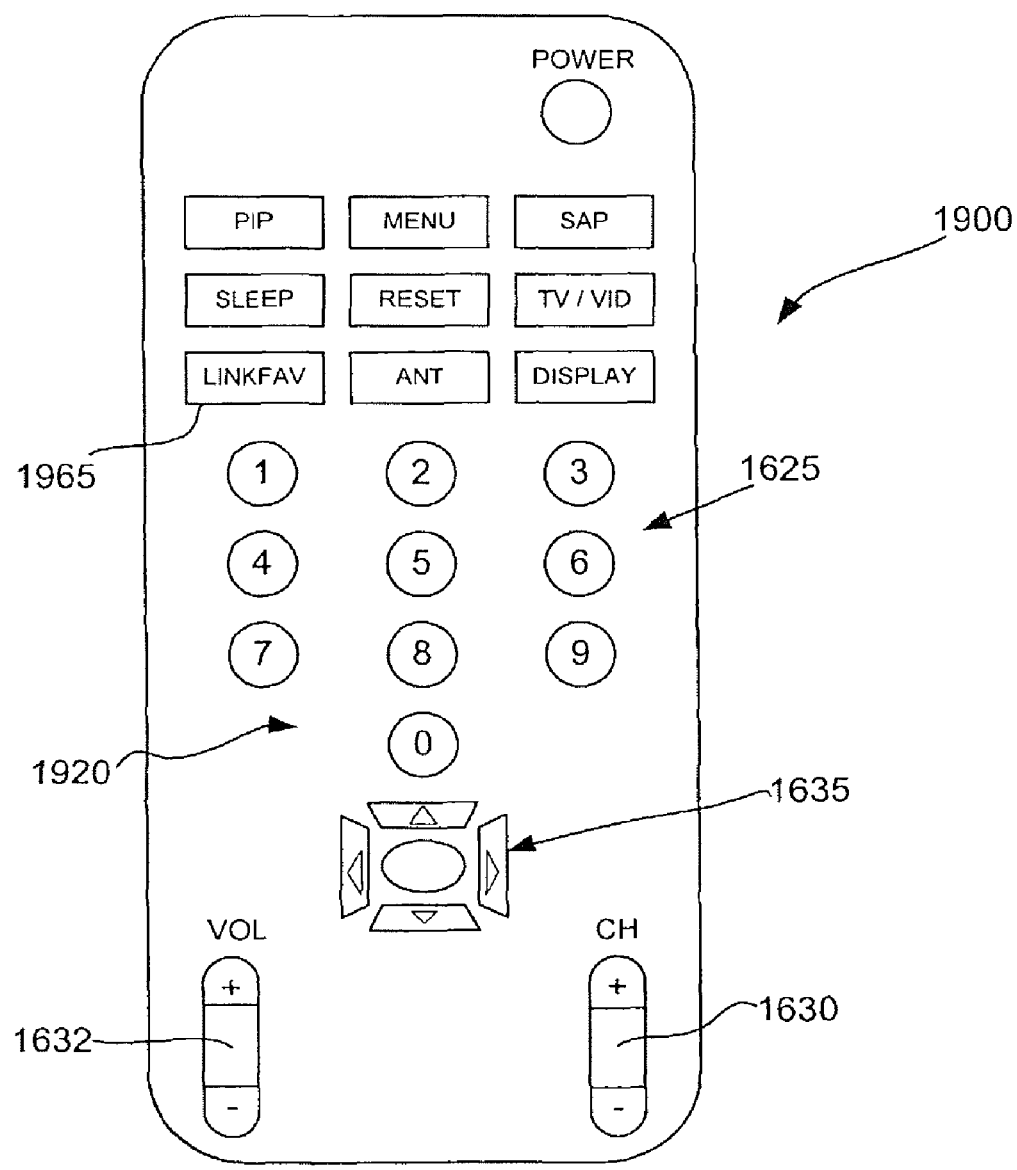
FIG. 27 is a plan view of another television remote control to which the generalized program of FIG. 1 can be applied.

Referring now to FIG. 27, another priority listing program 2000 (shown in FIG. 28) developed in accordance with the present inventions is described in the context of another television remote control 1900. The remote control 1900 is similar to the previously described remote control 1600 with the exception that it comprises a keypad 1920 that alternatively or optionally contains a specialized favorite channel key 1965 referred to as a "LINKFAV" key. The specialized favorite channel key 1965 is similar to the generalized favorite channel key 1965 in that its operation immediately and automatically switches the television from the current television channel to a next television channel that tends to correspond to one of the user's 1615 favorite television channels. Unlike with the generalized favorite channel key 1965, however, the next television channel will tend to be one of the user's 1615 favorite television channels based on the specific (as opposed to a general) channel watching pattern that the remote control user 1615 is currently in.

To this end, the program 2000 dynamically updates a plurality of linked comprehensive television channel lists from which the next television channel will be selected. Like with the generalized comprehensive television channel list, the program 2000 may maintain each of the linked comprehensive television channel lists based on the number of times a television channel has been watched, and the recent activity of the television channel. The linked comprehensive television channel lists are arranged and updated in such a manner that a selected one will be able to be matched and applied to the specific channel watching pattern that the remote control user 1615 is currently in.

Specifically, each linked comprehensive television channel list corresponds to a value of a specified television channel parameter, such that, when the remote control user 1615 operates the specialized favorite television key 1965, the linked comprehensive television channel list corresponding to the value exhibited by the currently watched television channel can be recalled, and thus, the next channel selected from that recalled list will be more likely to be the television channel that the remote control user 1615 desires to watch. A channel parameter can, e.g., include a switched channel number (in which case, the values may be 2, 3, 4, 5, etc.), channel type (in which case, the values may be entertainment, news, drama, sports, comedy, education, food, movies, science fiction, cartoon, action, music, shopping, home), channel age/gender (in which case, the values may be adult, teenage, kids, women, etc.), or channel rating (in which case, the values may be TV-Y, TV-Y7, TV-14, TV-MA, etc.). If the channel parameter is a channel type, channel age/gender or channel rating, a device (such as, e.g., a set top box, television or video cassette recorder) can be used to extract this information from the incoming program signal.

For example, if the channel parameter is a switched channel number, and if the television has been recently and often switched from channel 2 to channels 4, 8, and 11, or vice versa, the program 2000 will tend to maintain channels 4, 8, and 11 at the top of a list corresponding to channel 2, so that these favorite channels will be selected when the remote control user 1615 is currently watching channel 2 and operates the specialized favorite television channel key 1965. As another example, if the channel parameter is a channel type, and if movie channels 14 (TNT), 24 (MAX), and 26 (HBO3) have been recently watched numerous times, the program 2000 will tend to maintain these channels at the top of a list corresponding to movie channels, so that these favorite channels will be selected when the remote control user 1615 is currently watching a movie channel and operates the specialized favorite television channel key 1965.

As with the previously described program 1700, the program 2000 may optionally maintain the specialized television channel lists based on temporal information, such as, e.g., the day of the week (weekend or weekday) and/or time of day (day or evening). Thus, the specialized television channel lists can be further divided into sublists that are selected and applied based on the current day of the week and/or time of the day.

As with the program 1700, the program 2000 only assumes that a program is watched if the remote control user 1615 has continuously watched the television channel for more than a specified period of time (e.g., five minutes), so that a television channel will only affect the linked comprehensive television channel lists when this period of time is exceeded. Also, in the case where the television channel parameter is a switched channel number, selection of the next television channel from the specialized television channel lists, which would quickly vary with time, would be unstable without requiring a certain period of time to expire before a television channel can be considered watched. For example, without this feature, operation of the specialized favorite television channel key 1965 may switch the television from channel 2 to 4 if channel 4 is at the top of the linked comprehensive television channel list corresponding with channel 2, and then further operation of the specialized favorite television channel key 1965 may switch the television from channel 4 back to channel 2 if channel 2 is at the top of the linked comprehensive television channel list corresponding to channel 4. The channel would then switch back in and forth between channel 2 and 4 when the specialized favorite television channel key 1965 is further operated.

Thus, an assumption that a channel is a currently watched channel after a period of time has expired would prevent this adverse effect by forcing the program 2000 to select one linked comprehensive television channel list from which the unique channels can be sequentially selected. For example, when the currently watched television channel is channel 2, operation of the specialized favorite channel key 1965 may switch the television channel from channel 2 those channels that are on the linked comprehensive television channel list corresponding to channel 2. The predetermined period of time will, therefore, have to expire before the linked television channel, i.e., channel 2, is changed to the currently watched television channel.

As briefly discussed with respect to the program 1700, the program 2000 can be modified to maintain each of the specialized television channel lists for multiple users, so that the television channel patterns of one user do not dilute or interfere with the television channel patterns of another user. It should be noted, however, that in many cases, the specific channel watching patterns will be so unique to the users 1615 that the separate maintenance of the lists will not be necessary—at least with respect to the specialized favorite television channel key 1965. For example, a specific television channel pattern that is unique to kids (e.g., cartoons) will typically not conflict with a specific television channel pattern that is unique to adults (e.g., news).

As will be described in further detail below, the listing program 2000 uses the existence or non-existence of a watched television channel on the pertinent linked comprehensive television channel list as a performance index $\phi$ in measuring its performance in relation to its objective of ensuring that the pertinent linked channel list will include the future watched television channel, so that the remote control user 1615 is not required to 'surf' through all of the television channels or manually punch in the television channel using the number keys. In this regard, it can be said that the performance index $\phi$ is instantaneous. Alternatively or optionally, the listing program 2000 can also use the location of the television channel in the pertinent linked comprehensive channel list as a performance index $\phi$.

Figure 28:
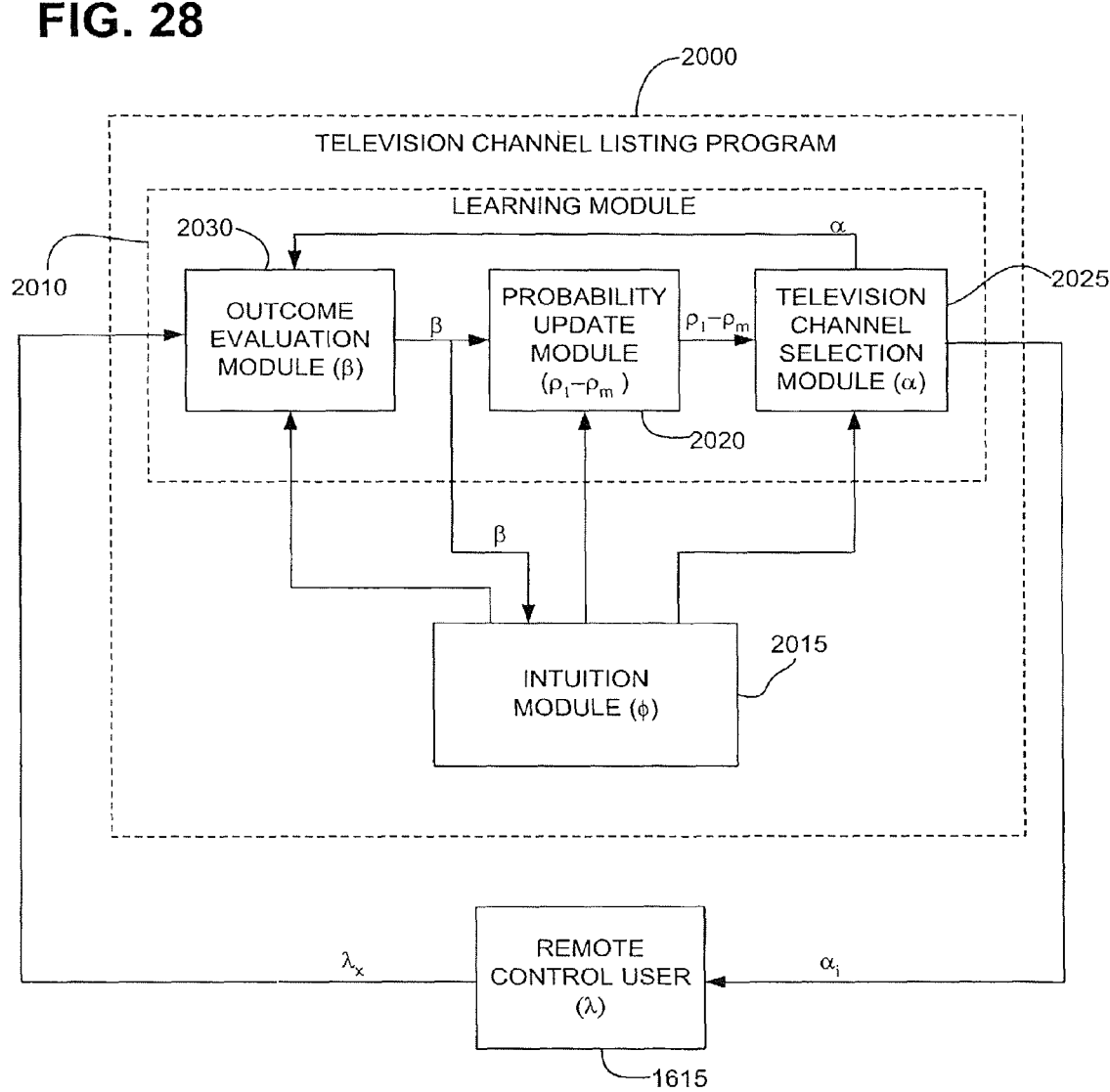
FIG. 28 is a block diagram of a priority listing program employed in the remote control of FIG. 27.

Referring now to FIG. 28, the listing program 2000 includes a probabilistic learning module 2010 and an intuition module 2015, which are specifically tailored for the remote control 1900. The probabilistic learning module 2010 comprises a probability update module 2020, a television channel selection module 2025, and an outcome evaluation module 2030.

Specifically, the probability update module 2020 is mainly responsible for learning the remote control user's 1615 television watching habits and updating linked comprehensive television channel lists $\alpha 1$-$\alpha m$ that places television channels $\alpha_i$ in the order that they are likely to be watched in the future during any given time period. m equals the number of values associated with the pertinent television channel parameter. For example, if the television channel parameter is a channel number, and there are 100 channels, m equals 100. If the television channel parameter is a channel type, and there are ten channel types, m equals 10.

The outcome evaluation module 2030 is responsible for evaluating the linked comprehensive channel lists $\alpha 1$-$\alpha m$ relative to current television channels $\lambda_x$ watched by the remote control user 1615. The channel selection module 2025 is mainly responsible for selecting a television channel $\alpha_i$ from the pertinent linked comprehensive channel list $\alpha$, upon operation of the favorite television channel key 1965. Preferably, this is accomplished by selecting the channel $\alpha_i$ at the top of the pertinent linked comprehensive channel list $\alpha$, then the second channel, third channel, and so on, as the specialized favorite channel key 1965 is repeatedly operated.

The intuition module 2015 is responsible for directing the learning of the listing program 2000 towards the objective of selecting the television channel $\alpha_i$ that is likely to be the remote control user's 1615 next watched television channel $\alpha_j$. In this case, the intuition module 2015 selects the pertinent linked comprehensive channel list $\alpha$, and operates on the probability update module 2020, the details of which will be described in further detail below.

To this end, the channel selection module 2025 is configured to receive multiple television channel probability distributions p1-pm from the probability update module 2020, which is similar to equation [1] and can be represented by the following equation:

$$p1(k) = [p1_1(k),\ p1_2(k),\ p1_3(k)\ \ldots\ p1_n(k)]; \quad [1\text{-}4]$$
$$p2(k) = [p2_1(k),\ p2_2(k),\ p2_3(k)\ \ldots\ p2_n(k)];$$
$$p3(k) = [p3_1(k),\ p3_2(k),\ p3_3(k)\ \ldots\ p3_n(k)]$$
$$\vdots$$
$$pm(k) = [pm_1(k),\ pm_2(k),\ pm_3(k)\ \ldots\ pm_n(k)]$$

where m is the number of probability distributions, i.e., the number of values associated with the pertinent television channel parameter; $p_i$ is the probability value assigned to a specific television channel $\alpha_i$, n is the number of television channels $\alpha_i$ on the comprehensive channel list $\alpha$, and k is the incremental time at which the television channel probability distribution was updated.

Based on the television channel probability distribution p1-pm, the channel selection module 2025 generates the linked comprehensive channel lists $\alpha 1$-$\alpha m$, each of which contains the listed television channels $\alpha_i$ ordered in accordance with their associated probability values $p_i$. Thus, each linked comprehensive channel list $\alpha$ contains all watched television channels $\alpha_i$ exhibiting a value corresponding to the list. For example, if the television channel parameter is a switched channel number, each linked comprehensive channel list $\alpha$ will be linked with a channel number and will contain all television channels $\alpha_i$ ever watched by the remote control user 1615 that were switched to and from that television channel. If the television channel parameter is a channel type, each linked comprehensive channel list $\alpha$ will be linked with a channel type and will contain all television channels $\alpha_i$ of that channel type ever watched by the remote control user 1615. As with the comprehensive channel list $\alpha$ described with respect to the program 1700, each of the linked comprehensive channel lists $\alpha 1$-$\alpha m$ can be unlimited, or optionally, contain a limited amount of television channels $\alpha_i$, e.g., 10, so that the memory 1650 is not overwhelmed by seldom watched television channels.

As with the previously described comprehensive television channel list $\alpha$, each of the linked comprehensive channel lists $\alpha 1$-$\alpha m$ need not be separate from their respective television channel probability distributions p1-pm, but rather a television channel probability distribution p can be used as a linked comprehensive channel list $\alpha$ to the extent that it contains a comprehensive list of the linked television channels $\alpha_i$.

From the linked comprehensive channel lists $\alpha 1$-$\alpha m$, the channel selection module 2025 selects the list corresponding to the television channel parameter value exhibited by the current television channel watched, and then selects, from that list, a television channel $\alpha_i$ that the television will be switched to. In the preferred embodiment, the selected television channel $\alpha_i$ will be that which corresponds to the highest probability value $p_i$, i.e., the top television channel $\alpha_i$ in the selected linked comprehensive channel list $\alpha$. The channel selection module 2025 will then select the next television channel $\alpha_i$ that the television will be switched to, which preferably corresponds to the next highest probability value $p_i$, i.e., the second television channel $\alpha_i$ in the selected linked comprehensive channel list $\alpha$, and so on. As previously described above, this selection process can be facilitated by using a channel list pointer. In the preferred embodiment, once the last television channel $\alpha_i$ is selected, the channel selection module 2025 will select the current channel that was watched prior to initiation of the selection process, and will then go through the selected linked comprehensive channel list $\alpha$ again. Optionally, the channel selection module 2025 will only cycle through a subset of the selected linked comprehensive channel list $\alpha$, e.g., the top three.

As an example, consider Table 13, which sets forth exemplary linked comprehensive television channel lists $\alpha$ with associated probability values $p_i$. In this case, the channel parameter is a switched channel number.

TABLE 13

Exemplary Probability Values for Linked Comprehensive Television Channel Lists

| Number | Listed Television Channels ($\alpha_i$) | Probability Values ($p_i$) |
|---|---|---|
| | Television Channel 2 | |
| 1 | 11 | 0.310 |
| 2 | 26 | 0.283 |
| 3 | 4 | 0.202 |
| 4 | 9 | 0.093 |

TABLE 13-continued

Exemplary Probability Values for Linked Comprehensive Television Channel Lists

| Number | Listed Television Channels ($\alpha_i$) | Probability Values ($p_i$) |
|---|---|---|
| 5 | 35 | 0.057 |
| 6 | 95 | 0.022 |
| 7 | 39 | 0.012 |
| 8 | 5 | 0.011 |
| 9 | 7 | 0.007 |
| 10 | 38 | 0.003 |
| | Television Channel 4 | |
| 1 | 2 | 0.280 |
| 2 | 8 | 0.238 |
| 3 | 9 | 0.168 |
| 4 | 38 | 0.119 |
| 5 | 30 | 0.084 |
| 6 | 83 | 0.032 |
| 7 | 5 | 0.028 |
| 8 | 7 | 0.018 |
| 9 | 33 | 0.009 |
| 10 | 93 | 0.004 |
| | . | |
| | . | |
| | Television Channel 100 | |
| 1 | 93 | 0.294 |
| 2 | 48 | 0.228 |
| 3 | 84 | 0.172 |
| 4 | 11 | 0.013 |
| 5 | 9 | 0.082 |
| 6 | 88 | 0.061 |
| 7 | 94 | 0.027 |
| 8 | 7 | 0.013 |
| 9 | 38 | 0.008 |
| 10 | 98 | 0.002 |

In this exemplary case, if the currently watched channel is channel 2, channel 11, then channel 26, then channel 4, and so on, will be selected as the television channels to which the television will be sequentially switched. If the currently watched channel is channel 4, channels 2, 8, and 9, and so on, will be selected. If the currently watched channel is channel 100, channels 93, 48, and 84 will be selected. Notably, there is no corresponding linked comprehensive television channel list $\alpha$ for channel 3, presumably because channel 3 has never been watched.

As with the previously described outcome evaluation module 1730, the outcome evaluation module 2030 is configured to receive a watched television channel $\lambda_x$ from the remote control user 1615 via the keypad 1920 using any one of a variety of manners. The outcome evaluation module 2030 is further configured to determine and output an outcome value $\beta$ that indicates if the currently watched television channel $\lambda_x$ matches a television channel $\alpha_i$ on the linked comprehensive channel list $\alpha$, as selected by the intuition module 2015 described below. In the illustrated embodiment, the outcome value $\beta$ equals one of two predetermined values: "1" if the currently watched television channel $\lambda_x$ matches a television channel $\alpha_i$ on the selected linked comprehensive channel list $\alpha$, and "0" if the currently watched television channel $\lambda_x$ does not match a television channel $\alpha_i$ on the selected linked comprehensive channel list $\alpha$.

The intuition module 2015 is configured to select the linked comprehensive channel list $\alpha$ corresponding to the television channel parameter value exhibited by the currently watched television channel $\lambda_x$. This selected linked comprehensive channel list $\alpha$ is the list that is operated on by the outcome evaluation module 2030 described above. The intuition module 2015 is further configured to receive the outcome value β from the outcome evaluation module 2030 and modify the probability update module 2020, and specifically, the television channel probability distribution p corresponding to the selected linked comprehensive channel list α. Specifically, if the outcome value β equals "0," indicating that next watched television channel $\lambda_x$ does not match a television channel $\alpha_i$ on the selected linked comprehensive channel list α, the intuition module 2015 adds the watched television channel $\lambda_x$ to the selected linked comprehensive channel list α as a listed television channel $\alpha_i$. The television channel $\alpha_i$ can be added to the selected linked comprehensive channel list α in a manner similarly described with respect to the intuition module 1715. If the outcome value β received from the outcome evaluation module 2030 equals "1," indicating that the next watched television channel $\lambda_x$ matches a television channel $\alpha_i$ on the selected linked comprehensive channel list α, the intuition module 2015 directs the probability update module 2020 to update the corresponding television channel probability distribution p in the manner previously described with respect to intuition module 1715.

Optionally, the intuition module 2015 can be configured to select the linked comprehensive channel list α corresponding to the next watched television channel $\lambda_x$ and update that based on whether the current watched television channel $\lambda_x$ is found on that list-in effect, creating a bilateral link between the currently watched television channel $\lambda_x$ and the next watched television channel $\lambda_x$, rather than just a unilateral link from the currently watched television channel $\lambda_x$ to the next watched television channel $\lambda_x$. Thus, in this case, two linked comprehensive channel lists α will be updated for each television channel $\lambda_x$ that is watched (one for the currently watched television channel $\lambda_x$, and one for the next watched television channel $\lambda_x$).

In the case where the channel selection module 2025 selects a subset of the selected linked comprehensive television channel list α (e.g., for display to the remote control user 1615 as a favorite television channel list) or cycles through a subset of the linked comprehensive television channel list α, the outcome evaluation module 2030 may generate more outcome values β. For example, in this case, the outcome evaluation module 2030 may generate an outcome value β equal to "1" if the currently watched television channel $\lambda_x$ matches a television channel $\alpha_i$ in the previously selected television channel subset, "0" if the currently watched television channel $\lambda_x$ does not match a television channel $\alpha_i$ on the selected linked comprehensive television channel list α, and "2" if the currently watched television channel $\lambda_x$ matches a television channel $\alpha_i$ on the selected linked comprehensive phone number list α, but not in the previously selected television channel subset. If the outcome value is "0" or "1", the intuition module 2015 will direct the probability update module 2020 as previously described. If the outcome value is "2", however, the intuition module 2015 will not direct the probability update module 2020 to update the probability distribution p using a learning methodology, but instead will assign a probability value $p_i$ to the listed television channel $\alpha_i$. For example, the assigned probability value $p_i$ may be higher than that corresponding to the last television channel $\alpha_i$ in the selected television channel subset, in effect, replacing that last television channel $\alpha_i$ with the listed television channel $\alpha_i$ corresponding to the currently watched television channel $\lambda_x$.

The program 2000 can include other optional features, such as those previously described with respect to the program 1700. For example, for each television channel, several linked comprehensive television channel lists α can be generated and updated based on the time and day of the week. The intuition module 2015 may also prevent any one probability value $p_i$ from overwhelming the remaining probability values $p_i$ within each linked probability distribution p by limiting it to a particular value, e.g., 0.5. Also, the performance of the listing program 2000 can be based on a cumulative performance index φ rather than an instantaneous performance index ϕ. The outcome value β can be time-based in that the cumulative time that a television channel is watched can be measured to determine the quality of the watched television channel.

Figure 29:
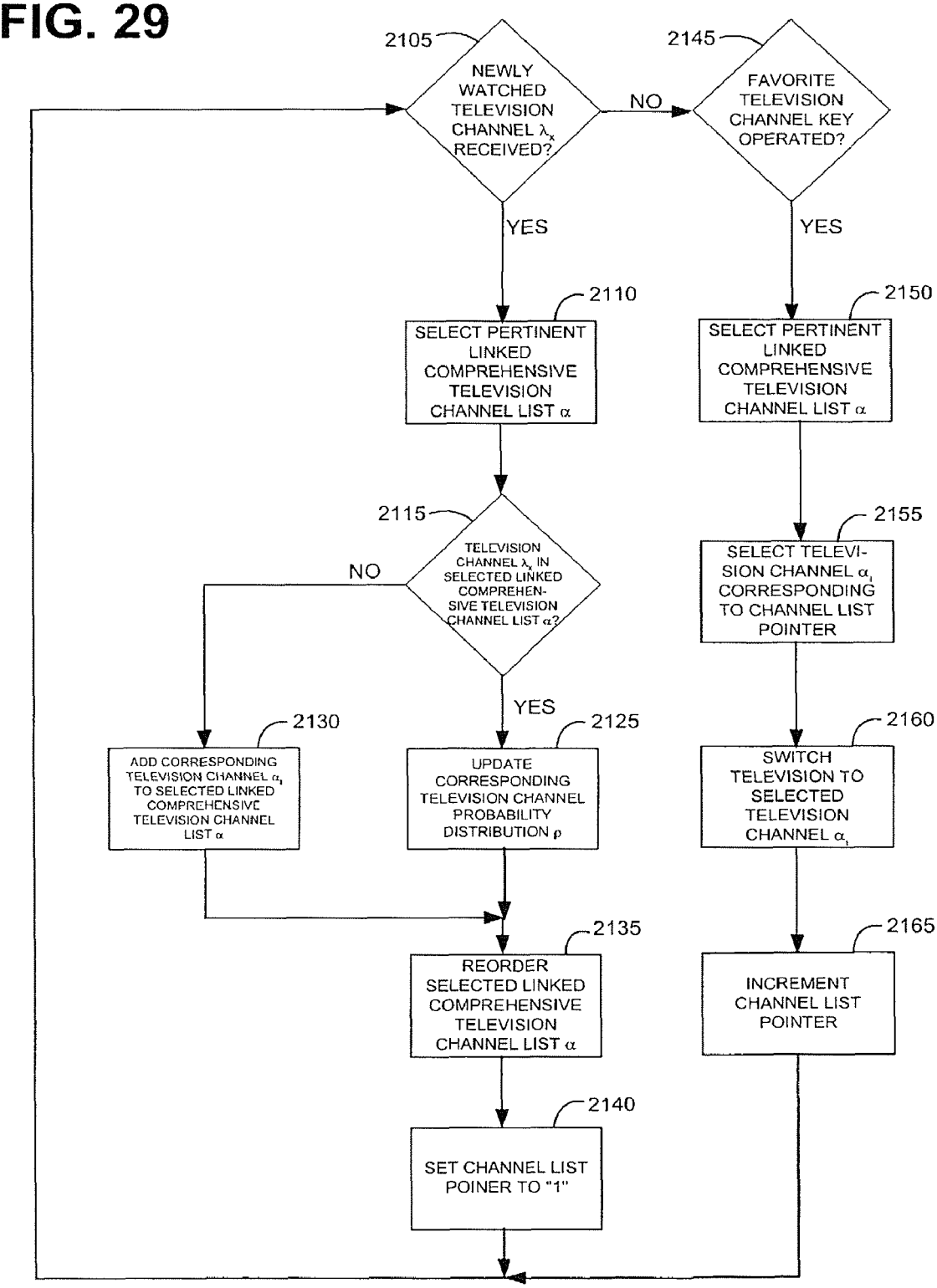
FIG. 29 is a flow diagram illustrating a preferred method performed by the priority listing program of FIG. 28.

Having now described the structure of the listing program 2000, the steps performed by the listing program 2000 will be described with reference to FIG. 29. First, the outcome evaluation module 2030 determines whether a television channel $\lambda_x$ has been newly watched (step 2105). As previously discussed, this occurs when a predetermined period of time has elapsed while the television is tuned to the television channel. If a television channel $\lambda_x$ has been newly watched, the intuition module 2015 selects the linked comprehensive channel list α corresponding to a television channel parameter value exhibited by the currently watched channel $\lambda_x$ (step 2110). For example, if the television channel parameter is a switched channel number, and the currently watched channel $\lambda_x$ is channel 2, the outcome evaluation module 2030 will select the linked comprehensive channel list α corresponding to channel 2. If the television channel parameter is a channel type, and the currently watched channel $\lambda_x$ is a sports channel, the outcome evaluation module 2030 will select the linked comprehensive channel list α corresponding to sports.

The outcome evaluation module 2030 then determines whether the watched television channel $\lambda_x$ matches a television channel $\alpha_i$ on the selected linked comprehensive channel list α (step 2115). If so (β=1), the intuition module 2015 directs the probability update module 2020 to update the corresponding television channel probability distribution p using a learning methodology to increase the probability value $p_i$ corresponding to the listed television channel $\alpha_i$ (step 2125). If not (β=0), the intuition module 2015 generates a corresponding television channel $\alpha_i$ and assigns a probability value $p_i$ to it, in effect, adding it to the selected linked comprehensive channel list α (step 2130). The channel selection module 2025 then reorders the selected linked comprehensive channel list α (step 2135), sets the channel list pointer for the selected linked comprehensive channel list α to "1" (step 2140), and returns to step 2105.

If a television channel $\lambda_x$ has not been newly watched at step 2105, e.g., if the predetermined period of time has not expired, the channel selection module 2025 determines whether the favorite channel key 1965 has been operated (step 2145). If so, the channel selection module 2025 selects the linked comprehensive channel list α corresponding to the television channel parameter value exhibited by the currently watched channel $\lambda_x$ (step 2150), and then selects a listed television channel therefrom, and in this case, the listed television channel $\alpha_i$ corresponding to the channel list pointer for the selected linked comprehensive channel list α (step 2155). The television is then switched to the selected television channel $\alpha_i$ (step 2160), and the channel list pointer for the selected linked comprehensive channel list α is incremented (step 2165). After step 2165, or if the favorite channel key 1965 has not been operated at step 2145, the listing program 2000 then returns to step 2105, where it is determined again if a television channel $\lambda_x$ has been newly watched.

More specific details on the above-described operation of the television remote controls 1600 and 1900 can be found in the Computer Program Listing Appendix attached hereto and previously incorporated herein by reference. It is noted that the file "Intuition Intelligence-remote.doc" implements both functionalities for the generalized favorite channel key 1665 and the specialized favorite channel key 1965, with the channel parameter being a switched television channel. It should be noted that the files "Intuition Intelligence-remote.doc" was designed to emulate real-world remote control usage scenarios and to demonstrate the learning and intelligence capability. Only the functions relating to the generalized and specialized favorite channel keys 1665 and 1965 are set forth.

To this end, the remote control simulation is performed on a personal computer with the Windows 98 OS with Microsoft Access 2000 database support and Media Player. Media Player plays an AVI video file to simulate as if user is watching a program on TV. The Access 2000 database acts as a repository and stores all the lists with all relevant data including the probability values, count of the channel watched, channel number, name, etc., as well as channel number, channel name, channel type, age group, rating, etc. The code and algorithm is implemented in Visual Basic 5.0 with the help of Access 2000 database support.

As the program has access to more information than a simple remote (which has no Program details, like rating, cast, etc.) it uses a combination of the data available from the cable box or set top box or other mechanisms which can provide the additional information. The program can also implemented without that additional programming information as well. The access to this additional information, however, provides help in demonstrating more sophisticated demo.

Although the previous embodiments in the context of single-user scenarios, it should be appreciated that these embodiments may be modified to operate in the context of multi-user scenarios, such as those described with respect to FIGS. 30-70 of U.S. patent application Ser. No. 10/231,875, which has previously been expressly incorporated herein by reference.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims. All publications, patents, and patent applications cited herein are hereby incorporated by reference in their entirety for all purposes.

What is claimed is:

1. A method of providing learning capability to an educational device, comprising:
    selecting one of a plurality of educational tasks to be performed by said user based on an action probability distribution comprising a plurality of probability values corresponding to said plurality of educational tasks, said plurality of educational tasks being associated with a plurality of different difficulty levels said plurality of educational tasks comprising identifying combinations of items;
    identifying an educational task performed by a user;
    determining an outcome of said selected educational task relative to said identified educational task; and
    updating said action probability distribution based on said outcome and said difficulty level of said selected educational task.

2. The method of claim 1, wherein said action probability distribution is shifted from one or more probability values corresponding to one or more educational tasks associated with lesser difficulty levels to one or more probability values corresponding to one or more educational tasks associated with greater difficulty levels if said outcome indicates that said identified educational task is successful relative to said selected educational task.

3. The method of claim 2, wherein said one or more actions educational tasks associated with greater difficulty levels includes an educational task associated with a difficulty level greater than said difficulty level of said selected educational task.

4. The method of claim 2, wherein said one or more educational tasks associated with lesser difficulty levels includes an educational task associated with a difficulty level less than said difficulty level of said selected educational task.

5. The method of claim 1, wherein said action probability distribution is shifted from one or more probability values corresponding to one or more educational tasks associated with greater difficulty levels to one or more probability values corresponding to one or more educational tasks associated with lesser difficulty levels if said outcome indicates that said identified educational task is unsuccessful relative to said selected educational task.

6. The method of claim 5, wherein said one or more educational tasks associated with lesser difficulty levels includes an educational task associated with a difficulty level less than said difficulty level of said educational task.

7. The method of claim 5, wherein said one or more educational tasks associated with greater difficulty levels includes an educational task associated with a difficulty level greater than said difficulty level of said selected educational task.

8. The method of claim 1, wherein said selected educational task corresponds to a pseudo-random selection of a probability value within said action probability distribution.

9. The method of claim 1, wherein said action probability distribution is updated using a learning automaton.

10. A method of providing learning capability to an educational device for increasing the educational level of said user, comprising:
    selecting one of a plurality of educational tasks to be performed by said user based on an action probability distribution comprising a plurality of probability values corresponding to said plurality of educational tasks, said plurality of educational tasks being associated with a plurality of different difficulty levels, said plurality of educational tasks comprising identifying combinations of items;
    identifying an educational task performed by a user;
    determining an outcome of said selected educational task relative to said identified educational task;
    updating said action probability distribution based on said outcome; and
    modifying one or more of said action selection, outcome determination, and action probability distribution update to increase the educational level of said user.

11. The method of claim 10, wherein said modification comprises selecting one of a predetermined plurality of learning methodologies employed by said action probability distribution update.

12. The method of claim 11, wherein a learning methodology that rewards an educational task having a difficulty level equal to or greater than said difficulty level of said selected educational task is selected if said outcome indicates that said identified educational task is successful relative to said selected educational task.

13. The method of claim 11, wherein a learning methodology that penalizes an educational task having a difficulty level equal to or less than said difficulty level of said selected educational task is selected if said outcome indicates that said identified educational task is successful relative to said selected educational task.

14. The method of claim 11, wherein a learning methodology that rewards an educational task having a difficulty level equal to or less than said difficulty level of said selected educational task is selected if said outcome indicates that said identified educational task is unsuccessful relative to said selected educational task.

15. The method of claim 11, wherein a learning methodology that penalizes an educational task having a difficulty level equal to or greater than said difficulty level of said selected educational task is selected if said outcome indicates that said identified educational task is unsuccessful relative to said selected educational task.

16. The method of claim 10, wherein said action probability distribution is updated using a learning automaton.

17. An educational device for increasing the educational level of said user, comprising:
an action selection module that, when executed by a processor, is configured for selecting one of a plurality of educational tasks to be performed by said user based on an action probability distribution comprising a plurality of probability values corresponding to said plurality of educational tasks, said plurality of educational tasks being associated with a plurality of different difficulty levels, said plurality of educational tasks comprising identifying combinations of items;
an outcome evaluation module that, when executed by said processor, is configured for determining an outcome of said selected educational task relative to an identified educational task performed by the user; and
a probability update module that, when executed by a processor, is configured for updating said action probability distribution based on said outcome and said difficulty level of said selected educational task.

18. The educational device of claim 17, wherein said intuition module is configured for selecting one of a predetermined plurality of learning methodologies employed by said probability update module.

19. The educational device of claim 18, wherein said intuition module is configured for selecting a learning methodology that rewards an educational task having a difficulty level equal to or greater than said difficulty level of said selected educational task if said outcome indicates that said identified educational task is successful relative to said selected educational task.

20. The educational device of claim 18, wherein said intuition module is configured for selecting a learning methodology that penalizes an educational task having a difficulty level equal to or less than said difficulty level of said selected educational task is selected if said outcome indicates that said identified educational task is successful relative to said selected educational task.

21. The educational device of claim 18, wherein said intuition module is configured for selecting a learning methodology that rewards an educational task having a difficulty level equal to or less than said difficulty level of said selected educational task is selected if said outcome indicates that said identified educational task is unsuccessful relative to said selected educational task.

22. The educational device of claim 18, wherein said intuition module is configured for selecting a learning methodology that penalizes an educational task having a difficulty level equal to or greater than said difficulty level of said selected educational task is selected if said outcome indicates that said identified educational task is unsuccessful relative to said selected educational task.

23. The educational device of claim 17, wherein said probability update module is configured for using a learning automaton to update said action probability distribution.

* * * * *